United States Patent [19]

Coates et al.

[11] Patent Number: 5,344,587
[45] Date of Patent: Sep. 6, 1994

[54] ELECTROOPTICAL LIQUID-CRYSTAL SYSTEM

[75] Inventors: David Coates, Merley Wimborne; Shirley Marden, Parkstone; Graham Smith, Poole, all of Great Britain; Ulrich Finkenzeller, Plankstadt, Fed. Rep. of Germany; Volker Reiffenrath, Rossdorf, Fed. Rep. of Germany; Reinhard Hittich, Modautal, Fed. Rep. of Germany; Stefan Wilhelm, Darmstadt, Fed. Rep. of Germany

[73] Assignee: Merck Patent Gesellschaft mit beschrankter Haftung, Darmstadt, Fed. Rep. of Germany

[21] Appl. No.: 687,852

[22] Filed: Jun. 3, 1991

[30] Foreign Application Priority Data

| Oct. 2, 1989 | [GB] | United Kingdom | 8922168 |
| Nov. 1, 1989 | [DE] | Fed. Rep. of Germany | 3936307 |
| Nov. 1, 1989 | [DE] | Fed. Rep. of Germany | 3936308 |
| Dec. 9, 1989 | [DE] | Fed. Rep. of Germany | 3940788 |
| Jan. 10, 1990 | [DE] | Fed. Rep. of Germany | 4000470 |
| Jan. 10, 1990 | [DE] | Fed. Rep. of Germany | 4000471 |
| Jan. 12, 1990 | [DE] | Fed. Rep. of Germany | 4000723 |
| Jan. 16, 1990 | [DE] | Fed. Rep. of Germany | 4001023 |
| Jan. 19, 1990 | [DE] | Fed. Rep. of Germany | 4001539 |
| Jan. 19, 1990 | [DE] | Fed. Rep. of Germany | 4001540 |
| Jan. 19, 1990 | [DE] | Fed. Rep. of Germany | 4001541 |
| Jan. 22, 1990 | [DE] | Fed. Rep. of Germany | 4001683 |
| Jan. 23, 1990 | [DE] | Fed. Rep. of Germany | 4001843 |
| Jan. 25, 1990 | [DE] | Fed. Rep. of Germany | 4002146 |
| Jan. 29, 1990 | [GB] | United Kingdom | 9001944 |
| Feb. 20, 1990 | [DE] | Fed. Rep. of Germany | 4005236 |

[51] Int. Cl.$^5$ .................. C09K 19/12; C09K 19/52
[52] U.S. Cl. ..................... 252/299.66; 252/299.01
[58] Field of Search .............. 252/299.66, 299.01

[56] References Cited

U.S. PATENT DOCUMENTS

| 4,228,030 | 10/1980 | Cole, Jr. | 252/299.66 X |
| 4,285,829 | 8/1981 | Eidenschink et al. | 252/299.63 |
| 4,293,435 | 10/1981 | Portugall et al. | 252/299.01 |
| 4,551,264 | 11/1985 | Eidenschink et al. | 252/299.62 |
| 4,769,448 | 9/1988 | Heeger et al. | 534/804 |
| 4,818,428 | 4/1989 | Scheuble et al. | 252/299.1 |
| 4,822,519 | 4/1989 | Saito et al. | 252/299.61 |
| 4,834,906 | 5/1989 | Coates et al. | 252/299.63 |
| 4,886,621 | 12/1989 | Sage et al. | 252/299.61 |
| 4,888,126 | 12/1989 | Mullen et al. | 252/299.5 |
| 4,891,152 | 1/1990 | Miller et al. | 252/299.01 |
| 4,971,719 | 11/1990 | Vaz et al. | 252/299.5 |
| 5,011,624 | 4/1991 | Yamagishi et al. | 252/299.5 |
| 5,015,057 | 5/1991 | Rumbaugh et al. | 359/96 |
| 5,087,387 | 2/1992 | Mullen et al. | 252/299.5 |

FOREIGN PATENT DOCUMENTS

| 0282963 | 9/1988 | European Pat. Off. |
| 0313053 | 4/1989 | European Pat. Off. |
| 313053 | 4/1989 | European Pat. Off. |
| 359146 | 3/1990 | European Pat. Off. |
| 8809360 | 12/1988 | PCT Int'l Appl. |
| 2243605 | 6/1989 | United Kingdom |
| 91/09092 | 12/1990 | World Int. Prop. O. |

OTHER PUBLICATIONS

J. L. West, Mol. Cryst. Liq. Cryst. Nonlin. Opt., vol. 157, pp. 427–441 (1988).
J. E. Fearson et al., Mol. Cryst. Liq. Cryst. vol. 124, pp. 89–103 (1985).
D. G. McDonnell, et al., Mol. Cryst. Liq. Cryst., vol. 123, pp. 169–177, (1985).
D. G. McDonnell et al., Liquid Crystals, vol. 6, pp. 515–523, (1989).

*Primary Examiner*—Robert L. Stoll
*Assistant Examiner*—C. Harris
*Attorney, Agent, or Firm*—Millen, White, Zelano, & Branigan

[57] ABSTRACT

The invention relates to an electrooptical liquid crystal system
which contains a dielectrically positive liquid crystal mixture and a further optically transparent medium between 2 electrodes which are optionally applied to substrate sheets,
whose liquid crystal molecules in the switched-off state have an irregular orientation,
in which one of the refractive indices of the liquid (Abstract continued on next page.)

crystal mixture essentially agrees with the refractive index of the matrix $n_M$ and/or in which the quotient of the mass of the liquid crystal mixture and of the mass of the optically transparent medium is 1.5 or more and, which, independently of the polarization of the incident light, has a reduced transmission in one of the two switch states compared to the other state and whose liquid crystal mixture contains one or more compounds of the formula I

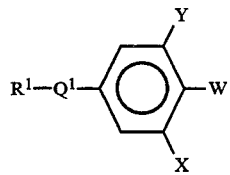   I in which
$Q^1$ is

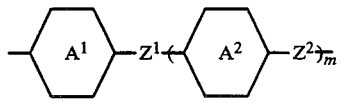

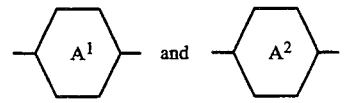

are independently of one another trans-1,4-cyclohexylene, 1,4-phenylene, 2-fluoro-1,4-phenylene, 3-fluoro-1,4-phenylene and one of $A^1$ and, if present, $A^2$, is also pyridine-2,5-diyl, pyrimidine-2,5-diyl, 1,3-dioxane-2,5-diyl, tetrahydropyran-2,5-diyl or naphthalene-2,6-diyl, $Z^1$ and $Z^2$ are independently of one another a single bond, —CH$_2$CH$_2$—, —COO—, —OCO—, —C—C—, —CH$_2$O— or any desired combinations of these bridge groups, Y and X are independently of one another H or F, and one of X and Y is also Cl, W is —CN, —Cl, —F, —CF$_3$, —OCF$_3$, —OCHF$_2$, —NCS or $R^2$ $R^1$ and $R^2$ independently of one another are alkyl having 1–12 C atoms, in which one or 2 non-adjacent CH$_2$ groups can also be replaced by —O— or —HC=CH—, and m is 0, 1 or 2.

11 Claims, 2 Drawing Sheets

ELECTROOPTICAL LIQUID-CRYSTAL SYSTEM

The invention relates to an electrooptical liquid crystal system
which contains a dielectrically positive liquid crystal mixture and a further optically transparent medium between 2 electrodes which are optionally applied to substrate sheets,
whose liquid crystal molecules in the switched-off state have an irregular orientation,
in which one of the refractive indices of the liquid crystal mixture essentially agrees with the refractive index of the matrix $n_M$ and/or in which the quotient of the mass of the liquid crystal mixture and of the mass of the optically transparent medium is 1.5 or more and
which, independently of the polarization of the incident light, has a reduced transmission in one of the two switch states compared to the other state,
and liquid crystal mixtures used in this system.

Depending on the mass content of the liquid crystal mixture in the system, this can be embedded in the optically transparent medium in liquid crystal microdroplets which are separated to a greater or lesser extent from one another or else form a more or less coherent, continuous phase in which the optically transparent medium is present, for example, in the form of particles. A continuous phase is also obtained, for example, if the optically transparent medium forms a sponge-like, 3-dimensional network whose pores, in which the liquid crystal is located, merge into each other to a greater or lesser extent. The expression liquid crystal microdroplets here indicates small liquid crystal compartments separated from one another which, however, in no way have to have a spherical shape, but can be irregularly shaped and/or deformed.

If the optically transparent medium contains liquid crystal microdroplets, it is described in the following as a matrix; on the other hand, if a more or less continuous phase of the liquid crystal is present, the medium is described by the expression network.

NCAP and PDLC films (NCAP=nematic curvilinear aligned phases, PDLC=polymer dispersed liquid crystal) are examples of electrooptical liquid crystal systems in which the liquid crystal is embedded in the matrix in the form of microdrops. NCAP films are usually obtained by intimately mixing the encapsulated polymeric material, such as, for example, polyvinyl alcohol, the liquid crystal mixture and a carrier material, such as, for example, water, in a colloid mill. The carrier material is then removed, for example by drying. An appropriate process is described in U.S. Pat. No. 4,435,047. In contrast, the liquid crystal mixture is first homogeneously mixed with monomers or oligomers of the matrix-forming material in the preparation of PDLC films described, for example, in U.S. Pat. No. 4,688,900, Mol. Cryst. Liq. Cryst. Nonlin. Optic, 157, (1988), 427–441, WO 89/06264 and EP 0,272,585. The mixture is then polymerized and the phase separation is induced (so-called PIPS technology; polymerization-induced phase separation). In addition, differentiation must further be made between TIPS (temperature-induced phase separation) and SIPS (solvent-induced phase separation) (Mol. Cryst. Liq. Cryst. Inc. Nonlin. Opt. 157 (1988) 427).

The PN system (PN=Polymer Network) described in EP 0,313,053 has a sponge-like network structure of the optically transparent medium. The content of the liquid crystal mixture in the material of the light-modulating layer is in general greater than 60% in systems of this type and is, in particular, between 70 and 90%. In order to prepare the PN systems, a mixture of the liquid crystal, monomers or oligomers of the material forming the 3-dimensional network and a polymerization initiator, in particular a photoinitiator, is customarily brought between 2 substrate plates provided with electrodes and then polymerized, for example by light irradiation.

The liquid crystal in general has a positive dielectric anisotropy $\Delta\epsilon$ and a relatively high optical anisotropy. In microdroplets matrix systems, one of the refractive indices of the liquid crystal, customarily the ordinary refractive index $n_O$ is selected in such a way that it more or less coincides with the refractive index $n_M$ of the polymeric matrix. In the case of network systems, an adjustment of the refractive indices owing to the customarily very much higher liquid crystal content in the light-modulating layer is not absolutely necessary, but can be carried out to increase the light transmission and the contrast. An electrically switchable light scattering effect is observed in these electrooptical liquid crystal systems.

If no voltage is applied to the electrodes, between which the matrix or the network is customarily arranged like a sandwich, light incident on the statistically aligned liquid crystal molecules is strongly scattered and the system is non-transparent. On applying a voltage, the liquid crystal molecules are aligned parallel to the field and perpendicular to the E vector of the transmitted light.

In the case of microdroplets matrix systems, perpendicularly incident light sees an optically isotropic medium when voltage is applied owing to the adjustment of $n_O$ and $n_M$ and the system appears transparent. An adjustment is necessary in order to avoid a scattering of the light at the matrix/liquid crystal droplets phase boundary. EP 0,272,585 describes another embodiment in which the refractive index $n_x$, which the liquid crystal exhibits at completely statistical orientation, is adjusted to the refractive index of the matrix $n_M$. In this case, the system is transparent in the field-free state, and it is converted into the opaque state by applying a voltage.

In the case of network systems, an adjustment of the refractive indices is not absolutely necessary, as owing to the high liquid crystal content in the material of the light-modulating layer, the scattering at the network/liquid crystal phase boundary is obviously less strong. In the switched-on state, the system appears transparent even without adjustment of the refractive indices. In the case of network systems, the use of liquid crystals having high optical anisotropy is preferred to achieve a transmission which is as low as possible in the non-connected state.

In WO 89/09807, the use of an optically anisotropic, for example liquid crystalline polymeric matrix material has been proposed in order to avoid the frequently observed clouding ("haze", in particular "off-axis haze") in the transparent state of the system. In systems of this type, the refractive indices of liquid crystal and optically anisotropic matrix can be adapted to each other so that the transparent state is obtained either with the voltage applied or switched off.

Electrooptical liquid crystal systems according to the preamble of claim 1 have been especially proposed for large-surface-area indicating systems, for architectural applications (windows, room dividers, sunroofs etc.) and for motor vehicles (windows, sunroofs etc.), these systems also being suitable for temperature regulation by virtue of controlled screening of the solar radiation. They can be switched on by applying a direct or alternating voltage.

As these systems are, in particular, also intended for "outdoor" applications, liquid crystal mixtures are required which are characterized by a high clear point, high $\Delta\epsilon$, a broad nematic range, a favourable temperature dependence of the electrooptical parameters and a high stability to UV and temperature.

Examples of other applications are:
 GH-indicating systems, the spectrum extending from simple segment displays to displays, to which it is possible to apply any desired electrode pattern using conventional printing techniques. Applications: motor vehicle, large displays, advertizing boards, clocks
 displays having a high information content controlled by active or passive matrix
 projection systems
 switches.

Here too, liquid crystal mixtures having, in particular, high $\Delta\epsilon$, high electrical resistance, favourable values of the electrooptical parameters and their temperature dependence, advantageous values of viscosity and a high stability to UV and temperature are required.

In microdroplets matrix systems, until now LC mixtures were customarily employed which consist of alkyl- or alkoxycyanobiphenyls and -terphenyls. Thus, for example, U.S. Pat. No. 4,688,900 and EP 0,272,585 describe the use of liquid crystal mixture E8 (prepared by BDH, Poole, Great Britain). This liquid crystal mixture is distinguished by a high value for the optical anisotropy $\Delta n$ of 0.247 and a relatively high value for the flow viscosity $\eta$ (20° C.) of 54 mm²/s, but at the same time has a relatively low clear point of only 72° C. If polynuclear polyphenyl compounds are added to the mixture to increase the clear point, a higher value for the flow viscosity $\eta$ and an unchanged high or higher value for the optical anisotropy An results. High $\Delta n$ values admittedly provide on the one hand for a strong light scattering in the opaque state, but on the other hand they can cause a clouding of the system in the switched-on state ("haze", in particular "off-axis haze") and thus an impairment of the electrooptical properties. Indeed, in systems which are controlled by a relatively low frequency alternating voltage, a high flow viscosity $\eta$ is desired in order to obtain a flicker-free display; however, on the other hand in matrix displays having a high information content liquid crystal mixtures having a relatively low viscosity are required for the realization of rapid switching times.

The liquid crystal mixture E7 (prepared by BDH, Poole, Great Britain) used in U.S. Pat. No. 4,671,618, which also consists of alkyl- and alkoxycyanobiphenyls and -terphenyls, admittedly has a relatively low flow viscosity with $\eta=39$mm²/s and a somewhat smaller optical anisotropy $\Delta n$ as E8 with $\Delta n=0,225$, but at the same time the clear point $T_c=60.5°$ C. is considerably lower. The dielectric anisotropy of the mixture E7 $\Delta\epsilon$ is 13.8 and is thus somewhat smaller than that of E8 with $\Delta\epsilon=15.6$. In order to obtain threshold voltages which are as small as possible, still higher values for $\Delta\epsilon$ are advantageous.

In EP 0,313,053, liquid crystal mixtures for network systems are proposed which are based on 2-(4-cyanophenyl)pyridines. Liquid crystal mixtures of this type indeed have relatively high values for the dielectric anisotropy $\Delta\epsilon$ and thus relatively small threshold voltages and high to very high values for the optical anisotropy $\Delta n$. At the same time, however, these liquid crystals are characterized by a relatively high viscosity $\eta$, a relatively low clear point $T_c$ and a working temperature range which is insufficient for many applications. Moreover, cyanophenylpyridine compounds have, inter alia, a lower stability to UV and temperature than cyanooligophenyl compounds.

The liquid crystals used hitherto only inadequately fulfil the requirements for a broad nematic range, a high clear point, a very high thermal and UV stability, an absence of smectic phases down to low temperatures, an optical anisotropy $\Delta n$ and flow viscosity $\eta$ which are optimizable with respect to the respective application and a high $\Delta\epsilon$.

In addition, the previous liquid crystals frequently have too low a miscibility with the monomers and/or oligomers of the polymer used for the formation of the matrix or of the network, which considerably impairs the preparation of PN systems and, in the case of microdroplets matrix systems considerably restricts, in particular, the use of PIPS technology. Moreover, the liquid crystals are frequently characterized by too high a solubility in the matrix- or network-forming polymer. A further disadvantage of the previous liquid crystals is frequently that the liquid crystal exhibits unfavourable values of the the electrooptical parameters such as, for example, the slope of the electrooptical curve and/or the temperature dependence of the electrooptical parameters such as, for example, the threshold voltage, for the respective application.

A great need thus still exists for electrooptical liquid crystal systems which are better suited to the appropriate requirements and do not have the disadvantages described or only have them to a relatively small extent.

BRIEF DESCRIPTION OF DRAWINGS

The invention was thus based on the aim of making available electrooptical liquid crystal systems and liquid crystals which do not have the disadvantages mentioned of conventional systems or only have them to a relatively small extent. Other aims of the present invention are immediately evident to the person skilled in the art from the following detailed description.

It has been found that the aims on which the invention is based can be achieved if liquid crystal mixtures are used for the systems, which mixtures contain one or more compounds of the formula I

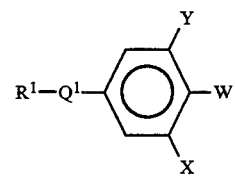

Figure 1:
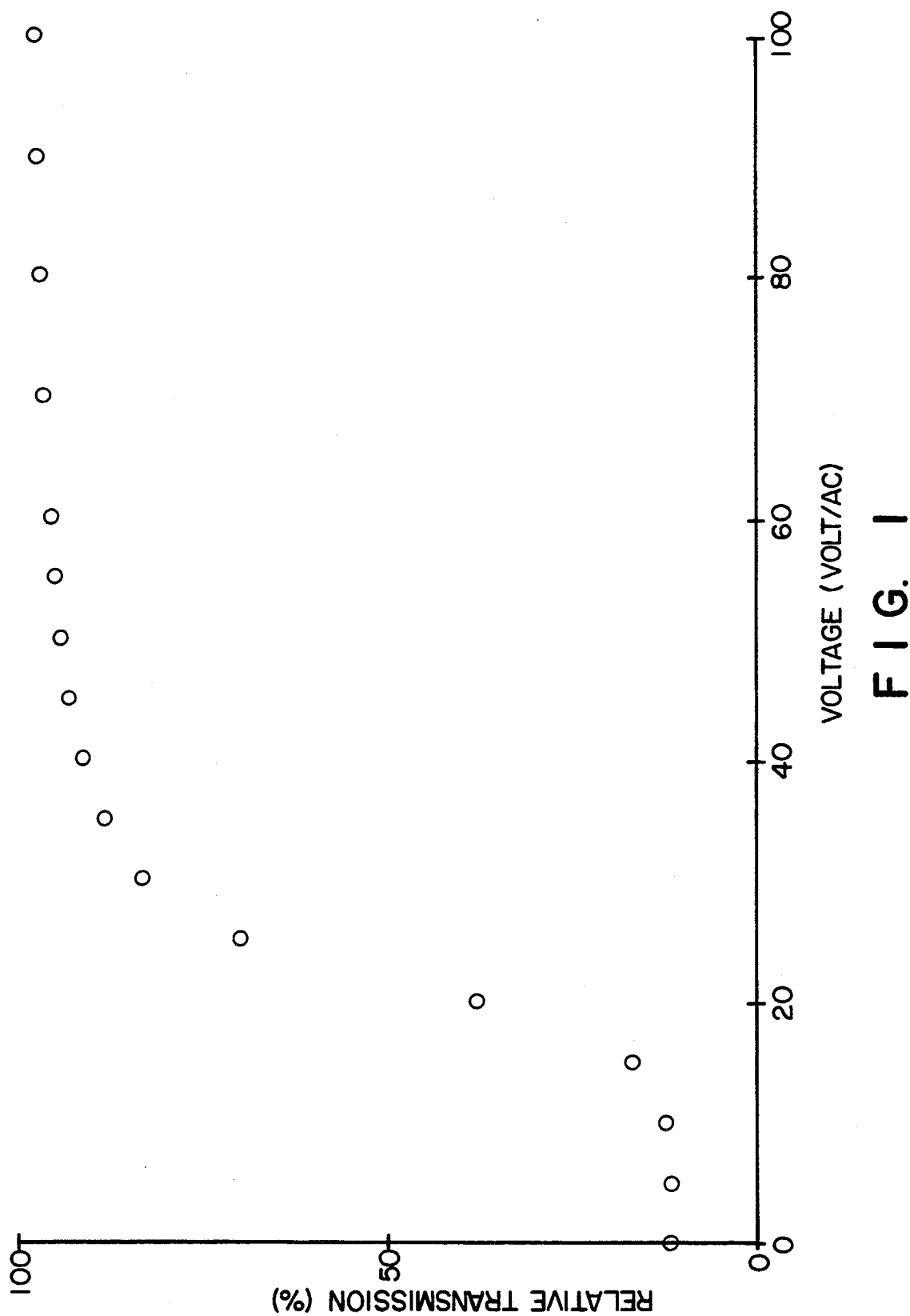

in which
Q¹ is

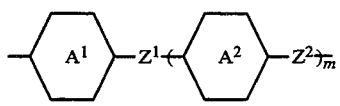

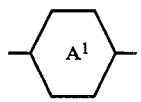

and

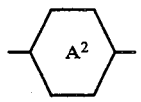

are independently of one another trans-1,4-cyclohexylene, 1,4-phenylene, 2-fluoro-1,4-phenylene, 3-fluoro-1,4-phenylene and one of $A^1$ and, if present, $A^2$, is also pyridine-2,5-diyl, pyrimidine-2,5-diyl, 1,3-dioxane-2,5-diyl, tetrahydrofuran-2,5-diyl or naphthalene-2,6-diyl, $Z^1$ and $Z^2$ are independently of one another a single bond, —$CH_2CH_2$—, —COO—, —OCO—, —C—C—, —$CH_2O$— or a combination of 2 or more of these bridge members, Y and X are independently of one another H or F, and one of X and Y is also Cl, W is —CN, —Cl, —F, —$CF_3$, —$OCF_3$, —$OCHF_2$, —NCS or $R^2$ $R^1$ and $R^2$ independently of one another are alkyl having 1-12 C atoms, in which one or 2 non-adjacent $CH_2$ groups can also be replaced by —O— or —HC=CH—, and m is 0, 1 or 2.

The invention thus relates to an electrooptical liquid crystal system
which contains a dielectrically positive liquid crystal mixture and a further optically transparent medium between 2 electrodes which are optionally applied to substrate sheets,
whose liquid crystal molecules in the switched-off state have an irregular orientation,
in which one of the refractive indices of the liquid crystal mixture essentially agrees with the refractive index of the optically isotropic transparent $n_M$ medium or in which the refractive indices of the liquid crystal mixture essentially agree with the refractive indices of the optically anisotropic transparent medium and/or in which the quotient of the mass of the liquid crystal mixture and of the mass of the optically transparent medium is 1.5 or more,
which, independently of the polarization of the incident light, has a reduced transmission in one of the two switch states compared to the other state, and
whose liquid crystal contains one or more compounds of the formula I.

The construction of the electrooptical liquid crystal systems according to the invention corresponds to the customary mode of construction for systems of this type. The term customary mode of construction is in this case broadly interpreted and includes all adaptations and modifications.

Thus, for example, in the case of PDLC or NCAP films, the matrix formed by the transparent medium in which the liquid crystal mixture is microdispersed or microencapsulated is arranged between conducting electrodes like a sandwich.

The electrodes are applied, inter alia, to substrate sheets of, for example, glass, plastic or the like; if desired, however, the matrix can also be provided directly with electrodes so that the use of substrates can be avoided.

In the case of network systems, the liquid crystal is located in the pores of the sponge-like, 3-dimensional network or the optically transparent medium is located in the form of small, for example spherical, particles in the liquid crystal. The network is customarily arranged between substrates provided with electrodes in order to prevent escape of the liquid crystal.

Both network systems and microdroplets matrix systems can be operated reflectively or transmissively so that at least one electrode and, if present, the associated substrate are transparent. Both systems customarily contain no polarizers, as a result of which a distinctly higher light transmission results. Furthermore, no orientation layers are necessary, which is a considerable technological simplification in the production of these systems compared with conventional liquid crystal systems such as, for example, TN or STN cells.

The matrix or the 3-dimensional network are based, in particular, on isotropic thermoplastics, thermoset plastics and elastomers. Depending on the intended application, the systems obtained can be flexible, elastic or rigid.

A system based on a thermoplastic polymer can easily be deformed by the action of a mechanical stress at temperatures which are greater than the glass temperature of the matrix. This can be used, for example, in microdroplets matrix systems in order to freeze a specifically deformed shape of the droplets by cooling the matrix to temperatures below the glass temperature. Furthermore, for example, the matrix can be mechanically stretched at temperatures above the glass temperature or orientated by the action of electrical or magnetic fields, this orientation, which is maintained at temperatures below the glass temperature, causing optically anisotropic properties of the matrix.

While flexible and/or elastic systems are preferably based on thermoplastics and/or elastomers, thermoset polymers are preferably used for the production of rigid systems. These can be deformed mechanically, for example, during hardening, the shape and arrangement of the microdroplets, for example, being fixed in the hardened matrix.

In the literature, there are various details about materials particularly suitable for the production of the matrix or of the network. Thus, for example, in U.S. Pat. No. 4,435,047 or in Liquid Crystals, 3, (1988) 1543, water-soluble polymers are proposed, such as, for example, polyvinyl alcohol PVA or latex-like emulsions. In U.S. Pat. Nos. 4,672,618, 4,673,255, and 4,688,900, WO 85/04262 and in Mol. Cryst. Liq. Cryst. Inc. Nonlin. Opt. 157 (1988) 427, on the other hand synthetic resins such as, for example, epoxy resins and polyurethanes which, for example, are thermally cured, are mentioned as suitable matrix materials. EP 0,272,585 describes matrix or network materials based on photocurable vinyl compounds and WO 89/06264 proposes copolymerized (sic) of multifunctional acrylates containing multifunctional mercaptans. Other details about polymers which are suitable, in particular, for matrix systems are found, for example, in EP 0,165,063, EP 0,345,029, EP 0,357,234 or EP 0,205,261.

For the production of network systems, a number of 3-dimensional crosslinkable monomers such as, for example, di- and triacrylates are mentioned in EP 0,313,053.

In addition, however, other transparent materials such as, for example, inorganic oxide glass monoliths (U.S. Pat. No. 4,814,211), other inorganic materials (see, for example, Japanese Laid-Open Specification 303325/1988) or, alternatively, other materials can also be used for matrix and network systems.

The materials mentioned are intended to illustrate the invention only by way of example, but should in no case limit it. In principle, all transparent materials can be used which permit the production of the matrix or network structures described according to the preamble of claim 1.

Preferred embodiments of the electrooptical liquid crystal systems according to the invention are NCAP films, PDLC films and microdroplets matrix systems produced by modified processes. Processes for the production of these films are described, for example, in U.S. Pat. Nos. 4,688,900, 4,673,255, and 4,671,618, WO 85/0426, U.S. Pat. No. 4,435,047, EP 0,272,595, Mol. Cryst. Liq. Cryst. Inc. Nonlin. Opt. 157 (1988) 427, Liquid Crystals, 3 (1988) 1543, EP 0,165,063, EP 0,345,029, EP 0,357,234 and EP 0,205,261.

A further preferred embodiment of the electrooptical systems according to the invention are the network systems whose production is described in EP 0,313,053. Included in the network systems here are also arrangements in which the transparent medium is dispersed in the form of individual, for example spherical, particles in the liquid crystal, such as is described, for example, in GB 1,442,360.

However, in addition also those embodiments of the invention are included in which the transparent medium has a structure which lies between the network structure on the one side and the microdroplets matrix configuration on the other side.

In addition, other embodiments of the invention not explicitly mentioned here are also included.

The thickness d of the electrooptical systems d is customarily chosen to be small in order to achieve a threshold voltage $V_{th}$ which is as low as possible. Thus, for example, layer thicknesses of 0.8 and 1.6 mm are reported in U.S. Pat. No. 4,435,047, while values for the layer thickness between 10 μm and 300 μm are given in U.S. Pat. No. 4,688,900 and between 5 μm and 30 μm in EP 0,313,053. The electrooptical systems according to the invention only have layer thicknesses d which are distinctly greater than a few mm in exceptional cases; layer thicknesses $d \leq 2$ mm are preferred.

The threshold voltage is also influenced by the size of the microdroplets or the mesh width of the network. Generally, relatively small microdroplets cause a relatively high threshold voltage $V_{th}$, but relatively short switch times $t_{on}$ or $t_{off}$ (U.S. Pat. No. 4,673,255). Experimental methods for influencing the average droplet size are described, for example, in U.S. Pat. No. 4,673,255 and in J.L. West, Mol. Cryst. Liq. Cryst. Inc. Nonlin. Opt., 157 (1988) 427. In U.S. Pat. No. 4,673,255, average drop diameters between 0.1 μm and 8 μm are given, while, for example, a matrix which is based on a glass monolith has pores having a diameter between 15 and 2,000 Å. For the mesh width of the network of the PN systems, a preferred range between 0.5 and 2 μm is given in EP 0,313,053.

An essential difference between the electrooptical liquid crystal systems according to the invention and those customary hitherto exists, however, in the liquid crystal mixture used.

The liquid crystal mixtures according to the invention contain at least one compound of the formula I.

The compounds of the formula I include 2-, 3- and 4-ring dielectrically positive or dielectrically neutral compounds of the sub-formulae I2, I3 and I4:

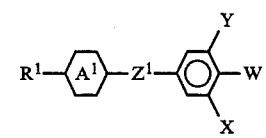

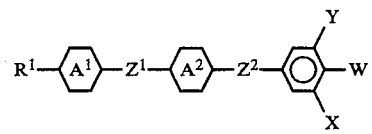

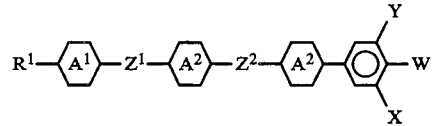

In the compounds of the formula I2-I4, X and Y independently of one another are H, F or Cl, but in particular H or F. Preferably, the compounds of the formulae I3 and I4 contain not more than 2 and, in particular, not more than 1 heterocycle. In the compounds of the formulae I3 and I4, one of the bridges $Z^1$ and $Z^2$ is preferably a single bond.

In the compounds of the formula I and the sub-formulae of the compounds I2-I4, $R^1$ and $R^2$, if present, are independently of one another alkyl having 1-12 C atoms, in which one or 2 non-adjacent CH$_2$ groups can also be replaced by —O— or —CH=CH—.

If $R^1$ and/or, if present, $R^2$ is an alkyl radical and/or an alkoxy radical, this can be straight-chain or branched. Preferably it is straight—Chain, has 1, 2, 3, 4, 5, 6 or 7 C atoms and is therefore preferably methyl, ethyl, propyl, butyl, pentyl, hexyl, heptyl, methoxy, ethoxy, propox-y, butoxy, pentoxy, hexoxy or heptoxy, or further methyl (sic), octyl, nonyl, decyl, undecyl, dodecyl, octoxy, nonoxy, decoxy, undecoxy or dodecoxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If $R^1$ and/or, if present, $R^2$ are an alkyl radical in which a CH$_2$ group is replaced by —CH=CH—, this can be straight-chain or branched. Preferably it is straightchain and has 2 to 10 C atoms. It is therefore particularly vinyl, prop-1- or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6-or oct-7-enyl, non-1-, 2-, 3-, 4-, 5-, 6-, 7-or non-8-enyl, dec-1-, 2-, 3-, 4-, 5-, 6-, 7-, 8- or dec- 9-enyl.

In the compounds of the formula I, the radicals $R^1$ and/or, if present, $R^2$ can be straight-chain or branched;

however, they are preferably straight-chain. Compounds of the formula I having branched alkyl or alkoxy radicals can occasionally be of importance owing to a better solubility in the customary liquid crystalline base materials, but in particular as chiral dopants if they are optically active. Electrooptical systems according to the preamble of claim 1, whose liquid crystal contains one or more chiral components, are described in DE 39 11 255.1.

Branched groups of this type as a rule contain not more than one chain branching. Preferred branched radicals are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 2-methylhexoxy, 2-octyloxy, 2-oxa-3-methylbutyl, 3-oxa-4-methylpentyl, 4-methylhexyl, 2-nonyl, 6-methyloctoxy, 2-methyl-3-oxapentyl and 2-methyl-3-oxahexyl.

The compounds of the formula I are prepared by methods known per se, such as are described in the literature (for example in the standard works such as Houben-Weyl, Methoden der Organischen Chemie (Methods of Organic Chemistry), Georg-Thieme-Verlag, Stuttgart Vol. IX, p. 867 et seq.), in particular under reaction conditions which are known and suitable for the reactions mentioned. In this connection, use can also be made of variants known per se which are not mentioned here in more detail.

Particularly preferred is a small group of compounds of the sub-formula Ia

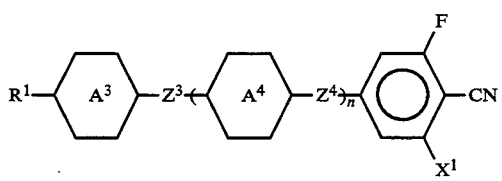

in which

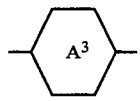

and

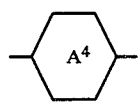

independently of one another are 1,4-cyclohexylene, 1,4-phenylene, 2-fluoro-1,4-phenylene or 3-fluoro-1,4-phenylene and $X^1$ is H or F and the following combinations Nos. 1–5 apply to n, $Z^3$ and $Z^4$:

| No. | n | $Z^2$ (sic) | $Z^3$ (sic) |
|---|---|---|---|
| 1 | 0 | single bond | — |
| 2 | 0 | —CH$_2$CH$_2$— | — |
| 3 | 1 | —CH$_2$CH$_2$— | single bond |
| 4 | 1 | single bond | —CH$_2$CH$_2$— |

-continued

| No. | n | $Z^2$ (sic) | $Z^3$ (sic) |
|---|---|---|---|
| 5 | 1 | single bond | single bond |

For the sake of simplicity, in the following Cyc is trans-1,4-cyclohexylene, Phe is 1,4-phenylene, Phe.2F is 2-fluoro-1,4-phenylene, Pheo3F is 3-fluoro-1,4-phenylene, Phe. F2 is 2,3-difluoro-1,4-phenylene, Phe.3F5F is 3,5-difluoro-1,4-phenylene, Phe.F is 2- or 3-difluoro-1,4-phenylene, Pyr is pyrimidine-2,5-diyl, Pyd is pyridine-2,5-diyl, Dio is 1,3-dioxane-2,5-diyl and Thp is tetrahydropuran-2,5-diyl (sic). The acronyms Pyr, Pyd, Dio and Thp in each case include the two possible positional isomers; the meaning of the acronyms Phe.2Cl, Phe.3Cl, Phe.3Cl5Cl and Phe. Cl is evident from that of the appropriate fluorinated 1,4-phenylene groups.

The compounds of the sub-formula Ia include 2-ring compounds, of which those of the sub-formulae Ia2-1–Ia2-6 are preferred:

| | |
|---|---|
| $R^1$-Phe-Phe.3F-CN | Ia2-1 |
| $R^1$-Phe-Phe.3F5F-CN | Ia2-2 |
| $R^1$-Cyc-CH$_2$CH$_2$-Phe.3F-CN | Ia2-3 |
| $R^1$-Cyc-CH$_2$CH$_2$-Phe.3F5F-CN | Ia2-4 |
| $R^1$-Cyc-Phe.3F-CN | Ia2-5 |
| $R^1$-Cyc-Phe.3F5F-CN | Ia2-6 |

In the compounds of the sub-formulae Ia2-1–Ia2-6, $R^1$ has the meaning given for the compounds of the formulae (sic) I. $R^1$ is preferably alkyl, alkenyl or alkoxy having 1–10, but in particular having 1–8 C atoms. n-Alkoxyalkyl compounds and, in particular, n-methoxyalkyl, n-alkoxyethyl and n-alkoxymethyl compounds are additionally preferred. Liquid crystal media which contain compounds of the formulae Ia2-2, Ia2-4 and Ia2-6 have particularly advantageous values for the dielectric anisotropy. In the compounds of the sub-formulae Ia2-1 and Ia2-2, Phe may also in each case independently of one another be laterally fluorinated.

The compounds of the sub-formula Ia include 3-ring compounds, of which those of the sub-formulae Ia3-1–Ia3-16 are preferred:

| | |
|---|---|
| $R^1$-Cyc-Phe-CH$_2$CH$_2$-Phe.3F-CN | Ia3-1 |
| $R^1$-Cyc-Phe-CH$_2$CH$_2$-Phe.3F5F-CN | Ia3-2 |
| $R^1$-Cyc-Cyc-CH$_2$CH$_2$-Phe.3F-CN | Ia3-3 |
| $R^1$-Cyc-Cyc-CH$_2$CH$_2$-Phe.3F5F-CN | Ia3-4 |
| $R^1$-Cyc-CH$_2$CH$_2$-Phe-Phe.3F-CN | Ia3-5 |
| $R^1$-Cyc-CH$_2$CH$_2$-Phe-Phe.3F5F-CN | Ia3-6 |
| $R^1$-Cyc-CH$_2$CH$_2$-Cyc-Phe.3F-CN | Ia3-7 |
| $R^1$-Cyc-CH$_2$CH$_2$-Cyc-Phe.3F5F-CN | Ia3-8 |
| $R^1$-Phe-Phe-Phe.3F-CN | Ia3-9 |
| $R^1$-Phe-Phe-Phe.3F5F-CN | Ia3-10 |
| $R^1$-Cyc-Phe-Phe.3F-CN | Ia3-11 |

| | |
|---|---|
| R$^1$-Cyc-Phe-Phe.3FSF-CN | Ia3-12 |
| R$^1$-Cyc-Cyc-Phe.3F-CN | Ia3-13 |
| R$^1$-Cyc-Cyc-Phe.3F5F-CN | Ia3-14 |
| R$^1$-Phe-CH$_2$CH$_2$-Phe-Phe.3F-CN | Ia3-15 |
| R$^1$-Phe-CH$_2$CH$_2$-Phe.3F5F-CN | Ia3-16 |
| R$^1$-Phe-Phe-CH$_2$CH$_2$-Phe.3F-CN | Ia3-17 |
| R$^1$-Phe-Phe-CH$_2$CH$_2$-Phe.3F5F-CN | Ia3-18 |

In the compounds of the sub-formulae Ia3-1–Ia3-18, R$^1$ has the meaning given for the compounds of the formula I, but preferably R$^1$ is n-alkyl, n-alkenyl or n-alkoxy having 1–10 C atoms, and in addition also n-alkoxymethyl or n-alkoxymethyl having 1–18 C atoms.

Very particularly preferred compounds of the formulae Ia3-1–Ia3-18 are those in which R$^1$ is methyl, ethyl, propyl, butyl, pentyl, hexyl, heptyl, octyl, methoxy, ethoxy, propoxy, butoxy, pentoxy, hexoxy, methoxymethyl, ethoxymethyl, propoxymethyl, butoxymethyl, pentoxymethyl, methoxyethyl, ethoxyethyl, propoxyethyl, butoxyethyl or pentoxyethyl.

In the compounds of the formulae Ia3-1–Ia3-18, Phe groups may in each case independently of one another be laterally fluorinated, in particular monofluorinated.

The compounds of the formula Ia and, in particular, of the formulae Ia2-1–Ia2-6 and Ia3-1–Ia3-18 are for the largest part known and are preferably prepared by the methods described in DE 3,209,178, JP 62-103,057, DE 3,929,418, JP 63-216,858, DE 3,401,320, EP 0,119,756, DE 3,632,411, EP 0,205,998 and, in particular, by those in DE 3,929,418.

Liquid crystal mixtures which contain compounds of the formula Ia and, in particular, of the formulae Ia2-1–Ia2-6 and Ia3-1–Ia3-18 are particularly suitable for use in electrooptical systems according to the invention and are distinguished by advantageous values for the birefringence $\Delta n$ and the flow viscosity $\eta$, a high stability, low miscibility with the polymer used for the matrix and, in particular, by a broad mesogenic range, a relatively high clear point and advantageous values for the dielectric anisotropy, the threshold voltage and the temperature dependence of the electrooptical parameters.

The liquid crystals used in the electrooptical liquid crystal systems according to the invention preferably contain 1–40%, in particular 5–30%, of compounds of the sub-formula Ia and, in particular, of the sub-formulae Ia2-1–Ia2-6 and Ia3-1–Ia3-18. The liquid crystals preferably contain 1–5, but in particular 1–3, compounds of the sub-formula Ia and in particular of the sub-formulae Ia2-1–Ia2-6 and Ia3-1–Ia3-18.

Liquid crystal mixtures are particularly preferred which, in addition to compounds of the sub-formula Ia, are based on compounds of the formulae II–IV.

| | |
|---|---|
| T-W$^1$-Phe-CN | II |
| R-W$^1$-Cyc-CN | III |
| T-V-Phe-CN | IV | in which
R in each case independently of one another is an alkyl group having 1–15 C atoms, in which one or two non-adjacent CH$_2$ groups can also be replaced by —O—, —CO— and/or —CH=CH (sic),
W$^1$ is Phe.(F)-Y$^1$ or Cyc-Y$^1$,
Y$^1$ is a single bond, —COO— or —OCO—
V is pyridine-1,5-diyl or pyrimidine-2,5-diyl,
T is R, R-Phe.(F)-Y$^1$ or R-Cyc-Y$^1$ and
Phe.(F) is 1,4-phenylene, 2-fluoro-1,4-phenylene or 3-fluoro-1,4-phenylene.

In the compounds of the formulae II–IV, the terminal group Phe-CN can also be mono- or difluorinated in 3- and/or 5-position by F, in particular if Y$^1$ is —COO— or —OCO—.

The compounds of the formulae II–IV are either known and/or are prepared by methods known per se, such as are described in the literature (for example in the standard works such as Houben-Weyl, Methoden der Organischen Chemie (Methods of Organic Chemistry), Georg-Thieme-Verlag, Stuttgart Vol. IX, p. 867 et seq.), in particular under reaction conditions which are known and suitable for the reactions mentioned. In this connection, use can also be made of variants known per se which are not mentioned here in more detail.

The content of the component mixture consisting of one or more compounds selected from the group of compounds of the sub-formulae Ia and in particular of the sub-formulae Ia2-1–Ia2-6 and Ia3-1–Ia3-16, and one or more compounds selected from the group of compounds of the formulae II–IV in the liquid crystal mixtures used in the electrooptical liquid crystal systems according to the invention is preferably 15%–100%, but in particular 25%–100%. The component mixtures, in addition to one or more compounds of the sub-formula Ia and in particular of the sub-formulae Ia2-1–Ia2-6 and Ia3-1–Ia3-16, particularly preferably contain one or more compounds which are selected from the following smaller group of compounds II1–II25, III1–III3 and IV1–IV8:

| | |
|---|---|
| R-Cyc-Phe-CN | II1 |
| R-Cyc-COO-Phe-CN | II2 |
| R-Cyc-COO-Phe.3F-CN | II3 |
| R-Cyc-COO-Phe.3F5F-CN | II4 |
| R-Phe-Phe-CN | II5 |
| R-Phe-COO-Phe-CN | II6 |
| R-Phe-COO-Phe.3F-CN | II7 |
| R-Phe-COO-Phe.3F5F-CN | II8 |
| R-Cyc-Phe-Phe-CN | II9 |
| R-Cyc-COO-Phe-Phe-CN | II10 |
| R-Cyc-Phe-COO-Phe-CN | II11 |
| R-Cyc-COO-Phe-Phe.3F-CN | II12 |
| R-Cyc-COO-Phe-Phe.3F5F-CN | II13 |
| R-Cyc-Phe-COO-Phe.3F-CN | II14 |
| R-Cyc-Phe-COO-Phe.3F5F-CN | II15 |
| R-Phe-Phe-Phe-CN | II16 |
| R-Phe-Phe.3F-Phe-CN | II17 |

| Compound | Code |
|---|---|
| R-Phe-Phe.2F-Phe-CN | II18 |
| R-Phe-COO-Phe-Phe-CN | II19 |
| R-Phe-COO-Phe-Phe.3F-CN | II20 |
| R-Phe-COO-Phe-Phe.3F5F-CN | II21 |
| R-Phe-Phe-COO-Phe-CN | II22 |
| R-Phe-Phe-COO-Phe.3F-CN | II23 |
| R-Phe-Phe-COO-Phe.3F5F-CN | II24 |
| R-Cyc-Cyc-CN | III1 |
| R-Cyc-COO-Cyc-CN | III2 |
| R-Cyc-OCO-Cyc-CN | III3 |
| R-Pyd-Phe-CN | IV1 |
| R-Pyr-Phe-CN | IV2 |
| R-Pyd-Phe-Phe-CN | IV3 |
| R-Pyr-Phe-Phe-CN | IV4 |
| R-Phe-Pyd-Phe-CN | IV5 |
| R-Phe-Pyr-Phe-CN | IV6 |
| R-Cyc-Pyr-Phe-CN | IV7 |
| R-Cyc-Pyd-Phe-CN | IV8 |

Component mixtures are very particularly preferred which, in addition to at least one compound selected from the compounds of the sub-formulae (sic) Ia and in particular of the sub-formulae Ia2-1–Ia2-6 and Ia3-1–Ia3-16 contain one or more compounds selected from the compounds of the sub-formulae II1–II24, and at least one compound selected from the compounds of the sub-formulae IV1–IV8.

Liquid crystal mixtures which are based on the following component mixtures T (Ia) 1-4, which contain at least one compound each from the compound classes of the formulae mentioned in each case, are preferred. In the table, the preferred mass content of these compounds in the component mixtures is additionally indicated. The component mixtures contain 2-38, preferably 2-35, and in particular 2-25 compounds; the sum of the mass contents of these compounds in the component mixture is 100%. The mass content of the component mixture in the liquid crystal according to the invention is between 10% and 100%, in particular between 15% and 100% and very particularly between 25% and 100%.

| Mixture | Formula | Mass content in the component mixture [%] |
|---|---|---|
| T(Ia)1 | Ia | 5-75 |
|  | II | 6-65 |
| T(Ia)2 | Ia | 5-55 |
|  | II | 5-65 |
|  | III | 5-29 |
| T(Ia)3 | Ia | 5-75 |
|  | IV | 5-63 |
| T(Ia)4 | Ia | 5-55 |
|  | II | 5-49 |
|  | IV | 5-50, in particular |

-continued

| Mixture | Formula | Mass content in the component mixture [%] |
|---|---|---|
|  |  | 5-31 |

Systems according to the invention are also particularly preferred whose liquid crystal mixture is based on the compound classes

| Compound | Code |
|---|---|
| R-Cyc-Phe-CN | II1 |
| R-Phe-Phe-CN | II5 |
| R-Cyc-Phe-Phe-CN | II9 |
| R-Phe-Phe-Phe-CN | II16 | characterized in that, to increase the dielectric anisotropy, the liquid crystal mixture contains 5–60% of one or more compounds of the following formulae

| Compound | Code |
|---|---|
| R-Phe.2F-Phe-CN | II25 |
| R-Phe.3F-Phe-CN | II25a |
| $R^1$-Phe-PHe.3F-CN (sic) | Ia2-1 |
| $R^1$-Phe-Phe.3F-CN | Ia3-9 |
| R-Phe-Phe.2F-Phe-CN | II18 |
| R-Phe-Phe.3F-Phe-CN | II17 |
| R-Cyc-Phe.2F-Phe-CN | II26 |
| R-Cyc-Phe.3F-Phe-CN | II27 |
| R-Phe.F-Phe.F-Phe-CN | II28 | where the meaning of $R^1$ and R is given above and R is, in particular, an alkyl group having 2-7 C atoms. Mixtures of this type are preferred and are a subject of this invention.

In the following, the component of this liquid crystal mixture based on the compounds II1, II5, II9 and II16 may be designated as component (i) thereof, while the component based on the compounds II25, Ia2-1, Ia3-9, II17, II18, II26, II27, II28 and II25a may be designated component (ii). These liquid crystal mixtures may consist exclusively of the components (i) and (ii), but it is also possible that the liquid crystal mixture contains other components (iii) and (iv), the component (iii) containing other nematic or nematogenic substances which are selected such that the birefringence Δn and/or the ordinary refractive index $n_O$ and/or other refractive indices and/or the viscosity and/or the dielectric anisotropy and/or other parameters of the liquid crystal are specifically optimized with respect to the respective application; a list of nematic or nematogenic substances which can preferably also be used for the component (iii) is given further below. The component (iv) contains, for example, chiral dopants for inducing a cholesteric phase and/or pleochroitic dyes and/or other additives for modifying other properties of the liquid crystal mixture such as, for example, the conductivity; in this connection the compounds of the component (iv) can be both mesogenic and non-mesogenic.

The mass content of the component (i) in the liquid crystal is preferably 10–80%, in particular 15–70% and very particularly 15–65%. If the liquid crystal mixture is intended to have a high birefringence Δn>0.24, the component (i) preferably contains 4-alkyl and/or 4-alkoxy-4'-cyanocobiphenyls (sic) and/or 4-alkyl and/or 4-alkoxy-4"-cyanotherphenyls (sic) and/or 4-(trans-4-alkyl-or-trans-4-alkoxycyclohexyl)-4'-cyanobiphenyls.
On the other hand, if it is intended for the liquid crystal mixture to have a birefringence 0.13≦Δn≦0.22, the component (i) preferably contains 4-(trans-4-alkyl- or trans-4-alkoxycyclohexyl)benzonitriles, in particular in addition to one or more of the high-Δn compounds of the component (i) just mentioned.

In the laterally fluorinated biphenyls of the formulae II25, II25a and Ia2-1, which are preferred, $R^1$ is preferably methyl, ethyl, propyl, butyl, pentyl, hexyl, heptyl, methoxy, ethoxy, propoxy, butoxy, pentoxy, hexoxy and heptoxy.

Furthermore, the component (ii) preferably contains 3-ring, laterally monofluorinated compounds of the formulae Ia3-9, II17, II18, II26 and II27. In these compounds, $R^1$ is preferably alkyl, alkoxy or alkoxyalkyl having 1–7 C atoms, in particular 2–7 C atoms and especially 2–5 C atoms.

If it is intended to obtain liquid crystal mixtures having a high clear point, the component (i) preferably contains 3-ring compounds of the formulae II9 and II16 and/or the component (ii) preferably contains 3-ring compounds of the formulae Ia3-9, II17, II18, II26, II27 and II28. Liquid crystal mixtures are particularly preferred which contain at least one compound of the formulae II9 and II16 and at least one compound of the formulae Ia3-9, II17, II18 and II26–28, as these mixtures in general have a relatively high or high value for Δε and at the same time a high clear point.

The liquid crystal mixtures containing a component (i) and (ii) preferably have a clear point $T_c>75°$ C., in particular $T_c>80°$ C. and very particularly $T_c>85°$ C.

The laterally fluorinated compounds of the formulae II25, II25a, Ia2-1, Ia3-9, II18, II17 and II26-II28 customarily have a very good solubility in the component (i) and in modified mixtures. The solubility of the laterally fluorinated terphenyls of the formulae Ia3-9, II18, II17 and II26-II28 in liquid crystal mixtures is in general substantially better than that of the non-fluorinated terphenyl of the formula II16.

Liquid crystal mixtures which contain one or more laterally fluorinated compounds of the formulae II25, II25a, Ia2-1, Ia3-9, II18, II17 and II26-II28 and in particular of the formulae Ia2-1, Ia3-9, II18, II17, II25, II25a and II26–27 are characterized by a better UV and temperature stability than the mixtures E7 and E8 known from the prior art or, alternatively, comparable mixtures.

The liquid crystal mixtures containing a component (i) and (ii) and, if desired, also other components (iii) and (iv) and the electrooptical systems containing these have advantageous properties. The mixtures in particular have a high or relatively high birefringence and at the same time a high or relatively high dielectric anisotropy and/or a high clear point. The compounds of the formulae II1, II5, II9, II16, II25, II25a, Ia2-1, Ia3-9, II18, II17, II26, II27 and II28 are sufficiently stable to thermal and radiation energy for most applications and they are very stable to chemicals. The liquid crystal mixtures containing these compounds are highly nematic, in particular even at low temperatures, and have advantageous values for η. The electrooptical systems operated using these mixtures have favourable values for the electrooptical parameters and their temperature dependence, a high contrast and a low angular dependence of the contrast and also a good preparation capability.

Electrooptical liquid crystal systems according to the invention are further preferred whose liquid crystal mixtures contain one or more compounds selected from the smaller group of compounds of the sub-formulae Ib

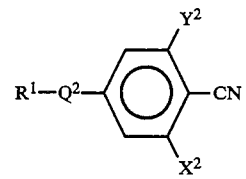

in which
$Q^2$ is

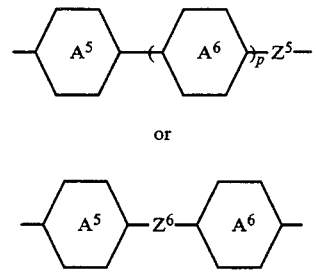

or

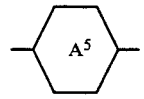

one of the rings

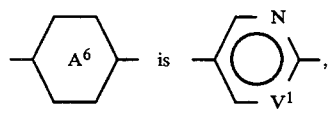

and

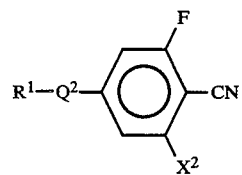

in which $V^1$ is N or CH, and the other, if present, is trans-1,4-cyclohexylene or 1,4-phenylene,
$X^2$ and $Y^2$ independently of one another are H or F
P is 0 or 1, and
$Z^5$ and $Z^6$ independently of one another are a single bond or $CH_2CH_2$
and $R^1$ has the meaning given in claim (lacuna).

Particularly preferred liquid crystal mixtures are those which contain one or more compounds of the sub-formulae (sic) Ib, in which at least one of $X^2$ or $Y^2$ is F

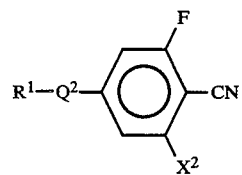

The compounds of the sub-formula IbF include 2-ring, laterally monofluorinated or laterally difluorinated compounds of the formulae IbF2-1 - IbF2-8

| | |
|---|---|
| $R^1$-Pyd-Phe.3F-CN | IbF2-1 |
| $R^1$-Pyd-Phe.3F5F-CN | IbF2-2 |
| $R^1$-Pyr-Phe.3F-CN | IbF2-3 |
| $R^1$-Pyr-Phe.3F5F-CN | IbF2-4 |
| $R^1$-Pyd-CH$_2$CH$_2$-Phe.3F-CN | IbF2-5 |
| $R^1$-Pyd-CH$_2$CH$_2$-Phe.3F5F-CN | IbF2-6 |
| $R^1$-Pyr-CH$_2$CH$_2$-Phe.3F-CN | IbF2-7 |
| $R^1$-Pyr-CH$_2$CH$_2$-Phe.3F5F-CN | IbF2-8 |

In the compounds of the formulae IbF2-1 - IbF2-8, $R^1$ is preferably alkyl or alkoxy having 1-10, but in particular having 1-8 C atoms, and in addition also n-alkoxyalkyl and in particular n-alkoxymethyl and n-alkoxyethyl. Liquid crystals which contain compounds of the formulae IbF2-2, IbF2-4, IbF2-6 and/or IbF2-8 containing a 3,5-difluoro-4-cyanophenyl group have particularly advantageous values for the dielectric anisotropy. Very particularly preferred compounds are those of the formulae IbF2-1–IbF2-8 in which $R^1$ is methyl, ethyl, n-propyl, n-butyl, n-pentyl, n-hexyl, n-heptyl, n-octyl, n-nonyl, n-decyl, n-methoxy, n-ethoxy, n-propoxy, n-butoxy, n-pentoxy, n-hexoxy, n-heptoxy, n-octoxy, n-nonoxy, n-decoxy or n-undecoxy.

The compounds of the formula IbF include additionally preferred 3-ring compounds of the formulae IbF3-1–IBF3-36, which are laterally mono- or difluorinated.

| | |
|---|---|
| $R^1$-Pyd-Phe-Phe.3F-CN | IbF3-1 |
| $R^1$-Pyr-Phe-Phe.3F-CN | IbF3-2 |
| $R^1$-Pyd-Phe-Phe.3F5F-CN | IbF3-3 |
| $R^1$-Pyr-Phe-Phe.3F5F-CN | IbF3-4 |
| $R^1$-Phe-Pyd-Phe.3F-CN | IbF3-5 |
| $R^1$-Phe-Pyd-Phe.3F5F-CN | IbF3-6 |
| $R^1$-Phe-Pyr-Phe.3F-CN | IbF3-7 |
| $R^1$-Phe-Pyr-Phe.3F5F-CN | IbF3-8 |
| $R^1$-Cyc-Pyd-Phe.3F-CN | IbF3-9 |
| $R^1$-Cyc-Pyd-Phe.3F5F-CN | IbF3-10 |
| $R^1$-Cyc-Pyr-Phe.3F-CN | IbF3-11 |
| $R^1$-Cyc-Pyr-Phe.3F5F-CN | IbF3-12 |
| $R^1$-Pyd-Phe-CH$_2$CH$_2$-Phe.3F-CN | IbF3-13 |
| $R^1$-Pyd-Phe-CH$_2$CH$_2$-Phe.3F5F-CN | IbF3-14 |
| $R^1$-Pyr-Phe-CH$_2$CH$_2$-Phe.3F-CN | IbF3-15 |
| $R^1$-Pyr-Phe-CH$_2$CH$_2$-Phe.3F5F-CN | IbF3-16 |
| $R^1$-Phe-Pyd-CH$_2$CH$_2$-Phe.3F-CN | IbF3-17 |
| $R^1$-Phe-Pyd-CH$_2$CH$_2$-Phe.3F5F-CN | IbF3-18 |
| $R^1$-Phe-Pyr-CH$_2$CH$_2$-Phe.3F-CN | IbF3-19 |
| $R^1$-Phe-Pyr-CH$_2$CH$_2$-Phe.3F5F-CN | IbF3-20 |
| $R^1$-Cyc-Pyd-CH$_2$CH$_2$-Phe.3F-CN | IbF3-21 |
| $R^1$-Cyc-Pyd-CH$_2$CH$_2$-Phe.3F5F-CN | IbF3-22 |
| $R^1$-Cyc-Pyr-CH$_2$CH$_2$-Phe.3F-CN | IbF3-23 |
| $R^1$-Cyc-Pyr-CH$_2$CH$_2$-Phe.3F5F-CN | IbF3-24 |
| $R^1$-Pyd-CH$_2$CH$_2$-Phe-Phe.3F-CN | IbF3-25 |
| $R^1$-Pyd-CH$_2$CH$_2$-Phe-Phe.3F5F-CN | IbF3-26 |
| $R^1$-Pyr-CH$_2$CH$_2$-Phe-Phe.3F-CN | IbF3-27 |
| $R^1$-Pyr-CH$_2$CH$_2$-Phe-Phe.3F5F-CN | IbF3-28 |
| $R^1$-Phe-CH$_2$CH$_2$-Pyd-Phe.3F-CN | IbF3-29 |
| $R^1$-Phe-CH$_2$CH$_2$-Pyd-Phe.3F5F-CN | IbF3-30 |
| $R^1$-Phe-CH$_2$CH$_2$-Pyr-Phe.3F-CN | IbF3-31 |
| $R^1$-Phe-CH$_2$CH$_2$-Pyr-Phe.3F5F-CN | IbF3-32 |
| $R^1$-Cyc-CH$_2$CH$_2$-Pyd-Phe.3F-CN | IbF3-33 |
| $R^1$-Cyc-CH$_2$CH$_2$-Pyd-Phe.3F5F-CN | IbF3-34 |
| $R^1$-Cyc-CH$_2$CH$_2$-Pyr-Phe.3F | IbF3-35 |
| $R^1$-Cyc-CH$_2$CH$_2$-Pyr-Phe.3FSF | IbF3-36 |

In the compounds of the sub-formulae IbF3-1–IbF3-36, $R^1$ is preferably n-alkyl or n-alkoxy having 1–10 C atoms, and in addition also n-alkoxymethyl or n-alkoxyethyl having 1–8 C atoms. The compounds of the formulae IbF3-1–IbF3-36, which are preferred, have high or relatively high values for the dielectric anisotropy $\Delta\epsilon$; in this case, the difluorinated compounds of the formulae IbF3-6, IbF3-8, IbF3-9, IbF3-12, IbF3-30, IbF3-32, IbF3-34 and IbF3-36, which contain the structural element

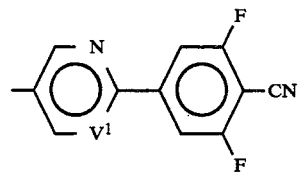

are distinguished by very particularly high values for $\Delta\epsilon$.

The compounds of the formula IbF are preferably prepared by the methods described in DE 3,209,178, DE 4,002,609, DE 4,001,022, DE 4,012,014, DE 4,012,023 and 3,315,295.

Liquid crystal mixtures which (lacuna) one or more compounds of the formula IbF and in particular of the formulae IbF2-1–IbF2-8 and IbF3-1–IbF3-36, and electrooptical systems filled with these liquid crystal mixtures are distinguished by advantageous values for the birefringence $\Delta n$ and the flow viscosity $\eta$, a high stability, low miscibility with the polymer used for the matrix, by a broad mesogenic range, a relatively high clear point and in particular by advantageous values for the dielectric anisotropy, the threshold voltage and temperature dependence of the electrooptical parameters.

The liquid crystal mixtures preferably contain 1–40% and, in particular, 5–30% of compounds of the formula IbF and in particular of the formulae IbF2-1–IbF2-8 and IbF3-1–IbF3-36. In this case, the liquid crystal mixtures preferably contain 1–5 and in particular 1–3 compounds of the formula IbF and in particular of the formulae IbF2-1–IbF2-8 and IbF3-1–IbF3-36.

Liquid crystal mixtures are particularly preferred which contains (sic) one or more compounds, selected from the group of compounds of the formula IbF and in particular of the formulae IbF2-1–IbF2-8 and IbF3-1–IbF3-36, and additionally at least one compound, selected from the group of compounds II1–II28, III-1–III3 and IV1–IV8. The mass content of the component mixture consisting of at least one compound of the formula IbF and in particular of the formulae IbF2-1–IbF2-8 and IbF3-1–IbF3-36 and additionally of one or more compounds of the formulae II1–II28, III1–III3 and IV1–IV8 in the liquid crystal mixture according to the invention is preferably 15%–100%, but in particular 25%–100%. Component mixtures T(IbF)1–T(IbF)8 are very particularly preferred which, in addition to at least one compound selected from the compounds of the formula IbF and in particular of the formulae IbF2-1–IbF2-8 and IbF3-1–IbF3-36, contain at least one compound selected from the class of compounds shown in each case:

| T(IbF)1: | IbF R—Phe—Phe.(F)—X | where X = CN, F or Cl |
|---|---|---|
| T(IbF)2: | IbF R—Cyc—Phe—COO—Phe.(F)—X | where X = CN, F or Cl |
| T(IbF)3: | IbF R—Phe—COO—Phe.(F)—X | where X = CN, F or Cl |
| T(IbF)4: | IbF R—Cyc—(CH2CH2)u—Phe.(F)—X | where X = CN, F or Cl and u = 0 or 1 |
| T(IbF)5: | IbF R—Cyc—Cyc—(CH2CH2)u—Phe.(F)—X | where X = CN; F or Cl and u = 0 or 1 |
| T(IbF)6: | IbF R—Cyc—(CH2CH2)u—Phe—Phe.F—X | where X = CN, F or Cl and u = 0 or 1 |
| T(IbF)7: | IbF R—Phe—Phe—Phe.(F)—X | where X = CN, F or Cl |
| T(IbF)8: | R—Phe—Phe—COO—Phe.(F)—X | where X = CN, F or Cl |

Liquid crystal mixtures which are based on the following component mixtures T (IbF) 9–13, which contain at least one compound each from the compound classes of the formulae mentioned in each case, are preferred. In the table, the preferred mass content of these compounds in the component mixtures is additionally indicated. The component mixtures contain 2–38, preferably 2–35, and in particular 2–25 compounds; the sum of the mass contents of these compounds in the component mixture is 100%. The mass content of the component mixture in the liquid crystal according to the invention is between 10% and 100%, in particular between 15% and 100% and very particularly between 25% and 100%.

| Mixture | Formula | Mass content in the component mixture [%] |
|---|---|---|
| T(IbF)9 | IbF | 5-75 |
| | II | 5-80, in particular 6-65 |
| T(IbF)10 | IbF | 5-75, in particular 5-48 |
| | IV | 5-63 |
| T(IbF)11 | IbF | 5-55 |
| | II | 5-65, in particular 5-52 |
| | III | 5-29 |
| T(IbF)12 | IbF | 5-55, in particular 6-45 |
| | II | 5-65, in particular |
| | IV | 5-50 |
| T(IbF)13 | IbF | 5-50 |
| | II | 5-75, in particular 5-65 |
| | III | 5-37, in particular 5-25 |
| | IV | 5-42 |

Liquid crystal mixtures are additionally preferred which contain one or more compounds of the formula Ib, in which the terminal group —O—CN (sic) is not fluorinated:

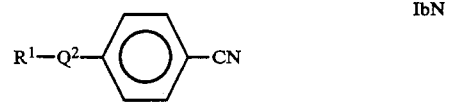

IbN

These compounds of the sub-formula IbN include 2-ring compounds of the formulae IV1–IV2 and IbN2-1–IbN2 -2

| $R^1$-Pyd-phe-CN | IV1 |
| $R^1$-Pyr-Phe-CN | IV2 |
| $R^1$-Pyd-CH$_2$—CH$_2$-Phe-CN | IbN2-1 |
| $R^1$-Pyr-CH$_2$CH$_2$-Phe-CN | IbN2-2 |

$R^1$ in the compounds of the formulae IV1–IV2 and IbN2-1–IbN2-2 is preferably alkyl or alkoxy having 1–10, but in particular having 1–8, C atoms. Additionally preferred are n-alkoxyalkyl compounds and in particular n-alkoxymethyl and n-alkoxyethyl compounds.

Very particularly preferred compounds of the formulae IV1–IV2 and IbN2-1–IbN2-2 are those in which $R^1$ is methyl, ethyl, propyl, butyl, pentyl, hexyl, heptyl, octyl, nonyl, decyl, methoxy, ethoxy, propox-y, butoxy, pentoxy, hexoxy, hetoxy (sic) or octoxy. The compounds of the formulae IV1–IV2 and IbN2 and in particular the compounds of the formulae IV2 and IbN2-2 have high or relatively high values for the dielectric anisotropy Δε. Which of the compounds IV1, IV2 and IbN2-1–IbN2-2 the liquid crystal media according to the invention preferably contain is largely determined by the intended application of the electrooptical systems according to the invention. Thus, for example, the compounds of the formulae IV1 and IV2 have a relatively high clear point and in particular a relatively high optical anisotropy, while the compounds of the formulae IbN2-1 and IbN2-2 are distinguished, for example, by a comparatively low flow viscosity.

Liquid crystal mixtures which contain compounds of the formulae IV1 and/or IV2 are particularly preferred for matrix systems, but in contrast are less suitable for network systems; on the other hand, as a rule the compounds IbN2-1–IbN2-2 are particularly preferred as components of mixtures for matrix and network (lacuna).

The compounds of the formula IbN additionally include 3-ring compounds of the formulae IV3–IV8 and IbN3-1–IbN3-18:

| | |
|---|---|
| $R^1$-Pyd-Phe-Phe-CN | IV3 |
| $R^1$-Pyr-Phe-Phe-CN | IV4 |
| $R^1$-Pyd-Cyc-Phe-CN | IbN3-1 |
| $R^1$-Pyr-Cyc-Phe-CN | IbN3-2 |
| $R^1$-Phe-Pyd-Phe-CN | IV5 |
| $R^1$-Phe-Pyr-Phe-CN | IV6 |
| $R^1$-Cyc-Pyd-Phe-CN | IV8 |
| $R^1$-Cyc-Pyr-Phe-CN | IV7 |
| $R^1$-Pyd-Phe-$CH_2CH_2$-Phe-CN | IbN3-3 |
| $R^1$-Pyr-Phe-$CH_2CH_2$-Phe-CN | IbN3-4 |
| $R^1$-Pyd-Cyc-$CH_2CH_2$-Phe-CN | IbN3-5 |
| $R^1$-Pyr-Cyc-$CH_2CH_2$-Phe-CN | IbN3-6 |
| $R^1$-Phe-Pyd-$CH_2CH_2$-Phe-CN | IbN3-7 |
| $R^1$-Phe-Pyr-$CH_2CH_2$-Phe-CN | IbN3-8 |
| $R^1$-Cyc-Pyd-$CH_2CH_2$-Phe-CN | IbN3-9 |
| $R^1$-Cyc-Pyr-$CH_2CH_2$-Phe-CN | IbN3-10 |
| $R^1$-Pyd-$CH_2CH_2$-Phe-Phe-CN | IbN3-11 |
| $R^1$-Pyr-$CH_2CH_2$-Phe-Phe-CN | IbN3-12 |
| $R^1$-Pyd-$CH_2CH_2$-Cyc-Phe-CN | IbN3-13 |
| $R^1$-Pyr-$CH_2CH_2$-Cyc-Phe-CN | IbN3-14 |
| $R^1$-Phe-$CH_2CH_2$-Pyd-Phe-CN | IbN3-15 |
| $R^1$-Phe-$CH_2CH_2$-Pyr-Phe-CN | IbN3-16 |
| $R^1$-Cyc-$CH_2CH_2$-Pyd-Phe-CN | IbN3-17 |
| $R^1$-Cyc-$CH_2CH_2$-Pyr-Phe-CN | IbN3-18 |

In the compounds of the formulae IV3–IV8 and IbN3-1–IbN3-18, $R^1$ is preferably methyl, ethyl, propyl, butyl, pentyl, hexyl, heptyl, octyl, nonyl, decyl, methoxy, ethoxy, propoxy, butoxy, pentoxy, hexoxy, heptoxy, octoxy, nonoxy, decoxy, methoxymethyl, ethoxymethyl, propoxymethyl, butoxymethyl, methoxyethyl, ethoxyethyl or propoxyethyl.

The compounds of the formula IbN are preferably prepared by the methods described in DE 3,600,052, DE 3,315,295, SU 1,063,100, SU 1,063,101, SU 1,069,413, SU 1,171,456, GB 2,118,934, EP 0,097,033 and DE 3,411,571.

Liquid crystal mixtures which contain one or more compounds selected from the compounds of the formulae IbN and IV and in particular of the formulae IbN2-1–IbN2-2, IbN3-1–IbN3-18 and IV1–IV8 are distinguished by advantageous values for the optical anisotropy Δn, a high stability, low miscibility with the polymer used for the matrix, by a broad mesogenic range, a relatively high clear point and in particular by advantageous values for the dielectric anisotropy and an advantageous temperature dependence of the electrooptical parameters. These mixtures are preferred.

The liquid crystal mixtures according to the invention preferably contain 1–40% and in particular 5–30% of compounds of the formula IbN and IV and in particular of the formulae IbN2-1–IbN2-2, IbN3-1–IbN3-18 and IV1–IV8. In this case, the liquid crystal mixtures preferably contain 1–5 and in particular 1–3 compounds of the formula IbN and IV and in particular of the formulae IbN2-1–IbN2-2, IbN3-1–IbN3-18 and IV1–IV8.

The compounds of the formulae IV3–IV4, which are preferred, have high or relatively high values for the dielectric anisotropy Δε; in this case, the compounds of the formulae IV6, IV7, IbN3-8, IbN3-16 and IbN3-18, which contain the structural element

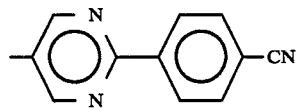

are distinguished by particularly high values for Δε.

Particularly preferred compounds are those of the formulae IV3, IV4, IV5, IV6, IbN3-3, IbN3-4, IbN3-7, IbN3-8, IbN3-11, IbN3-12, IbN3-15 and IbN3-16 which are distinguished by a high optical anisotropy at the same time as relatively high dielectric anisotropy. Liquid crystal mixtures which contain these preferred compounds are particularly preferred.

Liquid crystal mixtures which contain compounds of the formulae IV3, IV4, IV5, IV6 and/or IV7 are sometimes less suitable for network systems. On the other hand, liquid crystal mixtures of this type are as a rule particularly suitable for matrix applications.

Liquid crystal mixtures are particularly preferred which contain one or more compounds, selected from the group of compounds of the formula IbN and in particular of the formulae IbN2-1–IbN2-2, IbN3-1–IbN3-18 and IV1–IV8, and additionally one or more compounds selected from the group of compounds II1–II28 and III1–III3. The mass content of the component mixture consisting of at least one compound of the formulae IbN and IV and in particular of the formulae IbN2-1–IbN2-2, IbN3-1–IbN3-18 and IV1–IV8 and additionally of at least one compound of the formulae II1–II28 and III1–III3 in the liquid crystal mixture used according to the invention is preferably 15%–100%, but in particular 25%–100%.

The following component mixtures T(IbN), which contain at least one compound each from the substance classes shown, are particularly suitable for matrix applications, but less suitable for network systems; R has the abovementioned meaning:

| | | |
|---|---|---|
| T(IbN)1: | IV5 | |
| | R—Phe—(COO)$_l$—Phe.(F)—X | where X = F, CN and l = 0 or 1 |
| T(IbN)2: | IV7 | |
| | R—Phe—Phe.(F)—X | where X = F, CN |
| T(IbN)3: | IV6 | |
| | R—Phe—Phe.(F)—X | where X = F, CN |
| T(IbN)4: | IV3 | |
| | R—Phe—Phe.(F)—X | where X = F, CN |
| T(IbN)5: | IV4 | |
| | R—Phe—Phe—Y—Phe.(F)—X | where X = F, CN and Y = COO, —CH$_2$CH$_2$— or a single bond |
| T(IbN)6: | IV2 | |

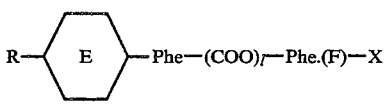

where X = F, CN,

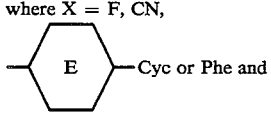

Cyc or Phe and l = 0 or 1

| | | |
|---|---|---|
| T(IbN)7: | IV2 | |
| | R—Cyc—CH$_2$CH$_2$—Phe—Phe.(F)—X | where X = F, CN |
| T(IbN)8: | IV1 | |
| | R—(Cyc)$_l$—Phe—COO—Phe.(F)—X | where X = F, CN and l = 0 or 1 |

Furthermore, the following component mixtures, which contain at least one compound each, selected from the compound classes of the formulae IbN and IV shown in each case, are less preferred for network systems:

| | |
|---|---|
| T(IbN)9: | IV2 |
| | IbN3-1 |
| T(IbN)10: | IV2 |
| | IV7 |
| T(IbN)11: | IV2 |
| | IV6 |
| T(IbN)12: | IV2 |
| | IV3 or IV4 |

The component mixtures T(IbN)9-T(IbN)12 are preferred for matrix applications.

Liquid crystal mixtures which contain one or more of the following component mixtures T (IbN) 13-18 which, in turn, in each case contain at least one compound from the substance classes mentioned, are occasionally less suitable for network applications; in contrast as a rule they can preferably be used for matrix applications:

| | |
|---|---|
| T(IbN)13: | IV1 |
| | II1 |
| T(IbN)14: | IV1 |
| | IV2 and/or IV5 |
| T(IbN)16: | IV 1 |
| | IV4 |
| T(IbN)15: | IV 1 |
| | II5 and/or |
| | II16 |
| T(IbN)17: | IV1 |
| | IV3 |
| T(IbN)18: | IV2 |
| | II5 |

On the other hand, liquid crystal mixtures of this type can frequently be modified by the addition of further compounds in such a way that they are also suitable for network applications.

Thus, for example, liquid crystal mixtures containing one or more compounds selected from the group of compounds of the formulae Ia, IbF, Ic, Id and Ie and in particular of the preferred sub-formulae in addition to one or more of the above component mixtures T (IbN) 1-18 are in general suitable for network applications.

Liquid crystal mixtures which contain one or more compounds of the formula If and in particular of the preferred sub-formulae in addition to one of the above component mixtures are also particularly suitable for network applications, the mass content of the compounds of the formula If in the liquid crystal mixture preferably being not less than 5%, in particular greater than 7.5% and very particularly greater than 10%.

Liquid crystal mixtures used according to the invention which contain one or more of the component mixtures T (IbN) 1-18 are in general particularly preferred for matrix applications.

For network applications, liquid crystal mixtures which contain at least one compound selected from the group of compounds IV1, IV2 IV3, IV4, IV5 and IV6, and additionally at least one compound selected from the group of compounds II5, II6, II7, II9, II11, II14, II16, II22 and II23 are in general additionally less preferred; however, mixtures of this type are particularly suitable for matrix applications. In contrast, liquid crystal mixtures used according to the invention which contain a component mixture of this type and additionally one or more compounds selected from the group of compounds of the formulae Ia, Ic, Id, Ie and IbF and in particular of the preferred sub-formulae are in general preferred for network applications. This also applies to liquid crystal mixtures which contain one or more compounds of the formulae (sic) If and in particular of the preferred sub-formulae, the mass content of the compounds of the formula If in the liquid crystal mixture preferably being greater than 5%, in particular greater than 10% and very particularly greater than 12.5%.

For network systems and also for matrix systems, liquid crystal mixtures are particularly preferred which contain at least one compound of the formulae IbN2-1, IbN-2 and IbN3-3–IbN3-18.

Furthermore, liquid crystal mixtures which, in addition to one or more compounds of the formula IbN and in particular of the formulae IbN2-1–IbN2-2, IbN3-1–IbN3-18 and IV1–IV8, contains (sic) at least one compound selected from the following compound classes II2, II4, II3, II8, II10, II15, II17, II18, II19, II25, II26, II27, II28, III1, III2, III3, II12, II13, II20, II21, II24, IV7 and IV8 are very particularly suitable for use in the electrooptical systems according to the preamble of claim 1.

Liquid crystal mixtures which are based on the following component mixtures T (IbN) 19–23, which contain at least one compound each from the compound classes of the formulae mentioned in each case, are preferred. In the table, the preferred mass content of these compounds in the component mixtures is additionally indicated. The component mixtures contain 2–38, preferably 2–35 and in particular 2–25 compounds; the sum of the mass contents of these compounds in the component mixture is 100%. The mass content of the component mixture in the liquid crystal according to the invention is between 10% and 100%, in particular between 15% and 100% and very particularly between 25% and 100%.

| Mixture | Formula | Mass content in the component mixture [%] |
|---|---|---|
| T(IbN)19 | IbN | 5-75 |
| | II | 6-90, in particular 11-75 |
| T(IbN)20 | IbN | 5-55 |
| | II | 5-75, in particular 5-52 |
| | III | 5-29 |
| T(IbN)21 | IbN | 5-75 |
| | IV | 5-63 |
| T(IbN)22 | IbN | 5-50 |
| | II | 5-75, in particular 5-37 |
| | III | 5-37 |
| | IV | 5-42 |
| T(IbN)23 | IbN | 5-50 |
| | II | 5-72, in particular 5-46 |
| | IV | 5-46 |

Electrooptical liquid crystal systems according to the invention are additionally particularly suitable, whose liquid crystal mixture contains at least one compound of the formula Ic

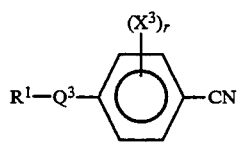

Ic in which
$Q^3$ is

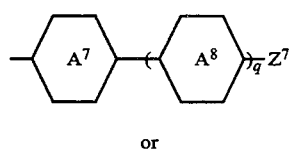

or

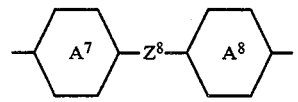

one of the rings

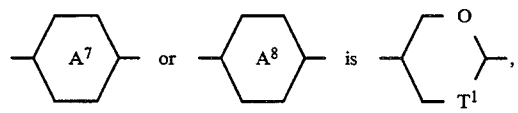

in which $T^1$ is —CH$_2$— or —O—, and the other, if present, is trans-1,4-cyclohexylene, 1,4-phenylene, 2-fluoro-1,4-phenylene or 3-fluoro-1,4-phenylene $Z^7$ and $Z^8$ independently of one another are a single bond, —COO—, —OCO— or —CH$_2$CH$_2$—, $X^3$ is F or Cl r and q independently of one another are 0 or 1,

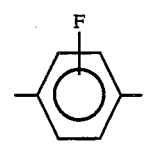

is 2-fluoro-1,4-phenylene or 3-fluoro-1,4-phenylene and

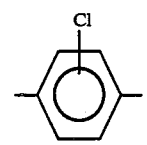

is correspondingly 2-chloro- 14-phenylene or 3-chloro-1,4-phenylene
and the meaning of $R^1$ is given in claim 1.

The compounds of the formula Ic include 2-ring tetrahydropyran derivatives and dioxane derivatives of the formulae IcT2 and IcD2, in which $Z^7$ and $X^3$ have the abovementioned meaning and Phe.(X) is Phe, Phe.F or Phe.Cl:

| | |
|---|---|
| $R^1$-Thp-$Z^7$-Phe.(X)-CN | IcT2 |
| $R^1$-Dio-$Z^7$-Phe.(X)-CN | IcD2 |

$R^1$ in the compounds of the formula IcT2 and IcD2 is preferably methyl or alkoxy having 1–10, but in particular having 1–8, C atoms. Additionally preferred are n-alkoxyalkyl compounds and in particular n-alkoxymethyl and n-alkoxyethyl compounds. In addition R is preferably also alkenyl having 1–7 C atoms. Very particularly preferred compounds are those of the formula IcT2 and IcD2, in which R is methyl, ethyl, propyl, butyl, pentyl, hexyl, heptyl, octyl, nonyl, decyl, methoxy, ethoxy, propoxy, butoxy, pentoxy, hexoxy, heptoxy or octoxy.

In the compounds of the formula IcT2 and IcD2, Z is —CH$_2$CH$_2$—, —COO—, —OCO— or a single bond, but in particular —CH$_2$—CH$_2$—, —COO— or a single bond and very particularly —COO— or a single bond. The phenyl ring can be monosubstituted (r=1) by $X^3$=F or Cl or unsubstituted. Unsubstituted compounds and compounds which contain an F atom in the 2- or 3-position or a Cl atom in the 3-position are preferred.

The following smaller group of compounds of the formulae IcT2-1–Ic2T-5 and IcD2-1–IcD2-6 is particularly preferred.

| | |
|---|---|
| R-Thp-Phe-CN | IcT2-1 |
| R-Thp-Phe.3F-CN | IcT2-2 |
| R-Thp-Phe.3Cl-CN | IcT2-3 |
| R-Thp-COO-Phe.(F)-CN | IcT2-4 |
| R-Thp-CH$_2$CH$_2$-Phe.(F)-CN | IcT2-5 |
| R-Dio-Phe-CN | IcD2-1 |
| R-Dio-Phe.3F-CN | IcD2-2 |
| R-Dio-Phe.3Cl-CN | IcD2-3 |
| R-Dio-COO-Phe.3F-CN | IcD2-4 |
| R-Dio-COO-Phe.3Cl-CN | IcD2-5 |
| R-Dio-CH$_2$CH$_2$-Phe.(F)-CN | IcD2-6 |

Liquid crystal mixtures which contain one or more compounds selected from the group of preferred compounds of the formulae IcT2-1–IcT2-5 and IcD2-1–IcD2-6 are particularly preferred. Very particularly preferred liquid crystal mixtures are those which contain a compound selected from the group of compounds IcT2-1, IcT2-2, IcT2-4, IcT2-5, IcD2-1, IcD2-2, IcD2-4 and IcD2-6.

The compounds of the formula Ic additionally include 3-ring tetrahydropyran and dioxane derivatives of the formulae IcT3-1–IcT3-8 and IcD3-1–IcD3-8:

| | |
|---|---|
| R$^1$-Phe.(F)-Thp-Z$^7$-Phe (X)-CN | IcT3-1 |
| R$^1$-Cyc-Thp-Z$^7$-Phe.(X)-CN | IcT3-2 |
| R$^1$-Thp-Phe.(F)-Z$^7$-Phe.(X)-CN | IcT3-3 |
| R$^1$-Thp-Cyc-Z$^7$-Phe.(X)-CN | IcT3-4 |
| R$^1$-Phe.(F)-Z$^8$-Thp-Phe.(X)-CN | IcT3-5 |
| R$^1$-Cyc-Za-Thp-Phe.(X)-CN | IcT3-6 |
| R$^1$-Thp-Za-Phe.(F)-Phe.(X)-CN | IcT3-7 |
| R$^1$-Thp-Za-Cyc-Phe.(X)-CN | IcT3-8 |
| R$^1$-Phe.(F)-Dio-Z$^7$-Phe.(X)-CN | IcD3-1 |
| R$^1$-Cyc-Dio-Z$^7$-Phe.(X)-CN | IcD3-2 |
| R$^1$-Dio-Phe.(F)-Z$^7$-Phe.(X)-CN | IcD3-3 |
| R$^1$-Dio-Cyc-Z$^7$-Phe.(X)-CN | IcD3-4 |
| R$^1$-Phe.(F)-Za-Dio-Phe.(X)-CN | IcD3-5 |
| R$^1$-Cyc-Za-Dio-Phe.(X)-CN | IcD3-6 |
| R$^1$-Dio-Za-Phe.(F)-Phe.(X)-CN | IcD3-7 |
| R$^1$-Dio-Za-Cyc-Phe.(X)-CN | IcD3-8 |

In the preferred compounds of the formulae IcT3-1–IcT3-8 and IcD3-1–IcD3-8, R$^1$ is preferably methyl, ethyl, propyl, butyl, pentyl, hexyl, heptyl, octyl, nonyl, decyl, methoxy, ethoxy, propoxy, butoxy, pentoxy, hexoxy, heptoxy, octoxy, nonoxy, decoxy, methoxymethyl, ethoxymethyl, propoxymethyl, butoxymethyl, methoxymethyl, ethoxymethyl, propoxymethyl, butoxymethyl (sic), methoxymethoxyethyl, ethoxyethyl, propoxyethyl, pent-2-enyl, pent-3-enyl, pent-4-enyl, hex-2-enyl, hex-3-enyl, hex-4-enyl or hex-5-enyl. In the compounds of the formulae IcT3-1–IcT3-8 and IcD3-1–IcD3-8, Z is —COO—, —OCO—, —CH$_2$CH$_2$— or a single bond, but preferably —COO-, —CH$_2$CH$_2$— or a single bond and very particularly a single bond.

Compounds of the formulae IcT3-1–IcT3-8 and IcD3-1–IcD3-8, in which Phe.(F) is a 2- or 3-fluoro-1,4-phenylene group, in general have a relatively low viscosity $\eta$ in comparison to the laterally unsubstituted compounds.

The following smaller group of 3-ring compounds is very particularly preferred:

| | |
|---|---|
| R$^1$-Phe-Thp-Phe-CN | IcT3-1a |
| R$^1$-Phe-Thp-Phe.3F-CN | IcT3-1b |
| R$^1$-Phe-Dio-Phe-CN | IcD3-1a |
| R$^1$-Phe-Dio-Phe.3F-CN | IcD3-1b |
| R$^1$-Cyc-Thp-Phe-CN | IcT3-2a |
| R$^1$-Cyc-Dio-Phe-CN | IcD3-2a |
| R$^1$-Thp-Phe-Phe-CN | IcT3-3a |
| R$^1$-Dio-Phe-Phe-CN | IcD3-3a |
| R$^1$-Dio-Phe-Phe.3F-CN | IcD3-3b |

The tetrahydropyrans and dioxanes of the formulae IcT3-1, IcD3-1, IcT3-3, IcD3-3, IcT3-5, IcD3-5, IcT3-6 and IcD3-6, in which Z is —COO— or —CH$_2$CH$_2$—, are additionally very particularly preferred.

The compounds of the formulae IcT2, IcD2, IcT3 and IcD3 have favourable values for the flow viscosity $\eta$, the optical anisotropy $\Delta n$ and, in particular, high values for the dielectric anisotropy $\Delta \epsilon$. Compounds of the formulae IcT2, IcD2, IcT3 and IcD3, which contain the structural element

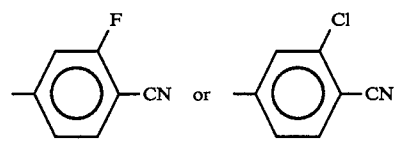

have very particularly high values for $\Delta \epsilon$.

The compounds of the formula IcT or IcD are preferably prepared by the methods described in DE 3,447,359, DE 3,306,960, GB 89 28 583.7 and DE 3,146,249.

Liquid crystal mixtures which contain at least one compound of the formulae IcT2, IcD2, IcT3, IcD3 and very particularly of the preferred formulae IcT2-1–IcT2-5, IcD2-1–IcD2-6, IcT3-1a-b, IcD3-1a-b, IcT3-2a, IcD3-2a, IcT3-3a and IcD3-3a–b are distinguished by advantageous values for the birefringence $\Delta n$ and the flow viscosity $\eta$, a high stablility, low miscibility with the polymer used for the matrix, a broad mesogenic range, a relatively high clear point and in particular by advantageous values for the dielectric anisotropy and the temperature dependence of the electrooptical parameters.

The liquid crystal mixtures used in the electrooptical liquid crystal systems according to the invention preferably contain 1–40%, in particular 5–30%, of compounds of the formulae IcT and IcD and in particular of the preferred sub-formulae; in this case, the liquid crystal mixtures preferably contain 1–5, but in particular 1–3, compounds of the formulae IcT and IcD and in particular of the preferred sub-formulae.

Particularly preferred liquid crystal mixtures are those which contain one or more compounds selected from the group of compounds of the formulae IcT2, IcD2, IcT3 and IcD3 and in particular of the preferred formulae IcT2-1–IcT2-5, IcD2-1–IcD2-6, IcT3-1a-b, IcD3-1a-b, IcT3-2a, IcD3-2a, IcT3-3a and IcD3-3a-b, and additionally one or more compounds selected from the group of compounds II1–II28, III1–III3 and IV1-IV8. The mass content of the component mixture consisting of at least one compound of the formulae IcT2, IcD2, IcT3, IcD3 and in particular of the preferred sub-formulae shown and additionally of at least one compound of the formulae II1–II28, III1–III3 and IV-1–IV8 in the liquid crystal mixture used according to the invention is preferably 15%–100%, but in particular 25%–100%.

The following component mixtures which contain at least one compound from the following group A and at least one compound from the following group B are particularly preferred:

| Group A | Group B |
| --- | --- |
| IcD2-1, IcD2-2, IcD2-4, | II1, II4, II5, II6, II9 |
| IcD2-6, IcD3-1a, IcD3-1b | II11, II16, II17, II22, II23 |
| IcD3-2a, IcD3-3a | II26, II27, II28, III1, III2, |
| IcD3-3b | IV1, IV2, IV3, IV4, IV5, IV6, |
|  | IV7, IV8, II3, II7 |

Liquid crystal mixtures which are based on the following component mixtures T (Ic) 1–5, which contain at least one compound each from the compound classes of the formulae mentioned in each case, are preferred. In the table, the preferred mass content of these compounds in the component mixtures is additionally indicated. The component mixtures contain 2–38, preferably 2–35 and in particular 2–25 compounds; the sum of the mass contents of these compounds in the component mixture is 100%. The mass content of the component mixture in the liquid crystal according to the invention is between 10% and 100%, in particular between 15% and 100% and very particularly between 25% and 100%.

| Mixture | Formula | Mass content in the component mixture [%] |
| --- | --- | --- |
| T(Ic)1 | Ic | 5-75, in particular 5-55 |
|  | II | 6-85, in particular 6-65 |
| T(Ic)2 | Ic | 5-75, in particular 5-55 |
|  | IV | 5-80, in particular 5-13 |
| T(Ic)3 | Ic | 5-50 |
|  | II | 5-72, in particular |

-continued

| Mixture | Formula | Mass content in the component mixture [%] |
| --- | --- | --- |
|  |  | 10-65 |
|  | IV | 5-65, in particular 5-46 |
| I(Ic)4 | Ic | 5-55 |
|  | II | 5-52 |
|  | III | 5-29 |
| I(Ic)5 | Ic | 5-50 |
|  | II | 5-75, in particular 10-75 |
|  | III | 5-37 |
|  | IV | 5-42 |

Electrooptical liquid crystal systems are additionally preferred whose liquid crystal contains one or more compounds of the formula Id

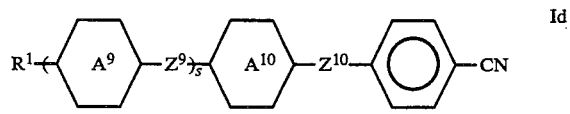

in which

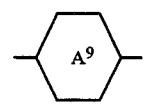

is 1,4-phenylene or trans-1,4-cyclohexylene

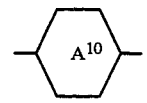

is 14-phenylene, 2-fluoro-14-phenylene 3-fluoro-1,4-phenylene or trans-1,4-cyclohexylene $Z^9$ is a single bond, —COO—, —OCO— or —CH$_2$CH$_2$—

$Z^{10}$ is a single bond, —COO— or —CH$_2$CH$_2$—, and s is 0 or 1 and the meaning of $R^1$ is given above.

Particularly preferred systems are those whose liquid crystal contains one or more compounds selected from the smaller group of compounds of the formulae IdE2-1 and IdE3-1–IdE3-8

| | |
| --- | --- |
| $R^1$-Cyc-CH$_2$CH$_2$-Phe-CN | IdE2-1 |
| $R^1$-Cyc-CH$_2$CH$_2$-Phe-Phe-CN | IdE3-1 |
| $R^1$-Phe-CH$_2$CH$_2$-Cyc-Phe-CN | IdE3-2 |
| $R^1$-Cyc-CH$_2$CH$_2$-Cyc-Phe-CN | IdE3-3 |
| $R^1$-Cyc-Phe-CH$_2$CH$_2$-Phe-CN | IdE3-4 |
| $R^1$-Phe-Cyc-CH$_2$CH$_2$- Phe-CN | IdE3-5 |
| $R^1$-Cyc-Cyc-CH$_2$CH$_2$-Phe-CN | IdE3-6 |
| $R^1$-Phe-Phe-CH$_2$CH$_2$-Phe-CN | IdE3-7 |
| $R^1$-Phe-CH$_2$CH$_2$-Phe-Phe-CN | IdE3-8 | where the meaning of $R^1$ is given above.

In the two-ring compounds of the formula IdE2-1, $R^1$ is preferably n-alkl (sic) or n-alkoxy having 1-10 C atoms, but in particular having 1-8 C atoms. Additionally preferred are n-alkoxyalkyl compounds and in particular n-alkoxymethyl and n-alkoxyethyl compounds.

In the 3-ring compounds of the formulae IdE3-1-IdE3-8, $R^1$ is preferably n-alkyl or n-alkoxyhaving 1-10 C atoms, and in addition also n-alkoxymethyl or n-alkoxyethyl, where n-alkoxy contains 1-6 C atoms.

Veryparticularly preferably, $R^1$ is methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethyl, propoxymethyl, butoxymethyl, methoxymethyl, ethoxymethyl or propoxymethyl (sic).

The compounds of the formulae IdE2 and IdE3 are preferably prepared by the methods described in DE 2,636,684, DE 2,922,236, EP 0,102,047, EP 0,129,177, DE 3,040,362, DE 3,317,597 and U.S. Pat. No. 4,035,056.

Liquid crystal mixtures which contain at least one compound selected from the compounds of the formulae IdE2-1 and IdE3-1-IdE3-8 are distinguished by advantageous values for the dielectric anisotropy $\Delta\epsilon$, a high stability, low miscibility with the polymer used for the matrix and in particular by a broad mesogenic range, a relatively high clear point and favourable values for the birefringence.

The liquid crystal mixtures used in the electrooptical liquid crystal systems according to the invention preferably contain 1-40%, in particular 5-30%, of compounds of the formula Id and in particular of the preferred sub-formulae; in this connection, the liquid crystal mixtures preferably contain 1-5, but in particular 1-3, compounds of the formulae Id and in particular of the preferred sub-formulae.

Particularly preferred liquid crystal mixtures are those which contain one or more compounds selected from the group of compounds of the formulae IdE2-1 and IdE3-1-IdE3-8 and additionally one or more compounds selected from the group of compounds II1-II28, III1-III3 and IV1-IV8. The mass content of the component mixtures consisting of at least one compound of the formulae IdE2-1 and IdE3-1-IdE3-8 and additionally of at least one compound of the formulae II1-II28, III1-III3 and IV1-IV8 in the liquid crystal mixtures according to the invention is preferably 15%-100%, but in particular 25%-100%.

The following component mixtures T(IdE), which contain at least one compound each from the substance classes shown in each case, are particularly suitable for matrix applictions and very particularly suitable for network applications:

| T(IdE)1:  | IdE2-1      |
|           | II3         |
| T(IdE)2:  | IdE2-1      |
|           | II4         |
| T(IdE)3:  | IdE2-1      |
|           | II5         |
| T(IdE)4:  | IdE2-1      |
|           | II6 or II7  |
| T(IdE)5:  | IdE2-1      |
|           | II15        |
| T(IdE)6:  | IdE2-1      |
|           | II16 or 17  |
| T(IdE)7:  | IdE2-1      |
|           | IV1         |
| T(IdE)8:  | IdE2-1      |
|           | IV2         |

-continued

| T(IdE)9:  | IdE2-1 |
|           | IV3    |
| T(IdE)10: | IdE2-1 |
|           | IV4    |
| T(IdE)11: | IdE2-1 |
|           | IV5    |
| T(IdE)12: | IdE2-1 |
|           | IV6    |

The following component mixtures which contain one or more compounds selected from the substance classes shown in each case are very particularly suitable for matrix systems:

| T(IdE)13: | IdE2-1 |
|           | IV7    |
| T(IdE)14: | IdE2-1 |
|           | IV8    |
| T(IdE)15: | IdE2-1 |
|           | II2    |
| T(IdE)16: | IdE2-1 |
|           | II6    |

Both for matrix applications and in particular also for network applications, liquid crystal mixtures are preferred which contain at least one compound of the formula IdE2-1 and one or more compounds selected from the group of compounds II1, II3-II5, II7-II28 and IV-1-IV6. The properties of these mixtures can in general be further improved by the addition of one or more compounds selected from the group of compounds of the formula (sic) Ia, IbF, Ic, Id and If and in particular of the preferred sub-formulae.

The following component mixtures T(IdE)17-T-(IdE)19, which contain at least one compound each of the formulae shown in each case in the mass per cent range given are additionally very particularly preferred; in this connection, for any component mixture the sum of the mass contents in the component mixture is 100%, while the mass content of the component mixture in the liquid crystal mixture employed in the system according to the invention is between 10% and 100%, in particular between 10% and 90% and very particularly between 15% and 85%:

| Mixture   | Formula         | Mass content of the component mixture [%] |
|-----------|-----------------|-------------------------------------------|
| T(IdE)17  | IdE3            | 5-35                                      |
|           | II1-II28        | 6-60                                      |
| T(IdE)18  | IdE3            | 5-35                                      |
|           | IV1-IV8         | 5-45                                      |
| T(IdE)19  | IdE2 and/or IdE3 | 4-32                                     |
|           | II1-II28        | 5-58                                      |
|           | IV1-IV8         | 5-37                                      |

Electrooptical liquid crystal systems are additionally preferred whose liquid crystal contains one or more 4-ring compounds selected from the group of carbonitriles of the formulae Ie4-1-Ie4-4

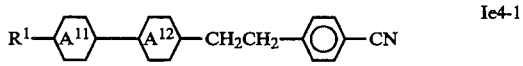

Ie4-1

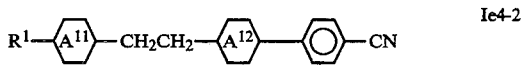

Ie4-2

-continued

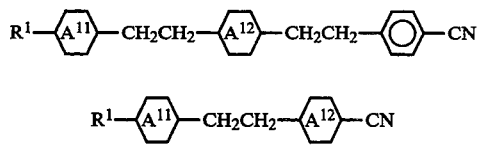
Ie4-3

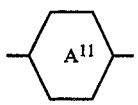
Ie4-4 in which

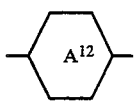

in each case independently of one another is 1,4-phenylene, 2-fluoro-1,4-phenylene, 3-fluoro-1,4-phenylene or trans-1,4-cyclohexylene,

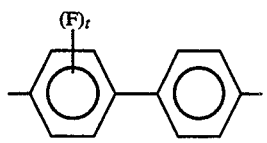

in each case independently of one another is

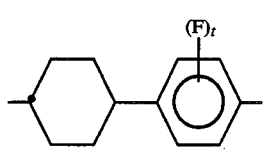

or

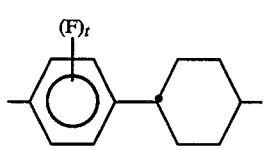

t is 0 or 1 and

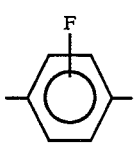

is 2-fluoro-1,4-phenylene or 3-fluoro-1,4-phenylene and the meaning of $R^1$ is given in claim 1.

The compounds of the formulae Ie4-1a–Ie4-1g, Ie4-2a–Ie4-2k, Ie4-3a–Ie4-3-f (sic) and Ie4-4a–Ie4-4l shown in the following are particularly preferred:

| | |
|---|---|
| $R^1$-Phe-Phe-Phe-CH$_2$CH$_2$-Phe-CN | Ie4-1a |
| $R^1$-Phe-Phe-Phe.2F-CH$_2$CH$_2$-Phe-CN | Ie4-1b |
| $R^1$-Phe-Phe.3F-CH$_2$CH$_2$-Phe-CN | Ie4-1c |
| $R^1$-Phe-Phe-Phe-CH$_2$CH$_2$-Phe.F-CN | Ie4-1d |
| $R^1$-Phe-Phe-Cyc-CH$_2$CH$_2$-Phe-CN | Ie4-1e |
| $R^1$-Cyc-Phe-Phe.(F)-CH$_2$CH$_2$-Phe.(F)-CN | Ie4-1f |
| $R^1$-Cyc-Cyc-Phe.(F)-CH$_2$CH$_2$-Phe-CN | Ie4-1g |
| $R^1$-Phe-CH$_2$CH$_2$-Phe-Phe.(F)-Phe.(F)-CN | Ie4-2a |
| $R^1$-Phe-CH$_2$CH$_2$-Cyc-Phe-Phe-CN | Ie4-2b |
| $R^1$-Cyc-CH$_2$CH$_2$-Phe-Phe.2F-Phe-CN | Ie4-2c |
| $R^1$-Cyc-CH$_2$CH$_2$-Phe-Phe.3F-Phe-CN | Ie4-2d |
| $R^1$-Cyc-CH$_2$CH$_2$-Phe-Phe-Phe.(F)-CN | Ie4-2e |
| $R^1$-Cyc-CH$_2$CH$_2$-Phe-Cyc-Phe-CN | Ie4-2f |
| $R^1$-Cyc-CH$_2$CH$_2$-Cyc-Phe-phe-CN | Ie4-2g |
| $R^1$-Cyc-CH$_2$CH$_2$-Cyc-Phe.2F-Phe-CN | Ie4-2h |
| $R^1$-Cyc-CH$_2$CH$_2$-Cyc-Phe.3F-Phe-CN | Ie4-2i |
| $R^1$-Cyc-CH$_2$CH$_2$-Cyc-Phe-Phe.(F)-CN | Ie4-2k |
| $R^1$-Phe-CH$_2$CH$_2$-Phe-Phe.(F)-CH$_2$CH$_2$-Phe-CN | Ie4-3a |
| $R^1$-Phe-CH$_2$CH$_2$-Cyc-Phe.(F)-CH$_2$CH$_2$-Phe-CN | Ie4-3b |
| $R^1$-Cyc-CH$_2$CH$_2$-Phe-Phe-CH$_2$CH$_2$-Phe-CN | Ie4-3c |
| $R^1$-Cyc-CH$_2$CH$_2$-Phe-Phe.2F-CH$_2$CH$_2$-Phe-CN | Ie4-3d |
| $R^1$-Cyc-CH$_2$CH$_2$-Phe-Phe.3F-CH$_2$CH$_2$-Phe-CN | Ie4-3e |
| $R^1$-Cyc-CH$_2$CH$_2$-Cyc-Phe.(F)-CH$_2$CH$_2$-Phe-CN | Ie4-3f |
| $R^1$-Phe-Phe-CH$_2$CH$_2$-Phe-Phe-CN | Ie4-4a |
| $R^1$-Phe-Phe-CH$_2$CH$_2$-Phe.2F-Phe-CN | Ie4-4b |
| $R^1$-Phe-Phe-CH$_2$CH$_2$-Phe.3F-Phe-CN | Ie4-4c |
| $R^1$-Phe-Phe-CH$_2$CH$_2$-Cyc-Phe-CN | Ie4-4d |
| $R^1$-Cyc-Phe-CH$_2$CH$_2$-Phe.(F)-Phe-CN | Ie4-4e |
| $R^1$-Cyc-Phe-CH$_2$CH$_2$-Cyc-Phe-CN | Ie4-4f |
| $R^1$-Phe-Cyc-CH$_2$CH$_2$-Phe-Phe-CN | Ie4-4g |
| $R^1$-Phe-Cyc-CH$_2$CH$_2$-Cyc-Phe-CN | Ie4-4h |
| $R^1$-Cyc-Phe-CH$_2$CH$_2$-Phe-Cyc-CN | Ie4-4i |
| $R^1$-Cyc-Phe-CH$_2$CH$_2$-Phe.2F-Cyc-CN | Ie4-4k |
| $R^1$-Cyc-Phe-CH$_2$CH$_2$-Phe.3F-Cyc-CN | Ie4-4l |

R in the compounds of the formulae Ie4-1a–Ie4-1g, Ie4-2a–Ie4-2k, Ie4-3a–Ie4-3f and Ie4-4a–Ie4-4l is preferably alkyl or alkoxy having 1–10, but in particular having 1–8, C atoms. n-Alkoxyalkyl compounds and in particular n-alkoxymethyl and n-alkoxyethyl compounds are additionally preferred.

The compounds of the formulae Ie4-1–Ie4-4 are preferably prepared by the methods described (lacuna) DE 3,401,320 and DE 2,617,593.

Liquid crystal mixtures which contain one or more compounds selected from the group of compounds of the formulae Ie4-1–Ie4-4 and in particular of the formulae Ie4-1a–Ie4-1g, Ie4-2a–Ie4-2k, Ie4-3a–Ie4-3f and Ie4-4a–Ie4-4l are preferred. Liquid crystal mixtures are particularly preferred which contain one or more compounds selected from the group of compounds of the formulae Ie4-1, Ie4-2 and Ie4-4 and in particular of the formulae Ie4-1a–Ie4-1g, Ie4-2a–Ie4-2k and Ie4-4a–Ie4-4l.

The compounds of the formula Ie4-1–Ie4-4 have high clear points and relatively high values for the flow viscosity $\eta$.

To reduce the flow viscosity, a 1,4-phenylene group of the compounds of the formulae Ie4-1–Ie4-4 can also be monosubstituted laterally by X=F or Cl and in particular by F; the substituted compounds particularly preferably have one of the following structural features S1–S3:

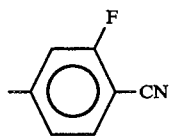

S1

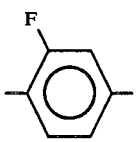

S2

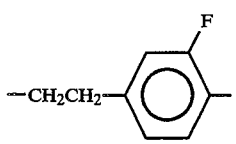

S3

The liquid crystals according to the invention preferably contain 2–40%, but in particular 5–30%, of compounds selected from the group of 4-ring carbonistriles (sic) of the formulae Ie4-1a–Ie4-1g, Ie4-2a–I14-2k (sic), Ie4-3a–Ie4-3f and Ie4-4a–Ie4-4l; in this case, the liquid crystal mixtures preferably contain 1–5, but in particular 1–3, compounds of the formula Ie4 and of the preferred sub-formulae.

The selection of the compounds of the formulae Ie4-1–Ie4-4 and in particular of the preferred sub-formulae is carried out with respect to the specific embodiments of the electrooptical system according to the invention desired in each case. If, for example, highly viscous and highly clearing liquid crystal media having high optical anisotropy are required, the medium contains, for example, in particular one or more laterally unsubstituted compounds of the formulae Ie4-1a, Ie4-2a, Ie4-3a and/or Ie4-4a, while highly clearing media having comparatively low viscosity and relatively low optical anisotropy preferably contain one or more laterally monosubstituted compounds of the formulae Ie4-1g, Ie4-2h-k, Ie4-3f and/or Ie4-4i-1.

Particularly preferred liquid crystal mixtures are those which contain one or more compounds selected from the group of compounds of the formulae Ie4-1–Ie4-3, in particular of the formulae Ie4-1a–Ie4-1g, Ie4-2a–Ie4-2k, Ie4-3a–Ie4-3f and Ie4-4a–Ie4-4l and veryparticularly of the formulae Ie4-1a–Ie4-1g, Ie4-2a–Ie4-2k and Ie4-4a–Ie4-4l, and additionally one or more compounds selected from the group of compounds II1–II28, III1–III3 and IV1–IV8. The mass content of the component mixture consisting of at least one compound of the formulae Ie4-1–Ie4-4 and in particular of the preferred sub-formulae and additionally of at least one compound of the formulae II1–II28, III1–III3 and IV-1–IV8 in the liquid crystal mixtures used according to the invention is preferably 15%–100%, but in particular 25%–100%.

The following component mixtures T (Ie4) which, in addition to at least one compound selected from the group of compounds of the formulae Ie4-1–Ie4-4 and in particular of the preferred sub-formulae of these compounds, contain one or more compounds selected from the compounds of the formulae II1–II6, II7, II9, II11, II14, II16, II23, II22 and IV1–IV8 are very particularly preferred.

Liquid crystal mixtures which are based on the following component mixtures T (Ie4) 1–3, which contain at least one compound each from the compound classes of the formulae mentioned in each case, are preferred. In the table, the preferred mass content of these compounds in the component mixtures is additionally indicated. The component mixtures contain 2–38, preferably 2–35 and in particular 2–25 compounds; the sum of the mass contents of these compounds in the component mixture is 100%. The mass content of the component mixture in the liquid crystal according to the invention is between 10% and 100%, in particular between 15% and 100% and very particularly between 25% and 100%.

| Mixture | Formula | Mass content in the component mixture [%] |
|---|---|---|
| T (Ie4) 1 | Ie4 | 5–75, in particular 5–45 |
|  | II | 6–65 |
| T (Ie4) 2 | Ie4 | 5–75, in particular 5–35 |
|  | IV | 5–63 |
| T (Ie4) 3 | Ie4 | 5–55, in particular 5–25 |
|  | II | 5–53 |
|  | IV | 5–50 |

Electrooptical liquid crystal systems are additionally preferred whose liquid crystal contains one or more compounds of the formula If Electrooptical liquid crystal systems are additionally preferred whose liquid crystal contains one or more compounds of the formula If

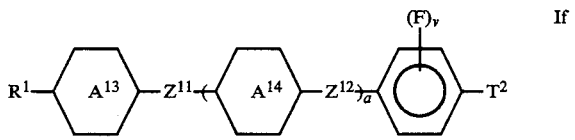

If in which
at least one of the rings

and, if present,

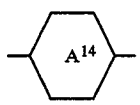

is 1,4-phenylene, 2-fluoro-1,4-phenylene, 3-fluoro-1,4-phenylene, trans-1,4-cyclohexylene, pyridine- 2,5-diyl, pyrimidine-2,5-diyl or 1,3-dioxane-2,5-diyl and the other, if present, is trans-1,4-cyclohexylene, 1,4-phenylene, 2-fluoro-1,4-phenylene or 3-fluoro-1,4-phenylene, $Z^{11}$ and $Z^{12}$ in each case independently of one another are a single bond, —C—C (sic), —CH$_2$CH$_2$—, —COO—, —OCO— or a combination of 2 or more of these bridge members, v is 0, 1 or 2 a is 0 or 1,

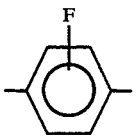

is 2-fluoro-1,4-phenylene or 3-fluoro-1,4-phenylene,

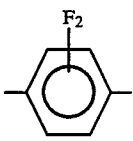

is 3,5-difluoro-1,4-phenylene and $T^2$ is —Cl, —F, —CF$_3$, —OCF$_3$, —OCHF$_2$ or NCS and $R^1$ has the meaning given in claim 1.

In the following, Phe.(F,2) is a laterally unsubstituted 1,4-phenylene group, a 1,4-phenylene group laterally monofluorinated in the 2- or 3-position or a 1,4-phenylene group difluorinated in the 3- and 5-position.

Preferred compounds of the formula If are those in which $T^2$ is —NCS:

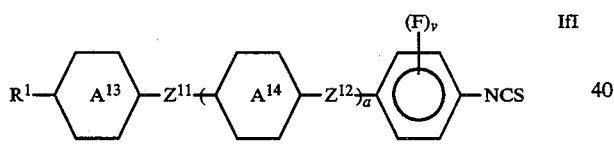

The compounds of the formula IfI include 2-ring compounds of the formulae IfI2-1–IfI2-4, which are preferred:

| | |
|---|---|
| R$^1$-Phe-Z$^{11}$-Phe-NCS | IfI2-1 |
| R$^1$-Cyc-Z$^{11}$-Phe-NCS | IFI2-2 |
| R$^1$-Pyr-Z$^{11}$-Phe-NCS | IFI2-3 |
| R$^1$-Pyd-Z$^{11}$-Phe-NCS | IFI2-4 |

$R^1$ is preferably alkyl or alkoxyhaving 1–10, but in particular having 1–8, C atoms, where the straight-chain radicals are preferred; additionally preferred are n-alkoxyalkyl compounds and in particular n-alkoxymethl (sic) and n-alkoxyethyl compounds.

In the compounds of the formulae IfI2-1–IfI2-4, $Z^{11}$ is preferably a single bond, —CH$_2$CH$_2$—, COO or OCO. Liquid crystal mixtures which contain one or more compounds of the formulae IfI2-3 or IfI2-4 in which Z is a single bond or COO and in particular a single bond, have particularly advantageous values for the dielectric anisotropy Δε.

The compounds of the formula IfI2-1 and IfI2-2 are particularly preferred. The following smaller group of 2-ring compounds of the formulae IfI2-1a–b and IfI2-2a–b is very particularly preferred:

| | |
|---|---|
| R-Phe-Phe.(F)-NCS | IfI2-1a |
| R-Phe-Phe.(F)-NCS | IfI2-1b |
| R-Cyc-Phe.(F)-NCS | IfI2-2a |
| R-Cyc-CH$_2$CH$_2$-Phe.(F)-NCS | IfI2-2b |

Liquid crystal mixtures which, in addition to one or more laterally non-fluorinated compounds of the formulae IfI2-2a, contain at least one or more compounds selected from the group of compounds of the formulae II5, IV1 and IV2 are in particular suitable for matrix systems, but less suitable for network systems.

The compounds of the formula IfI additionally include 3-ring compounds of the formulae IfI3-1–IfI3-20

| | |
|---|---|
| R$^1$-Phe-Phe-Z$^{12}$-Phe.(F)-NCS | IfI3-1 |
| R$^1$-Phe-Cyc-Z$^{12}$-Phe.(F)-NCS | IfI3-2 |
| R$^1$-Phe-Pyr-Z$^{12}$-Phe.(F)-NCS | IfI3-3 |
| R$^1$-Phe-Pyd-Z$^{12}$-Phe.(F)-NCS | IfI3-4 |
| R$^1$-Cyc-Phe-Z$^{12}$-Phe.(F)-NCS | IfI3-5 |
| R$^1$-Cyc-Cyc-Z$^{12}$-Phe.(F)-NCS | IfI3-6 |
| R$^1$-Cyc-Pyr-Z$^{12}$-Phe.(F)-NCS | IfI3-7 |
| R$^1$-Cyc-Pyd-Z$^{12}$-Phe.(F)-NCS | IfI3-8 |
| R$^1$-Pyr-Phe-Z$^{12}$-Phe.(F)-NCS | IfI3-9 |
| R$^1$-Pyd-Phe-Z$^{12}$-Phe.(F)-NCS | IfI3-10 |
| R$^1$-Phe-Z$^{11}$-Phe-Phe.(F)-NCS | IfI3-11 |
| R$^1$-Phe-Z$^{11}$-Cyc-Phe.(F)-NCS | IfI3-12 |
| R$^1$-Phe-Z$^{11}$-Pyr-Phe.(F)-NCS | IfI3-13 |
| R$^1$-Phe-Z$^{11}$-Pyd-Phe.(F)-NCS | IfI3-14 |
| R$^1$-Cyc-Z$^{11}$-Phe-Phe.(F)-NCS | IfI3-15 |
| R$^1$-Cyc-Z$^{11}$-Cyc-Phe.(F)-NCS | IfI3-16 |
| R$^1$-Cyc-Z$^{11}$-Pyr-Phe.(F)-NCS | IfI3-17 |
| R$^1$-Cyc-Z$^{11}$-Pyd-Phe.(F)-NCS | IfI3-18 |
| R$^1$-Pyr-Z$^{11}$-Phe-Phe.(F)-NCS | IfI3-19 |
| R$^1$-Pyd-Z$^{11}$-Phe-Phe.(F)-NCS | IfI3-20 |

In the compounds of the formulae IfI3-1–IfI3-20, $R^1$ is preferably n-alkyl or n-alkoxyhaving 1–10 C atoms, and in addition also n-alkoxymethyl or n-alkoxyethyl having 1–8 C atoms. Particularly preferred compounds are those of the formulae Ibf3-1–Ibf3-20 in which $R^1$ is methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethyl, propoxymethyl, butoxymethyl, methoxyethyl, ethoxyethyl or propoxyethyl.

The compounds of the formulae IfI3-1, IfI3-5, IfI3-11 and IfI3-15 are particularly preferred. The compounds of the formula IfI3, in which $Z^{11}$ and $Z^{12}$ independently of one another are a single bond or COO and in particular a single bond, and those of the formula IfI3-13 have particularly advantageous values for $\Delta\epsilon$, in particular if the terminal 1,4-phenylene group is fluorinated in the 3-position.

The following smaller group of 3-ring compounds of the formulae IfI3-1a, IfI3-1b, IfI3-5a, IfI3-5b, IfI3-11a and IfI3-15a is very particularly preferred:

| | |
|---|---|
| R-Phe-Phe-Phe.(F)-NCS | IfI3-1a |
| R-Phe-Phe-CH2CH2-Phe.(F)-NCS | IfI3-1b |
| R-Cyc-Phe-Phe.(F)-NCS | IfI3-5a |
| R-Cyc-Phe-CH2CH2-Phe.(F)-NCS | IfI3-5b |
| R-Cyc-Cyc-Phe.(F)-NCS | IfI3-6a |
| R-Cyc-Cyc-CH2CH2-Phe.(F)-NCS | IfI3-6b |
| R-Phe-CH2CH2-Phe-Phe.(F)-NCS | IfI3-11a |
| R-Cyc-CH2CH2-Phe-Phe.(F)-NCS | IfI3-15a |

The compounds of the formula IfI are preferably prepared by the methods described in EP 0,169,327, JP 61-189,263, EP 0,126,883, EP 0,215,800, DE 327,115,10, EP 0,242,716, DE 3,545,345, EP 0,227,004, EP 0,272,580 and DE 3,929,765.

The selection of the compounds of the formula IfI and in particular of the preferred sub-formulae is carried out with respect to the particular specific embodiment of the electrooptical system according to the invention. If, for example, a liquid crystal medium having high or relatively high optical viscosity (sic) is required, the medium in particular contains those compounds of the formulae IfI2-1, IfI2-3, IfI3-1, IfI3-3, IfI3-9, IfI3-11, IfI3-13 and/or IfI3-19 in which Z is a single bond; particularly preferred compounds are those in which the terminal 1,4-phenylene group or, alternatively, another 1,4-phenylene group of the compound is laterally fluorinated in the 2- or 3-position and in particular in the 3-position. The person skilled in the art can make a selection from the pool of compounds of the formula IfI for other embodiments without inventive assistance.

Liquid crystal mixtures which contain one or more compounds of the formula IfI and in particular of the preferred sub-formulae are distinguished by advantageous values for the birefringence $\Delta n$ and the dielectric anisotropy $\Delta\epsilon$, a high stability, a low miscibility with the polymer used for the matrix and in particular a broad mesogenic range, a relatively high clear point and advantageous values for the flow viscosity $\eta$.

The liquid crystal mixtures preferably contain 1–40% and in particular 5–30% of compounds of the formula IfI and in particular of the preferred sub-formulae. In this connection, the liquid crystal mixtures preferably contain 1–5 and in particular 1–3 compounds of the formula IfI and in particular of the preferred sub-formulae.

Liquid crystal mixtures are particularly preferred which contain one or more compounds selected from the group of compounds of the formula IfI, in particular of the formulae IfI2-1 –IfI2-4 and IfI3-1–IfI3-20 and very particularly of the formulae IfI2-1a, IfI2-1b, IfI2-2a, IfI2-2b, IfI3-1a, IfI3-1b, IfI3-5a, IfI3-5b, IfI3-11a and IfI3-15a, and additionally one or more compounds selected from the group of compounds II1–II28, III1–III3 and IV1–IV8. The mass content of the component mixture consisting of at least one compound of the formulae IfI2 and IfI3 and in particular of the preferred sub-formulae of these compounds and additionally of at least one compound of the formulae II1–II28, III1–III3 and IV1–IV8 in the liquid crystal mixtures used according to the invention is preferably 15%–100%, but in particular 25%–100%.

Liquid crystal mixtures which, in addition to at least one laterally non-fluorinated compound, selected from the group of compounds of the formulae IfI2-2a, IfI3-5a and IfI3-6a, contain one or more compounds selected from the group of compounds II5, IV1 and IV2 are as a rule in particular suitable for matrix systems, but frequently less suitable for network systems. However, the properties of component mixtures of this type are frequently distinctly improved by the addition of at least one, preferably not less than 3 compounds, selected from the group of compounds of the formulae Ia, Ib, Ic, Id, Ie, IfF, IfCl and IfCl.F and in particular of the preferred sub-formulae, so that these mixtures are then also preferred for network applications.

Liquid crystal mixtures which contain at least one compound selected from the group including compounds of the formulae IfI2-1b and IfI3-6b and laterally fluorinated compounds of the formulae IfI2-1a and IfI3-6a, and additionally a compound selected from the group of compounds of the formulae II1, II3, II2, II5, II9, II11, II14, II16, II22, II23 and IV1–IV8 are particularly suitable for matrix systems and very particularly suitable for network systems.

Furthermore, the following component mixtures which contain at least one compound each from the compound classes shown are particularly suitable both for matrix systems and for network systems:

| | | |
|---|---|---|
| T(IfI)1: | IfI2-1a<br>R—Phe—(COO)$_z$—(Phe.(F))$_y$—Phe.(F)—X$^4$ | where X$^4$ = CN, F, Cl, OCF$_3$ or CF$_3$ and z and y independently of one another are 0 or 1 |
| T(IfI)2: | IfI2-1a<br>R—Cyc—(CH2CH2)$_z$—Phe.(F)—X$^4$ | where X$^4$ = CN, F, Cl, OCF$_3$ or CF$_3$ and z = 0 or 1 |
| T(IfI)3: | IfI2-1a<br>R—Pyr—(Phe)$_z$—Phe.(F)—X | where z = 0 or 1 and X$^4$ = CN, F or Cl |
| T(IfI)4: | IfI2-1a<br>R—Pyd—(Phe)$_z$—Phe.(F)—X | where z = 0 or 1 and X$^4$ = CN, F or Cl |
| T(IfI)5: | IfI2-1b | |

-continued

| | | |
|---|---|---|
| | R—Phe—(COO)$_z$—(Phe.(F))$_y$—Phe.(F)—X$^4$ | where X$^4$ = CN, F, Cl OCF$_3$ or CF$_3$ and z and y independently of one another are 0 or 1 |
| T(IfI)6: | IfI2-1b<br>R—Cyc—(CH$_2$CH$_2$)$_z$—Phe.(F)—X | where X$^4$ = CN, F, Cl, OCF$_3$ or CF$_3$ and z = 0 or 1 |
| T(IfI)7: | IfI2-1b<br>R—Pyr—(Phe)$_z$—Phe.(F)—X$^4$ | where z = 0 or 1 and X$^4$ = CN, F or Cl |
| T(IfI)8: | IfI2-1b<br>R—Pyd—(Phe)$_z$—Phe.(F)—X | where z = 0 or 1 and X$^4$ = CN, F or Cl |
| T(IfI)9: | IfI2-2a<br>R—Phe—(COO)$_z$—(Phe.(F))$_y$—Phe.(F)—X$^4$ | where X$^4$ = CN, F, Cl OCF$_3$ or CF$_3$ and z and y independently of one another are 0 or 1 |
| T(IfI)10: | IfI2-2a<br>R—Cyc—(CH$_2$CH$_2$)$_z$—Phe.(F)—X$^4$ | where X$^4$ = CN, F, Cl, OCF$_3$ or CF$_3$ and z = 0 or 1 |
| T(IfI)11: | IfI2-2a<br>R—Pyr—(Phe)$_z$—Phe.(F)—X$^4$ | where z = 0 or 1 and X$^4$ = CN, F or Cl |
| T(IfI)12: | IfI2-2a<br>R—Pyd—(Phe)$_z$—Phe.(F)—X$^4$ | where z = 0 or 1 and X$^4$ = CN, F or Cl |
| T(IfI)13: | IfI2-5a<br>R—Phe—(COO)$_z$—(Phe.(F))$_y$—Phe.(F)—X$^4$ | where X$^4$ = CN, F, Cl OCF$_3$ or CF$_3$ and z and y independently of one another are 0 or 1 |
| T(IfI)14: | IfI2-5a<br>R—Cyc—(CH$_2$CH$_2$)$_y$—Phe.(F)—X$^4$ | where X$^4$ = CN, F, Cl, OCF$_3$ or CF$_3$ and z = 0 or 1 |
| T(IfI)15: | IfI2-5a<br>R—Pyr—(Phe)$_z$—Phe.(F)—X$^4$ | where z = 0 or 1 and X$^4$ = CN, F or Cl |
| T(IfI)16: | IfI2-5a<br>R—Pyd—(Phe)$_z$—Phe.(F)—X$^4$ | where z = 0 or 1 and X$^4$ = CN, F or Cl |

Additionally preferred compounds of the formula If are those in which T$^2$ is —U—F

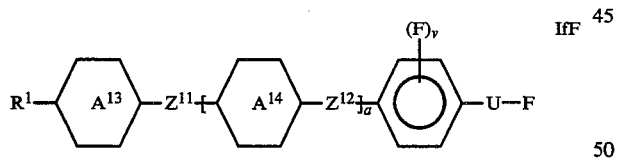
IfF in which

U is a single bond, —CF$_2$—, —OCF$_2$— or —OCHF— and R$^1$ has the meaning given above in claim 1.

The compounds of the formula IfF include 2-ring compounds of the formulae IfF2-1–IfF2-4, which are preferred:

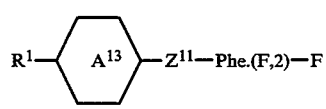
IfF2-1

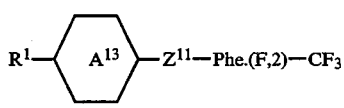
IfF2-2

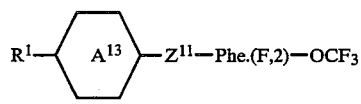
IfF2-3

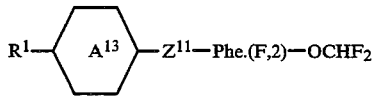
IfF2-4

In the compounds of the formulae IfF2-1–IfF2-4, R$^1$ is preferably alkyl or alkoxy having 1-10, but in particular having 1-8, C atoms, where the straight-chain radicals are preferred. Additionally preferred are n-alkoxyalkyl compounds and in particular n-alkoxymethyl and n-alkoxyethyl compounds. Z11 (sic) is preferably —CH$_2$CH$_2$—, —COO— or a single bond, in particular a single bond or —CH$_2$CH$_2$— and very particularly a single bond.

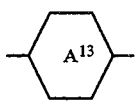

is preferably Cyc, Phe.(F), Pyr or Pyd.

The compounds of the formula IfF additionally include the following small group of 3-ring compounds of the formulae IfF3-1–IfF3-8, which are preferred:

 IfF3-1

 IfF3-2

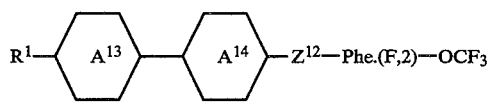 IfF3-3

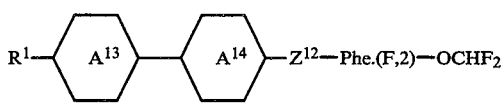 IfF3-4

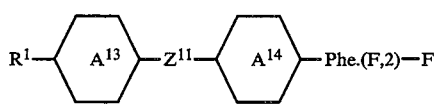 IfF3-5

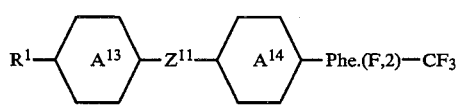 IfF3-6

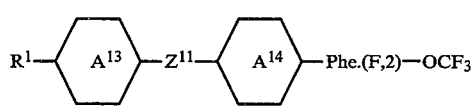 IfF3-7

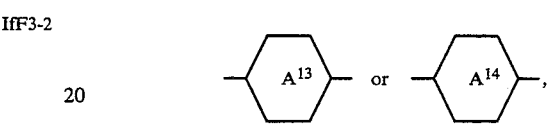 IfF3-8

In the compounds of the formulae IfF3-1–IfF3-8, $R^1$ is preferably n-alkyl or n-alkoxyhaving 1–10 C atoms, and in addition also n-alkoxymethyl or n-alkoxyethyl having 1–8 C atoms.

Very particularly preferred compounds are those of the formulae IfF3-1–IfF3-8, in which $R^1$ is methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethyl, propoxymethyl, butoxymethyl, methoxyethyl, ethoxyethyl or propoxyethyl. $Z^{11}$ and $Z^{12}$ in the compounds of the formulae IfF3-1–IfF3-8 are preferably independently of one another —CH$_2$CH$_2$—, —COO—, a single bond or a combination of or more of these bridge members and in particular —CH$_2$CH$_2$— or a single bond.

The compounds of the formula IfF are preferably prepared by the processes described in DE 3,102,017, JP 57-140,747, DE 3,233,641, DE 2,937,911, EP 0,097,033, DE 3,509,260, DE 3,732,284, DE 3,928,783, EP 0,194,153, JP 58-126,839, JP 58-210,045, WO 85/04874, DE 3,315,295, EP 0,193,191, JP 63-280,063, DE 3,825,428, DE 3,929,525, DE 4,024,760, DE 4,009,907, DE 4,007,040, DE 4,012,051, DE 3,939,116, PCT/EP90/00186, WO 90/08757, DE 3,929,764, DE 4,004,650, DE 4,013,854 and DE 3,913,554.

Liquid crystal mixtures which contain one or more compounds of the formulae IfF2-1–IfF2-4 and IfF3-1–IfF3-8 where Phe.(F,2)=Phe.3F or Phe.3F5F, have advantageous values for the dielectric anisotropy Δε and are preferred. Mixtures which contain those compounds of the formulae IfF2-1–IfF2-4 and IfF3-1–IfF3-8 in which Ph.(F,2)=Phe.3F or Phe.3F5F and

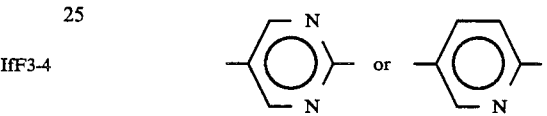

if present, are are particularly preferred.

2-Ring compounds of the formulae IfF2-1–IfF2-4 in which Phe. ( F ) is Phe, Phe.3F or Phe.3F5F are particularly preferred. 2-Ring compounds of the formulae IfF2-1–IfF2-4 in which Phe.(F) is Phe.2F are distinguished by a good miscibility with other liquid crystals and are likewise particularly preferred. Liquid crystal mixtures which contain these preferred compounds are preferred.

Liquid crystal mixtures which contain one or more of the following particularly preferred 2-ring compounds are additionally particularly preferred:

| | |
|---|---|
| $R^1$-Cyc-Phe-F | IfF2-1 a |
| $R^1$-Cyc-Phe.2F-F | IfF2-1b |
| $R^1$-Cyc-Phe.3F-F | IfF2-1 c |
| $R^1$-Cyc-Phe.3F5F-F | IfF2-1d |
| $R^1$-Cyc-CH$_2$CH$_2$-Phe-F | IfF2-1 e |
| $R^1$-Cyc-CH$_2$CH$_2$-Phe.2F-F | IfF2-1 f |
| $R^1$-Cyc-CH$_2$CH$_2$-Phe.3F-F | IfF2-1 g |
| $R^1$-Cyc-CH$_2$CH$_2$-Phe.3F5F-F | IfF2-1 h |
| $R^1$-pyr-Phe-F | IfF2-1 i |
| $R^1$-Pyr-Phe.2F-F | IfF2-1 k |
| $R^1$-pyr-Phe.3F-F | IfF2-11 |
| $R^1$-pyr-Phe.3F5F-F | IfF2-1m |
| $R^1$-Pyd-Phe-F | IfF2-1n |
| $R^1$-Pyd-Phe.2F-F | IfF2-1o |

| | |
|---|---|
| R¹-Pyd-Phe.3F-F | IfF2-1p |
| R¹-Pyd-Phe.3F5F-F | IfF2-1g |
| R-Dio-Phe-F | IfF2-1r |
| R-Dio-Phe.2F-F | IfF2-1s |
| R-Dio-Phe.3F-F | IfF2-1 t |
| R-Dio-Phe.3F5F-F | IfF2-1u |
| R¹-Cyc-Phe-$CF_3$ | IfF2-2a |
| R¹-Cyc-Phe.2F-$CF_3$ | IfF2-2b |
| R¹-Cyc-Phe.3F-$CF_3$ | IfF2-2c |
| R¹-Cyc-Phe.3F5F-$CF_3$ | IfF2-2d |
| R¹-Cyc-$CH_2CH_2$-Phe-$CF_3$ | IfF2-2e |
| R¹-Cyc-$CH_2CH_2$-Phe.2F-$CF_3$ | IfF2-2f |
| R¹-Cyc-$CH_2CH_2$-Phe.3F-$CF_3$ | IfF2-2g |
| R¹-Cyc-$CH_2CH_2$-Phe.3FSF-$CF_3$ | IfF2-2h |
| R¹-Pyr-Phe-$CF_3$ | IfF2-2i |
| R¹-Pyr-Phe-2F-$CF_3$ | IfF2- 2k |
| R¹-Pyr-Phe.3F-$CF_3$ | IfF2-2l |
| R¹-Pyr-Phe.3FSF-$CF_3$ | IfF2-2m |
| R¹-Pyd-Phe-$CF_3$ | IfF2- 2n |
| R¹-Pyd-Phe.2F-$CF_3$ | IfF2-2o |
| R¹-Pyd-Phe.3F-$CF_3$ | IfF2- 2p |
| R¹-Pyd-Phe.3F5F-$CF_3$ | IfF2-2q |
| R-Dio-Phe-$CF_3$ | IfF2- 2r |
| R-Dio-Phe.2F-$CF_3$ | IfF2-2s |
| R-Dio-Phe.3F-$CF_3$ | IfF2- 2 t |
| R-Dio-Phe.3F5F-$CF_3$ | IfF2- 2u |
| R¹-Cyc-Phe-$OCF_3$ | IfF2- 3a |
| R¹-Cyc-Phe.2F-$OCF_3$ | IfF2-3b |
| R¹-Cyc-Phe.3F-$OCF_3$ | IfF2-3c |
| R¹-Cyc-Phe.3F5F-$OCF_3$ | IfF2- 3d |
| R¹-Cyc-$CH_2CH_2$-Phe-$OCF_3$ | IfF2- 3e |
| R¹-Cyc-$CH_2CH_2$-Phe.2F-$OCF_3$ | IfF2-3f |
| R¹-Cyc-$CH_2CH_2$-Phe.3F-$OCF_3$ | IfF2- 3 |
| R¹-Cyc-$CH_2CH_2$-Phe.3F5F-$OCF_3$ | IfF2-3h |
| R¹-Pyr-Phe-$OCF_3$ | IfF2-3i |
| R¹-Pyr-Phe-2F-$OCF_3$ | IfF2-3k |
| R¹-Pyr-Phe.3F-$OCF_3$ | IfF2-3l |
| R¹-Pyr-Phe.3F5F-$OCF_3$ | IfF2-3m |
| R¹-Pyd-Phe-$OCF_3$ | IfF2-3n |
| R¹-Pyd-Phe.2F-$OCF_3$ | IfF2-3o |
| R¹-Pyd-Phe.3F-$OCF_3$ | IfF2-3p |
| R¹-Pyd-Phe.3F5F-$OCF_3$ | IfF2-3q |
| R-Dio-Phe-$OCF_3$ | IfF2-3r |
| R-Dio-Phe.2F-$OCF_3$ | IfF2-3s |
| R-Dio-Phe.3F-$OCF_3$ | IfF2- 3 t |
| R-Dio-Phe.3FSF-$OCF_3$ | IfF2- 3u |
| R¹-Cyc-Phe-$OCHF_2$ | IfF2-4a |
| R¹-Cyc-Phe.2F-$OCHF_2$ | IfF2-4b |
| R¹-Cyc-Phe.3F-$OCHF_2$ | IfF2-4c |
| R¹-Cyc-Phe.3F5F-$OCHF_2$ | IfF2-4d |
| R¹-Cyc-$CH_2CH_2$-Phe-$OCHF_2$ | IfF2-4e |
| R¹-Cyc-$CH_2CH_2$-Phe.2F-$OCHF_2$ | IfF2-4 f |
| R¹-Cyc-$CH_2CH_2$-Phe.3F-$OCHF_2$ | IfF2-4g |
| R¹-Cyc-$CH_2CH_2$-Phe.3F5F-$OCHF_2$ | IfF2-4h |
| R¹-Pyr-Phe-$OCHF_2$ | IfF2- 4 i |
| R¹-Pyr-Phe.2F-$OCHF_2$ | IfF2-4k |
| R¹-Pyr-Phe.3F-$OCHF_2$ | IfF2-4l |
| R¹-Pyr-Phe.3F5F-$OCHF_2$ | IfF2-4m |
| R¹-Pyd-Phe-$OCHF_2$ | IfF2-4n |
| R¹-Pyd-Phe.2F-$OCHF_2$ | IfF2-4o |
| R¹-Pyd-Phe.3F-$OCHF_2$ | IfF2-4p |
| R¹-Pyd-Phe.3F5F-$OCHF_2$ | IfF2-4q |
| R-Dio-Phe-$OCHF_2$ | IfF2-4r |
| R-Dio-Phe.2F-$OCHF_2$ | tfF2-4s |
| R-Dio-Phe.3F-$OCF_3$ | IfF2-4 f |
| R-Dio-Phe.3FSF-$OCF_3$ | IfF2-4u |

The following small group of 3-ring compounds is additionally preferred:

| | |
|---|---|
| R¹-Phe-Phe-$Z^{12}$-Phe.(F,2)-F | IfF3-1 a |
| R¹-Phe-Phe-$Z^{12}$-Phe.(F,2)-$CF_3$ | IfF3-2a |
| R¹-Phe-Phe-$Z^{12}$-Phe.(F,2)-$OCF_3$ | IfF3-3a |
| R¹-Phe-Phe-$Z^{12}$-Phe.(F,2)-$OCHF_2$ | IfF3-4a |
| R¹-Cyc-Phe-$Z^{12}$-Phe.(F,2)-F | IfF3-1 b |
| R¹-Cyc-Phe-$Z^{12}$-Phe.(F,2)-$CF_3$ | IfF3- 2b |
| R¹-Cyc-Phe-$Z^{12}$-Phe.(F,2)-$OCF_3$ | IfF3-3b |
| R¹-Cyc-Phe-$Z^{12}$-Phe.(F,2)-$OCHF_2$ | IfF3-4b |

| | |
|---|---|
| R$^1$-Cyc-Cyc-Z$^{12}$-Phe.(F,2)-F | IfF3-1c |
| R$^1$-Cyc-Cyc-Z$^{12}$-Phe.(F,2)-CF$_3$ | IfF3-2c |
| R$^1$-Cyc-Cyc-Z$^{12}$-Phe.(F,2)-OCF$_3$ | IfF3-3c |
| R$^1$-Cyc-Cyc-Z$^{12}$-Phe.(F,2)-OCF$_2$ | IfF3-4c |
| R$^1$-Pyd-Phe-Z$^{12}$-Phe.(F,2)-F | IfF3-1d |
| R$^1$-Pyd-Phe-Z$^{12}$-Phe.(F,2)-CF$_3$ | IfF3-2d |
| R$^1$-Pyd-Phe-Z$^{12}$-Phe.(F,2)-OCF$_3$ | IfF3-3d |
| R$^1$-Pyd-Phe-Z$^{12}$-Phe.(F,2)-OCHF$_2$ | IfF3-4d |
| R$^1$-Pyr-Phe-Z$^{12}$-Phe.(F,2)-F | IfF3-1e |
| R$^1$-Pyr-Phe-Z$^{12}$-Phe.(F,2)-CF$_3$ | IfF3-2e |
| R$^1$-Pyr-Phe-Z$^{12}$-Phe.(F,2)-OCF$_3$ | IfF3-3e |
| R$^1$-Pyr-Phe-Z$^{12}$-Phe.(F,2)-OCHF$_2$ | IfF3-4e |
| R$^1$-Phe-Pyd-Z$^{12}$-Phe.(F,2)-F | IfF3-1f |
| R$^1$-Phe-Pyd-Z$^{12}$-Phe.(F,2)-CF$_3$ | IfF3-2f |
| R$^1$-Phe-Pyd-Z$^{12}$-Phe.(F,2)-OCF$_3$ | IfF3-3f |
| R$^1$-Phe-Pyd-Z$^{12}$-Phe.(F,2)-OCHF$_2$ | IfF3-4f |
| R$^1$-Phe-Pyr-Z$^{12}$-Phe.(F,2)-F | IfF3-1g |
| R$^1$-Phe-Pyr-Z$^{12}$-Phe.(F,2)-CF$_3$ | IfF3-2g |
| R$^1$-Phe-Pyr-Z$^{12}$-Phe.(F,2)-OCF$_3$ | IfF3-3g |
| R$^1$-Phe-Pyr-Z$^{12}$-Phe.(F,2)-OCHF$_2$ | IfF3-4g |
| R$^1$-Cyc-Dio-Z$^{12}$-Phe.(F,2)-F | IfF3-1h |
| R$^1$-Cyc-Dio-Z$^{12}$-Phe.(F,2)-CF$_3$ | IfF3-2h |
| R$^1$-Cyc-Dio-Z$^{12}$-Phe.(F,2)-OCF$_3$ | IfF3-3h |
| R$^1$-Cyc-Dio-Z$^{12}$-Phe.(F,2)-OCHF$_2$ | IfF3-4h |
| R$^1$-Phe-Z$^{11}$-Phe-Phe.(F,2)-F | IfF3-5a |
| R$^1$-Phe-Z$^{11}$-Phe-Phe.(F,2)-CF$_3$ | IfF3-6a |
| R$^1$-Phe-Z$^{11}$-Phe-Phe.(F,2)-OCF$_3$ | IfF3-7a |
| R$^1$-Phe-Z$^{11}$-Phe-Phe.(F,2)-OCHF$_2$ | IfF3-8a |
| R$^1$-Cyc-Z$^{11}$-Phe-Phe.(F,2)-F | IfF3-5b |
| R$^1$-Cyc-Z$^{11}$-Phe-Phe.(F,2)-CF$_3$ | IfF3-6b |
| R$^1$-Cyc-Z$^{11}$-Phe-Phe.(F,2)-OCF$_3$ | IfF3-7b |
| R$^1$-Cyc-Z$^{11}$-Phe-Phe.(F,2)-OCHF$_2$ | IfF3-8b |

In these compounds, Phe.(F,2) is in particular Phe, Phe.3F or Phe.3F5F. Compounds of the formulae IfF3-1a–1h, 2a–2h, 3a–3h and 3a–3h (sic) and 4a–4h in which Z$^{12}$ is —COO— and Phe.(F,2) is Phe.2F are additionally preferred. Compounds of the formulae IfF3-1a–1h, 2a–2h, 3a–3h and 4a–4h in which Z$^{12}$ is —CH$_2$CH$_2$- or a single bond and Phe.(F,2) is Phe, Phe.2F, Phe.3F or Phe.3F5F and in particular Phe, Phe.3F and Phe.3F5F are additionally preferred. In the compounds of the formulae IfF-5a, 6a, 7a, 8a, 5b, 6b, 7b and 8b Z$^{11}$ is preferably —CH$_2$CH$_2$— or —COO— and in particular —CH$_2$CH$_2$—. Liquid crystal mixtures which contain one or more of these preferred compounds have particularly favourable properties.

Liquid crystal mixtures which contain at least one of the following particularly preferred 3-ring compounds are additionally particularly preferred:

| | |
|---|---|
| R$^1$-Phe-Phe-Phe-F | IfF3-1a1 |
| R$^1$-Phe-Phe-Phe.2F-F | IfF3-1a2 |
| R$^1$-Phe-Phe-Phe.3F-F | IfF3-1a3 |
| R$^1$-Phe-Phe-Phe.3F5F-F | IfF3-1a4 |
| R$^1$-Phe-Phe-Phe-CF$_3$ | IfF3-1a5 |
| R$^1$-Phe-Phe-Phe.3F-CF$_3$ | IfF3-1a6 |
| R$^1$-Phe-Phe-Phe-OCF$_3$ | IfF3-1a7 |
| R$^1$-Phe-Phe-Phe.3F-OCF$_3$ | IfF3-1a8 |
| R$^1$-Cyc-Phe-Phe-F | IfF3-1b1 |
| R$^1$-Cyc-Phe-Phe.2F-F | IfF3-1b2 |
| R$^1$-Cyc-Phe-Phe.3F-F | IfF3-1b3 |
| R$^1$-Cyc-Phe-Phe.3F5F-F | IfF3-1b4 |
| R$^1$-Cyc-Phe-Phe-CF$_3$ | IfF3-1b5 |
| R$^1$-Cyc-Phe-Phe.3F-CF$_3$ | IfF3-1b6 |
| R$^1$-Cyc-Phe-Phe-OCF$_3$ | IfF3-1b7 |
| R$^1$-Cyc-Phe-Phe.3F-OCF$_3$ | IfF3-1b8 |
| R$^1$-Cyc-Cyc-Phe-F | IfF3-1c1 |
| R$^1$-Cyc-Cyc-Phe.2F-F | IfF3-1c2 |
| R$^1$-Cyc-Cyc-Phe.3F-F | IfF3-1c3 |
| R$^1$-Cyc-Cyc-Phe.3F5F-F | IfF3-1c4 |
| R$^1$-Cyc-Cyc-Phe-CF$_3$ | IfF3-1c5 |
| R$^1$-Cyc-Cyc-Phe.3F-CF$_3$ | IfF3-1c6 |
| R$^1$-Cyc-Cyc-Phe-OCF$_3$ | IfF3-1c7 |
| R$^1$-Cyc-Cyc-Phe.3-OCF$_3$ | IfF3-1c8 |
| R$^1$-Pyd-Phe-Phe-F | IfF3-1d1 |
| R$^1$-Pyd-Phe-Phe.2F-F | IfF3-1d2 |
| R$^1$-Pyd-Phe-Phe.3F-F | IfF3-1d3 |
| R$^1$-Pyd-Phe-Phe.3F5F-F | IfF3-1d4 |
| R$^1$-Pyd-Phe-Phe-CF$_3$ | IfF3-1d5 |
| R$^1$-Pyd-Phe-Phe.3F-CF$_3$ | IfF3-1d6 |
| R$^1$-Pyd-Phe-Phe-OCF$_3$ | IfF3-1d7 |
| R$^1$-Pyd-Phe-Phe.3F-OCF$_3$ | IfF3-1d8 |
| R$^1$-Pyr-Phe-Phe-F | IfF3-1e1 |

R$^1$-Pyr-Phe-Phe.2F-F    IfF3-1 e2
R$^1$-Pyr-Phe-Phe.3F-F    IfF3-1 e3
R$^1$-Pyr-Phe-Phe.3F5F-F  IfF3-1 e4
R$^1$-Pyr-Phe-Phe-CF$_3$    IfF3-1e5
R$^1$-Pyr-Phe-Phe.3F-CF$_3$  IfF3-1 e6
R$^1$-Pyr-Phe-Phe-OCF$_3$   IfF3-1e7
R$^1$-Pyr-Phe-Phe.3F-OCF$_3$  IfF3-1e8 liquid crystal mixtures used according to the invention is preferably 15%–100% and in particular 25%–100%.

Liquid crystal mixtures which are based on the following component mixtures, which each contain at least one compound from the substance classes shown in each case, are particularly suitable for matrix applications, while they are less suitable for network systems, in particular if the mass content of the compounds of the formula IfF and in particular of the preferred sub-formulae or the other terminally fluorinated compounds in the liquid crystal mixture is not more than 10% and in particular not more than 5%.

| | | |
|---|---|---|
| T(IfF)1: | R—Cyc—(COO)$_c$—Phe—C≡C—Phe.(F)—F IV2 | where c = 0 or 1 |
| T(IfF)2: | R—Cyc—(COO)$_c$—Phe—C≡C—Phe.(F)—F II1 | where c = 0 or 1 |
| T(IfF)3: | IfF2-1i or IfF3-1e1 R—Cyc—Cyc—Phe.(F)—X$^5$ | where X$^5$ = F or CN |
| T(IfI)3: | R—Cyc—Cyc—Phe.(F)—X$^5$ R$^1$—Pyr—(Phe)$_c$—Phe—R$^1$ | where X$^5$ = F or CN and c = 0 or 1 |
| T(IfI)4: | IfF2-1i, IfF3-1e1 or IfF3-1d1 IV1 or IV2 | |

Liquid crystal mixtures which contain one or more compounds of the formulae IfF and in particular of the preferred sub-formulae are distinguished by a broad mesogenic range, a relatively high clear point, advantageous values for the birefringence and flow viscosity, low miscibility with the polymer used for the matrix and in particular by advantageous values for the dielectric anisotropy and a high UV and temperature stability.

The liquid crystal mixtures preferably contain 1–40% and in particular 5–30% of compounds of the formula IfF and in particular of the preferred sub-formulae. In this case, the liquid crystal mixtures preferably contain 1–5 and in particular 1–3 compounds of the formula IfF and in particular of the preferred sub-formulae.

Particularly preferred liquid crystal mixtures are those which contain one or more compounds selected from the group of compounds of the formulae IfF, in particular of the formulae IfF2-1–IfF2-4 and IfF3-1–IfF3-8 and very particularly of the preferred sub-formulae, and additionally one or more compounds selected from the group of compounds of the formulae II1–II28, III1–III3 and IV1–IV8. The mass content of the component mixture consisting of at last one compound of the formula IfF and in particular of the formulae IfF2 and IfF3 and very particularly of the preferred sub-formulae and additionally of at least one compound of the formulae II1–II28, III1–III3 and IV1–IV8 in the liquid crystal mixtures used according to the invention is preferably 15%–100% and in particular 25%–100%.

In contrast, liquid crystal mixtures containing component mixtures of this type are in general also preferred for network applications if the mass content of the compounds of the formula IfF and in particular of the preferred sub-formulae or of the other terminally fluorinated compounds contained in these component mixtures is greater than 5%, in particular greater than 10% and very particularly not less than 12.5%. Those liquid crystal mixtures are also preferred both for matrix and for network applications which contain one of the abovementioned component mixtures and additionally one or more compounds selected from the group of compounds Ia, Ic, Id, Ie, IfCl, IfCl.F, Ig, Ih or Ii and in particular of the preferred sub-formulae; in these mixtures the mass content of the terminally fluorinated compounds can also be 5% or less. Liquid crystal mixtures are also preferred both for matrix and for network applications which contain at least one compound of the formula IfF in which U=—CF$_2$, —OCF$_2$ or —OCHF and additionally at least one compound selected from the group of compounds of the formulae III1–II28, III1–III3 and IV1–IV8.

Furthermore, the following component mixtures which contain at least one compound each from the substance classes shown are suitable both for matrix systems and for network systems:

| | | |
|---|---|---|
| T(IfF)5: | R$^1$—Cyc—(CH$_2$CH$_2$)$_d$—Phe.(F,2)—X$^6$ II5 or II16 | where X$^6$ = F, CF$_3$, OCF$_3$ and d = 0.1 |
| T(IfF)6: | R$^1$—Cyc—(CH$_2$CH$_2$)$_d$—Phe.(F,2)—X$^6$ IV1, IV2, IV3, IV4, IV5, IV6, IV7 or IV8 | where X$^6$ = F, CF$_3$, OCF$_3$ and d = 0.1 |
| T(IfF)7: | R$^1$—Cyc—(CH$_2$CH$_2$)$_d$—Phe.(F,2)—X$^6$ II3, II4, II14, II19, II2, II20, II22 or II23 | where X$^6$ = F, CF$_3$, OCF$_3$ and d = 0.1 |
| T(IfF)8: | R$^1$—Cyc—(CH$_2$CH$_2$)$_d$—Phe.(F,2)—X$^6$ II1 or II9 | where X = F, CF$_3$, OCF$_3$ and d = 0.1 |
| T(IfF)9: | R$^1$—Pyr—Phe.(F)—X$^6$ II6 or II16 | where X$^6$ = F, CF$_3$, OCF$_3$ |
| T(IfF)10: | R$^1$—Pyr—Phe.(F)—X6 IV1, IV2, IV3, IV4, IV5, IV6, IV7 or IV8 | where X$^6$ = F, CF$_3$, OCF$_3$ |
| T(IfF)11: | R$^1$—Pyr—Phe.(F)—X$^6$ II3, II4, II14, II19, II2, II20, II22 or II23 | where X$^6$ = F, CF$_3$, OCF$_3$ |
| T(IfF)12: | R$^1$—Pyd—Phe.(F)—X$^6$ II1 or II9 | where X$^6$ = F, CF$_3$, OCF$_3$ |

-continued

| | | |
|---|---|---|
| T(IfF)13: | $R^1$—Pye—Phe.(F)—$X^6$<br>II5 or II16 | where $X^6$ = F, $CF_3$, $OCF_3$ |
| T(IfF)14: | $R^1$—Pyd—Phe.(F)—$X^6$<br>IV1, IV2, IV3, IV4, IV5<br>or IV6 | where $X^6$ = F, $CF_3$, $OCF_3$ |
| T(IfF)15: | $R^1$—Pyr—Phe.(F)—$X^6$<br>II3, II4, II14, II19, II2,<br>II20, II22 or II23 | where $X^6$ = F, $CF_3$, $OCF_3$ |
| T(IfF)16: | $R^1$—Dio—Phe.(F)—$X^6$<br>III1, III2 or III3 | where $X^6$ = F, $CF_3$, $OCF_3$ |
| T(IfF)17: | $R^1$—Dio—Phe.(F)—$X^6$<br>II5 or II16 | where $X^6$ = F, $CF_3$, $OCF_3$ |
| T(IfF)18: | $R^1$—Dio—Phe.(F)—$X^6$<br>IV1, IV2, IV3, IV, IV7<br>or IV8 | where $X^6$ = F, $CF_3$, $OCF_3$ |
| T(IfF)19: | $R^1$—Dio—Phe.(F)—$X^6$<br>II1 or II9 | where $X^6$ = F, $CF_3$, $OCF_3$ |
| T(IfF)20: | $R^1$—Cyc—Cyc—$(CH_2CH_2)_d$—Phe.(F,2)—$X^6$<br>II5 or II16 | where $X^6$ = F, $CF_3$, $OCF_3$<br>and d = 0.1 |
| T(IfF)21: | $R^1$—Cyc—Cyc—$(CH_2CH_2)_d$—Phe.(F,2)—$X^6$<br>IV1, IV2, IV3, IV4<br>IV5, IV6, IV7 or IV8 | where $X^6$ = F, $CF_3$, $OCF_3$<br>and d = 0.1 |
| T(IfF)22: | $R^1$—Cyc—Cyc—$(CH_2CH_2)_d$—Phe.(F,2)—$X^6$<br>II3, II4, II14, II19,<br>II2, II20, II22 or II23 | where $X^6$ = F, $CF_3$, $OCF_3$<br>and d = 0.1 |
| T(IfF)23: | $R^1$—Cyc—Cyc—$(CH_2CH_2)_d$—Phe.(F,2)—$X^6$<br>II1 or II9 | where $X^6$ = F, $CF_3$, $OCF_3$<br>and d = 0.1 |
| T(IfF)24: | $R^1$—Pyd—Phe—Phe.(F)—$X^6$<br>II5 or II16 | where $X^6$ = F, $CF_3$, $OCF_3$<br>$OCHF_2$ |
| T(IfF)25: | $R^1$—Pyd—Phe—Phe.(F)—$X^6$<br>II1 or II9 | where $X^6$ = F, $CF_3$, $OCF_3$<br>$OCHF_2$ |
| T(IfF)26: | $R^1$—Pi—Phe—Phe.(F)—$X^6$<br>IV1, IV2, IV3 or IV4 | where $X^6$ = F, $CF_3$, $OCF_3$<br>$OCHF_2$ |
| T(IfF)27: | $R^1$—Pyr—Phe—Phe.(F)—$X^6$<br>II5 or II16 | where $X^6$ = F, $CF_3$, $OCF_3$<br>$OCHF_2$ |
| T(IfF)28: | $R^1$—Pyr—Phe—Phe.(F)—$X^6$<br>II1 or II9 | where $X^6$ = F, $CF_3$, $OCF_3$<br>$OCHF_2$ |
| T(IfF)29: | $R^1$—Pyr—Phe—Phe.(F)—$X^6$<br>IVI, IV2, IV3, IV4, IV5<br>or IV6 | where $X^6$ = F, $CF_3$, $OCF_3$<br>$OCHF_2$ |

Liquid crystal mixtures which are based on the following component mixtures T (IfF) 30–35, which contain at least one compound each from the compound classes of the formulae mentioned in each case, are preferred. In the table, the preferred mass content of these compounds in the component mixtures is additionally indicated. The component mixtures contain 2–38, preferably 2–35 and in particular 2–25 compounds; the sum of the mass contents of these compounds in the component mixture is 100%. The mass content of the component mixture in the liquid crystal according to the invention is between 10% and 100%, in particular between 15% and 100% and very particularly between 25% and 100%.

| Mixture | Formula | Mass content in the component mixture [%] |
|---|---|---|
| T(IfF)30 | IfF | 5-75, in particular 5-55 |
| | II | 5-85, in particular 6-65 |
| T(IfF)31 | IfF | 5-55 |
| | III | 2-29 |
| T(IfF)32 | IfF | 5-75, in particular 5-60 |
| | IV | 5-63 |
| T(IfF)33 | IfF | 5-55 |
| | II | 5-65, in particular 5-52 |
| | III | 5-29 |
| T(IfF)34 | IfF | 5-50 |
| | II | 5-72, in particular 5-52 |
| | IV | 5-56, in particular 5-46 |

-continued

| Mixture | Formula | Mass content in the component mixture [%] |
|---|---|---|
| T(IfF)35 | IfF | 5-50 |
| | II | 5-75, in particular 5-47 |
| | III | 5-37, in particular |
| | IV | 5-50, in particular 5-42 |

Those compounds of the formula If, in which $T^2$ is Cl and v is 0 are additionally preferred

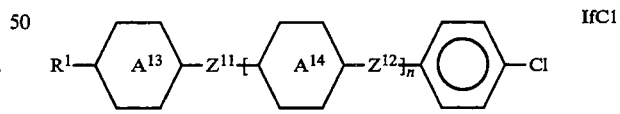
IfCl where the meaning of $R^1$ is given above.

The compounds of the formula IfCl include the following preferred 2- and 3-ring compounds of the sub-formulae IfCl2-1–IfCl2-8 and IfCl3-1–IFCl3-47:

$R^1$-Phe-Phe-Cl      IfCl2-1

$R^1$-Pyr-Phe-Cl      IfCl2-2

$R^1$-Cyc-Phe-Cl      IfCl2-3

$R^1$-Phe-C-C-Phe-Cl      IfCl2-4

$R^1$-Phe-COO-Phe-Cl      IfCl2-5

| | |
|---|---|
| R¹-Phe-OOC-Phe-Cl | IfCl2-6 |
| R¹-Pyd-Phe-Cl | IfCl2-7 |
| R¹-Cyc-COO-Phe-Cl | IfCl2-8 |
| R¹-Phe-Phe-Phe-Cl | IfCl3-1 |
| R¹-Cyc-Phe-Phe-Cl | IfCl3-2 |
| R¹-Cyc-Cyc-Phe-Cl | IfCl3-3 |
| R¹-Phe-Cyc-Phe-Cl | IfCl3-4 |
| R¹-Phe-CH₂CH₂-Phe-Phe-Cl | IfCl3-5 |
| R¹-Phe-COO-Phe-Phe-Cl | IfCl3-6 |
| R¹-Phe-Phe-CH₂CH₂-Phe-Cl | IfCl3-7 |
| R¹-Phe-Phe-COO-Phe-Cl | IfCl3-8 |
| R¹-Phe-Phe-OOC-Phe-Cl | IfCl3-9 |
| R¹-Cyc-CH₂CH₂-Phe-Phe-Cl | IfCl3-10 |
| R¹-Cyc-COO-Phe-Phe-Cl | IfCl3-11 |
| R¹-Cyc-Phe-CH₂CH₂—Cl | IfCl3-12 |
| R¹-Cyc-Phe-C-C-Phe-Cl | IfCl3-13 |
| R¹-Cyc-CH₂CH₂-Phe-C-C-Phe-Cl | IfCl3-14 |
| R¹-Cyc-Phe-COO-Phe-Cl | IfCl3-15 |
| R¹-Cyc-Phe-OOC-Phe-Cl | IfCl3-16 |
| R¹-Cyc-CH₂CH₂-Phe-COO-Phe —Cl | IfCl3-17 |
| R¹-Phe-Cyc-COO-Phe-Cl | IfCl3-18 |
| R¹-Phe-COO-Cyc-Phe-Cl | IfCl3-19 |
| R¹-Phe-OOC-Cyc-Phe-Cl | IfCl3-20 |
| R¹-Cyc-Cyc-CH₂CH₂-Phe-Cl | IfCl3-21 |
| R¹-Cyc-Cyc-COO-Phe-Cl | IfCl3-22 |
| R¹-Cyc-Cyc-OOC-Phe-Cl | IfCl3-23 |
| R¹-Cyc-CH₂CH₂-Cyc-COO-Phe-Cl | IfCl3-24 |
| R¹-Cyc-CH₂CH₂-Cyc-Phe-Cl | IfCl3-25 |
| R¹-Cyc-COO-Cyc-Phe-Cl | IfCl3-26 |
| R¹-Cyc-OOC-Cyc-Phe-Cl | IfCl3-27 |
| R¹-Phe-COO-Phe-COO-Phe-Cl | IfCl3-28 |
| R¹-Phe-COO-Phe-OOC-Phe-Cl | IfCl3-29 |
| R¹-Phe-OOC-Phe-COO-Phe-Cl | IfCl3-30 |
| R¹-Phe-OOC-Phe-OOC-Phe-Cl | IfCl3-31 |
| R¹-Cyc-COO-Phe-COO-Phe-Cl | IfCl3-32 |
| R¹-Cyc-COO-Phe-OOC-Phe-Cl | IfCl3-33 |
| R¹-Cyc-OOC-Phe-OOC-Phe-Cl | IfCl3-34 |
| R¹-Cyc-OOC-Phe-COO-Phe-Cl | IfCl3-35 |
| R¹-Cyc-COO-Cyc-COO-Phe-Cl | IfCl3-36 |
| R¹-Cyc-OOC-Cyc-COO-Phe-Cl | IfCl3-37 |
| R¹-Cyc-COO-Cyc-OOC-Phe-Cl | IfCl3-38 |
| R¹-Cyc-OOC-Cyc-OOC-Phe-Cl | IfCl3-39 |
| R-Pyr-Phe-Phe-Cl | IfCl3-40 |
| R-Pyd-Phe-Phe-Cl | IfCl3-41 |
| R-Phe-Pyr-Phe-Cl | IfCl3-42 |
| R-Phe-Pyd-Phe-Cl | IfCl3-43 |
| R-Cyc-Pyr-Phe-Cl | IfCl3-44 |
| R-Cyc-Pyd-Phe-Cl | IfCl3-45 |
| R-Pyr-CH₂CH₂-Phe-Phe-Cl | IfCl3-46 |
| R-Pyd-CH₂CH₂-Phe-Phe-Cl | IfCl3-47 |

In the compounds of the formulae IfCl2 and IfCl3, R¹ is preferably alkyl, alkenyl or alkoxyhaving 1-10, but in particular having 1-8, C atoms, where the straight-chain radicals are preferred. Additionally preferred are n-alkoxyalkyl compounds and in particular n-alkoxymethyl and n-alkoxyethyl compounds.

Very particularly preferred compounds are those of the formulae IfCl2-1–IfCl2-8 and IfCl3-1–IfCl3-47, in which R¹ is methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethly (sic), propoxymethyl, butoxymethyl, methoxyethyl, ethoxyethyl or propoxyethyl.

The compounds of the formula IfCl and the preferred sub-formulae IfCl2-1–IfCl2-8 and IfCl3-1–IfCl3-47 are for the largest part known and, for example, described in JP 60/260679 A2, JP 59/81375 A2, EP 0,123,907, JP 58/79938 A2, DE 3,136,624, J. Malthete et al., Mol. Cryst. Liq. Cryst. 23, 233 (1973), J. Malthete et al., J.Phys. Colloq. 37, C3 1 (1976), J.P. van Meter et al., Mol. Cryst. Liq. Cryst. 22, 271 (1973), M.E. Neubert, et al., Mol. Cryst. Liq. Cryst. 135, 283 (1986), JP 56/120641 A2, EP 152,014, DE 3,139,130, H.J. MUller et al., Mol. Cryst. Liq. Cryst. 92, 63 (1983), JP 61/225147 A2, JP 57/183727 A2, DE 3, 139, 130 (sic), G.W. Gray and J.W. Goodby, Mol. Cryst. Liq. Cryst. 37, 157 (1976), JP 57/118538 A2, H. Takatsu et al., Mol. Cryst. Liq. Cryst. 100, 345 (1983), DE 3,233,641, GB 2,071,1131 (sic), S.M. Kelly and Hp. Schad, Helv. Chim. Acta 68, 1444 (1985), U.S. Pat. No. 4,726,910, R. Dabrowski et al., Moll Cryst. Liq. Cryst. 107,411 (1984), JP 56/120641 A2, JP 57/31645 A2, JP 60/41638 A2, JP 59/29640 A2, DE 3,317,507, GB 2,070,593, JP 57/54148 A2, H. Takatsu et al., Mol. Cryst. Liq. Cryst. 108, 157 (1984), JP 59/113081 A2, EP 102,047, J.P. van Meter, Mol. Cryst. Liq. Cryst. 22, 285 (1973), H.-J. Deutscher et al., J. Prakt. Chem. 321, 47 (1979), H.-J. Deutscher et al., J. Prakt. Chem. 321, 969 (1979), H.-J. Deutscher et al., J. Prakt. Chem. 321, 47 (1979), JP 58/47 45 A2.

Liquid crystal mixtures which contain one or more compounds selected from the group of compounds of the formulae IfCl and in particular of the preferred compounds of the formulae IfCl2-1–IfCl2-8 and IfCl3-1–IfCl3-47 are distinguished by advantageous values for the birefringence Δn and the dielectric anisotropy, a high stability, comparatively simple preparation capability, low miscibility with the polymer used for the matrix and in particular by a broad mesogenic range, a relatively high clear point, advantageous values for the flow viscosity and the temperature dependence of the electrooptical parameters.

The liquid crystal mixtures according to the invention preferably contain 1–40% and in particular 5–30% of compounds of the formula IfCl and in particular of the preferred sub-formulae; in this case, the liquid crystal mixtures preferably contain 1–5 and in particular 1–3 compounds of the formula IfCl and in particular of the preferred sub-formulae.

Particularly preferred liquid crystal mixtures are those which contain one or more compounds selected from the group of compounds of the formula IfCl and in particular of the formulae IfCl2-1–IfCl2-8 and IfCl3-1–IfCl3-47, and additionally at least one compound selected from the group of compounds of the formulae II1–II28, III1–III3 and IV1–IV8. The mass content of the component mixture consisting of at least one compound of the formulae IfCl and in particular of the preferred sub-formulae and additionally of at least one compound of the formulae II1–II28, III1–III3 and IV-1–IV8 in the liquid crystal mixtures used according to the invention is preferably 15%–100% and in particular 25%–100%.

Very particularly preferred liquid crystal mixtures are those which contain at least one compound from the following group C and at least one compound from the following group D:

| Group C | Group D |
| --- | --- |
| IfC12-1, IfC12-2, | II1, II2, II3, II4, II5, 116, |
| IfC12-3, IfC12-7, | II7, II8, II9, II10, II11, |
| IfC12-8, IfC13-1, | II15, II16, II17, II21, II22, |
| IfC13-2, IfC13-3, | II23, II25, II2, II27, II28, |
| IfC13-40, IfC13-41, | III1, III2, IV1, IV2, IV3, IV4, |
| IfC13-43, IfC13-43, | IV5, IV6, IV7, IV8 |
| IfC13-44, IfC13-45, | |
| IfC13-46, IfC13-47 | |

Liquid crystal mixtures which are based on the following component mixtures T (ICl) 1–3, which contain at least one compound each from the compound classes of the formulae mentioned in each case, are preferred. In the table, the preferred mass content of these compounds in the component mixtures is additionally indicated. The component mixtures contain 2–38, preferably 2–35, and in particular 2–25 compounds; the sum of the mass contents of these compounds in the component mixture is 100%. The mass content of the component mixture in the liquid crystal according to the invention is between 10% and 100%, in particular between 15% and 100% and very particularly between 25% and 100%.

| Mixture | Formula | Mass content in the component mixture [%] |
| --- | --- | --- |
| T(ICl)1 | ICl | 5-55 |
| | II | 5-75, in particular 5-65 |
| T(ICl)2 | ICl | 5-50 |
| | IV | 5-75, in particular 5-70 |
| T(ICl)3 | ICl | 5-45, in particular 5-40 |

| Mixture | Formula | Mass content in the component mixture [%] |
| --- | --- | --- |
| | IV | 5-53 |

Those compounds of the formula If in which

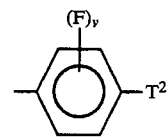

is Phe.3F-Cl or Phe.3F5F-Cl,

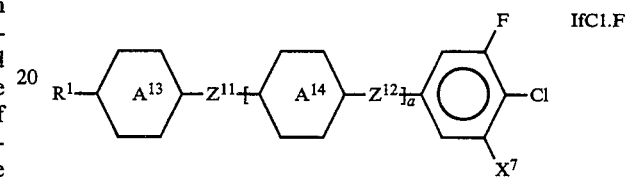

where the meaning of $R^1$ is given above and $X^7$ is F or H, are additionally preferred.

The compounds of the formula IfCl.F include 2- and 3-ring compounds of the formulae

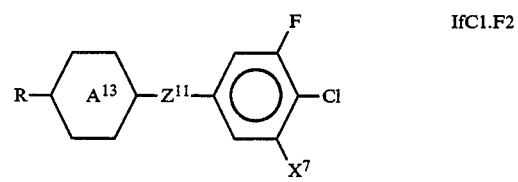

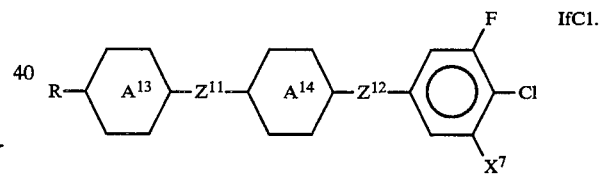

In the 2-ring compounds of the formulae I fCl.F2,

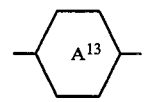

is preferably Phe, Phe. F, Cyc, Pyr, Pyd or Dio and in particular Phe, Cyc, Pyd or Dio. $Z^{11}$ is a single bond, —COO—, —OCO— or —CH$_2$CH$_2$— and in particular a single bond, —CH$_2$CH$_2$— or —COO—.

The following small group of 2-ring compounds of the formulae IfCl.F2-1–IfCl.F2-19 is particularly preferred.

| R-Phe-Phe.3F-Cl | IfCl.F2-1 |
| R-Phe.3F-Phe.3F-Cl | IfCl.F2-2 |
| R-Cyc-Phe.3F-Cl | IfCl.F2-3 |
| R-Pyr-Phe.3F-Cl | IfCl.F2-4 |
| R-Pyd-Phe.3F-Cl | IfCl.F2-5 |

| | |
|---|---|
| R-Dio-Phe.3F-Cl | IfCl.F2-6 |
| R-Phe-CH$_2$CH$_2$-Phe.3F-Cl | IfCl.F2-7 |
| R-Phe-COO-Phe.3F-Cl | IfCl.F2-8 |
| R-Cyc-CH$_2$CH$_2$-Phe.3F-Cl | IfCl.F2-9 |
| R-Cyc-COO-Phe.3F-Cl | IfCl.F2-10 |
| R-Cyc-OCO—Phe.3F-Cl | IfCl.F2-11 |
| R-Phe-Phe.3F5F-Cl | IfCl.F2-12 |
| R-Cyc-Phe.3F5F-Cl | IfCl.F2-13 |
| R-Pyr-Phe.3F5F-Cl | IfCl.F2-14 |
| R-Pyd-Phe.3F5F-Cl | IfCl.F2-15 |
| R-Dio-Phe.3F5F-Cl | IfCl.F2-16 |
| R-Phe-CH$_2$CH$_2$-Phe.3F5F-Cl | IfCl.F2-17 |
| R-Phe-COO-Phe.3F5F-Cl | IfCl.F2-18 |
| R-Cyc-CH$_2$CH$_2$-Phe.3F5F-Cl | IfCl.F2-19 |

In the 3-ring compounds of the formulae IfCl.F3, $Z^{11}$ and $Z^{12}$ independently of one another are a single bond, —COO—, —OCO—, or —CH$_2$CH$_2$—; one of the bridge groups $Z^{11}$ and $Z^{12}$ is preferably a single bond.

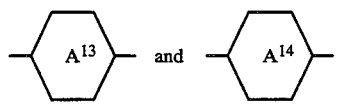

are preferably independently of one another Phe, Phe.F, Cyc, Pyr, Pyd or Dio; if one of

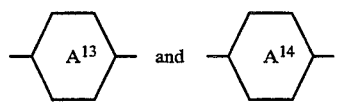

is a heterocyclic compound, the other ring is preferably Phe, Phe.F or Cyc and in particular Phe or Cyc.

The following small group of 3-ring compounds of the formulae IfCl.F3-1–IfCl.F3-38 is particularly preferred:

| | |
|---|---|
| R$^1$-Phe-Phe. F-Phe.3F-Cl | IfCl.F3-1 |
| R$^1$-Phe-Phe-Phe.3F-Cl | IfCl.F3-2 |
| R$^1$-Cyc-Phe-Phe.F-Phe.3F-Cl | IfCl.F3-3 |
| R$^1$-Cyc-Cyc-Phe.3F-Cl | IfCl.F3-4 |
| R$^1$-Phe-Pyr-Phe.3F-Cl | IfCl.F3-5 |
| R$^1$-Phe-Pyd-Phe.3F-Cl | IfCl.F3-6 |
| R$^1$-Dio-Cyc-Phe.3F-Cl | IfCl.F3-7 |
| R$^1$-Dio-Phe-Phe.3F-Cl | IfCl.F3-8 |
| R$^1$-Pyr-Phe-Phe.3F-Cl | IfCl.F3-9 |
| R$^1$-Pyd-Phe-Phe.3F-Cl | IfCl.F3-10 |
| R$^1$-Cyc-Pyr-Phe.3F-Cl | IfCl.F3-11 |
| R$^1$-Cyc-Pyd-Phe.3F-Cl | IfCl.F3-12 |
| R$^1$-Phe.F-Pyd-Phe.3F-Cl | IfCl.F3-13 |
| R$^1$-Pyd-Phe.F-Phe.3F-Cl | IfCl.F3-14 |
| R$^1$-Cyc-CH$_2$CH$_2$-Phe-Phe.3F-Cl | IfCl.F3-15 |
| R$^1$-Cyc-Cyc-CH$_2$CH$_2$-Phe.3F-Cl | IfCl.F3-16 |
| R$^1$-Dio-Cyc-CH$_2$CH$_2$-Phe.3F-Cl | IfCl.F3-17 |
| R$^1$-Dio-Phe-CH$_2$CH$_2$-Phe.3F-Cl | IfCl.F3-18 |
| R$^1$-Phe-Phe.F-CH$_2$CH$_2$-Phe.3F-Cl | IfCl.F3-19 |
| R$^1$-Phe-COO-Phe.F-Phe.3F-Cl | IfCl.F3-20 |
| R$^1$-Phe-COO-Phe-COO-Phe.3F-Cl | IfCl.F3-21 |
| R$^1$-Cyc-COO-Phe-Phe.3F-Cl | IfCl.F3-22 |
| R$^1$-Cyc-Phe-COO-Phe.3F-Cl | IfCl.F3-23 |
| R$^1$-Cyc-COO-Cyc-Phe.3F-Cl | IfCl.F3-24 |
| R$^1$-Cyc-Cyc-COO-Phe3.F-Cl | IfCl.F3-25 |
| R$^1$-Phe-Phe-Phe.3F5F-Cl | IfCl.F3-26 |
| R$^1$-Cyc-Phe-Phe.3F5F-Cl | IfCl.F3-27 |
| R$^1$-Cyc-Cyc-Phe.3F5F-Cl | IfCl.F3-28 |
| R$^1$-Pyr-Phe-Phe.3F5F-Cl | IfCl.F3-29 |
| R$^1$-Pyd-Phe-Phe.3F5F-Cl | IfCl.F3-30 |
| R$^1$-Phe-Pyr-Phe.3F5F-Cl | IfCl.F3-31 |
| R$^1$-Phe-Pyd-Phe.3F5F-Cl | IfCl.F3-32 |
| R$^1$-Dio-Phe-Phe.3F5F-Cl | IfCl.F3-33 |
| R$^1$-Cyc-CH$_2$CH$_2$-Phe-Phe.3F5F-Cl | IfCl.F3-34 |
| R$^1$-Cyc-Cyc-CH$_2$CH$_2$-Phe.3F5F-Cl | IfCl.F3-35 |
| R$^1$-Phe-Phe-COO-Phe.3F5F-Cl | IfCl.F3-36 |
| R$^1$-Cyc-COO-Phe-Phe.3F5F-Cl | IfCl.F3-37 |
| R$^1$-Cyc -Cyc-COO-Phe.3F5F-Cl | IfCl.F3-38 |

In the compounds of the formulae IfCl.F and in particular of the preferred sub-formulae IfCl.F2-1–IfCl.F2-19 and IfCl.F3-1–IfCl.F3-28, R$^1$ is preferably alkyl, alkoxy, alkoxyalkyl and alkenyl having 1–10 C atoms. R$^1$ is particularly preferably methyl, ethyl, propyl, butyl, pentyl, hexyl, heptyl, octyl, nonyl, decyl, methoxy, ethoxy, propoxy, butoxy, pentoxy, hexoxy, heptoxy, octoxy, nonoxy, decoxy, methoxyethyl, ethoxyethyl or propoxyethyl.

The compounds of the formula IfCl.F2 and IfCl.F3 are preferably prepared by the processes described in DE 3,929,525.

Liquid crystal mixtures which contain one or more compounds selected from the group of compounds of the formula IfCl.F and in particular of the formulae IfCl.F2-1 (lacuna) IfCl.F2-19 and IfCl.F3-1–IfCl.F3-38 are characterized by advantageous values for the birefringence, the clear point and the viscosity and in particular by advantageous values for $\Delta\epsilon$, a high UV and temperature stability and a high specific resistance. These mixtures are preferred.

The liquid crystal mixtures preferably contain 1–40% and in particular 5–30% of compounds of the formula IfCl.F and in particular of the preferred sub-formulae. In this connection, the liquid crystal mixtures preferably contain 1–5 and in particular 1–3 compounds of the formula IfCl.F and in particular of the preferred sub-formulae.

The person skilled in the art can always select from the limited group of compounds of the formula IfCl.F and in particular from the smaller group of compounds of the formulae IfCl.F2-1–IfCl.F2-19 and IfCl.F3-1–IfCl.F3-38 without inventive assistance in such a way that the liquid crystal and the electrooptical system filled with it is optimized within certain limits with respect to the particular application. If the liquid crystal mixture is intended to have, for example, a high or even very high birefringence, the person skilled in the art will preferably select those compounds of the formulae IfCl.F and in particular of the preferred sub-formulae which have no saturated ring systems, such as, for example, the compounds of the formulae IfCl.F2-1, IfCl.F2-2, IfCl.2-4, IfCl.F2-5, IfCl.F2-7, IfCl.F2-8, IfCl.F2-12, IfCl.F2-14, IfCl.F2-15, IfCl.F2-17, IfCl.F2-18, IfCl.F3-1, IfCl.F3-2, IfCl.F3-5, IcF1.F3-6, IfCl.F3-9, IfCl.F3-10, IfCl.F3-13, IfCl.F3-14, IfCl.F3-19, IfCl.F3-20, IfCl.F3-21, IfCl.F3-26, IfCl.F3-29, IfCl.F3-30, IfCl.F3-31, IfCl.F3-32 and IfCl.F3-36.

Additionally, for example, for mixtures which are intended to have a relatively high or high $\Delta\epsilon$, compounds can advantageously be used which have a Pyridine or pyrimidine ring and/or a Phe.3F5F-Cl group.

Particularly preferred liquid crystal mixtures are those which contain one or more compounds selected from the group of compounds of the formula IfCl.F and in particular of the preferred compounds of the formulae IfCl.F2-1–IfCl.F2-19 and IfCl.F3-1–IfCl.F3-38, and additionally one or more compounds selected from the group of compounds II1–II27, III1–III3 and IV1–IV8. The mass content of the component mixture consisting of at least one compound of the formula IfCl.F and in particular of the preferred sub-formulae and additionally of at least one compound of the formulae II1–II27, III1–III3 and IV1–IV8 in the liquid crystal mixture used according to the invention is preferably 15%–100%, but in particular 25%–100%.

The following component mixtures T(IfCl.F), which contain at least one compound each from the substance classes shown, are particularly preferred and suitable both for matrix applications and network systems:

| T(IfCl.F)1: | IfCl.F2-1 and/or IfCl.F2-12 III1 |
|---|---|
| T(IfCl.F)2: | IfCl.F2-1 and/or IfCl.F2-12 II5 |
| T(IfCl.F)3: | IfCl.F2-1 and/or IfCl.F2-12 IV1 |
| T(IfCl.F)4: | IfCl.F2-1 and/or IfCl.F2-12 IV2 |
| T(IfCl.F)5: | IfCl.F2-3 and/or IfCl.F2-13 II1 |
| T(IfCl.F)6: | IfCl.F2-3 and/or IfCl.F2-13 II5 |
| T(IfCl.F)7: | IfCl.F2-3 and/or IfCl.F2-13 III1 |
| T(IfCl.F)8: | IfCl.F2-3 and/or IfCl.F2-13 IV1 |
| T(IfCl.F)9: | IfCl.F2-3 and/or IfCl.F2-13 IV2 |
| T(IfCl.F)10: | IfCl.F2-4 III1 |
| T(IfCl.F)11: | IfCl.F2-4 II5 |
| T(IfCl.F)12: | IfCl.F2-4 IV4 |
| T(IfCl.F)13: | IfCl.F2-4 IV5 |
| T(IfCl.F)14: | IfCl.F2-5 III1 |
| T(IfCl.F)15: | IfCl.F2-5 II5 |
| T(IfCl.F)16: | IfCl.F2-5 IV4 |
| T(IfCl.F)17: | IfCl.F2-5 IV5 |
| T(IfCl.F)18: | IfCl.F3-3 and/or IfCl.F3-27 III1 |
| T(IfCl.F)19: | IfCl.F3-3 and/or IfCl.F3-27 II5 |
| T(IfCl.F)20: | IfCl.F3-3 and/or IfCl.F3-27 IV1 |
| T(IfCl.F)21: | IfCl.F3-3 and/or IfCl.F3-27 IV5 |
| T(IfCl.F)22: | IfCl.F3-3 and/or IfCl.F3-27 II4 |
| T(IfCl.F)23: | IfCl.F3-4 and/or IfCl.F3-28 III1 |
| T(IfCl.F)24: | IfCl.F3-4 and/or IfCl.F3-28 II4 or II5 |
| T(IfCl.F)25: | IfCl.F3-4 and/or IfCl.F3-28 II6 |
| T(IfCl.F)26: | IfCl.F3-4 and/or IfCl.F3-28 III1 |
| T(IfCl.F)27: | IfCl.F3-4 and/or IfCl.F3-28 IV1 |
| T(IfCl.F)28: | IfCl.F3-4 and/or IfCl.F3-28 IV2 |

Liquid crystal mixtures which, in addition to a dielectrically positive component A consisting of dielectrically positive compounds having $\Delta\epsilon > 2$, contains (sic) a dielectrically neutral component B consisting of compounds having $-2 \leq \Delta\epsilon \leq +2$, and optionally a dielectrically negative component C consisting of compounds having $\Delta\epsilon < -2$ are additionally preferred.

If the mass content of the dielectrically positive compounds in the liquid crystal is designated by a, that of the dielectrically neutral compounds by b and that of the dielectrically negative compounds correspondingly by c, a is $\geq 30\%$ and in particular a is $> 50\%$. If the dielectrically positive component A is based, in particular, on carbonitriles, the liquid crystal preferably contains a dielectrically neutral component in order to suppress the formation of dimers having dipole moments correlated in antiparallel fashion. The quotient of the mass content of dielectrically positive and neutral components is preferably $$35 \geq \frac{a}{b} \geq 0.5$$

and in particular $$15 \geq \frac{a}{b} \geq 1$$

If, on the other hand, the liquid crystal is based predominantly on liquid crystal compounds which contain F, Cl, $CF_3$, $OCF_3$, $OCHF_2$ (sic) or NCS as a polar terminal group, the content of dielectrically neutral compounds may be small or even 0; preferably b is ≦45%, inparticular b is ≦35% andveryparticularly b is ≦25%.

The content of dielectrically negative compounds is in general small, as low switch voltages are customarily desired. Preferably, c is ≦10% and in particular c is ≦5%; liquid crystal mixtures having c≦3% are in general particularly preferred.

Preferred liquid crystals are those which contain one or more dielectrically neutral compounds of the formula Ig $R^1$-$Q^4$-COO-$Q^5$-$R^2$   Ig in which
the radicals
$Q^4$ and $Q^5$ in each case independently of one another are

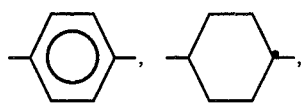

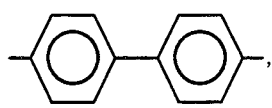

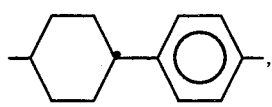

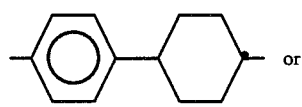 or

and one of $Q^4$ and $Q^5$ is also

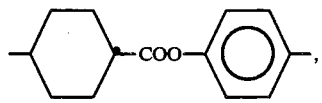

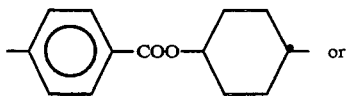 or

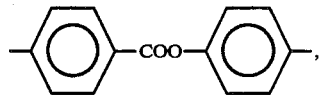

and
$R^1$ and $R^2$ in each case independently of one another have the meaning given in claim 1.

The compounds of the formula Ig include 2-ring compounds of the formula Ig2-1 and Ig2-2 which are preferred:

$R^1$-Phe-COO-Phe-$R^2$   Ig2-1

$R^1$-Cyc-COO-Phe-$R^2$   Ig2-2

In the compounds of the formulae Ig2-1 and Ig2-2, $R^1$ and $R^2$ independently of one another are preferably alkyl or alkoxy having 1-10, but in particular having 1-8, C atoms, additionally also n-alkoxyalkyl and in particular n-alkoxymethyl and n-alkoxyethyl. One of the two 2,4-Phenylene groups of the compounds of the formula Ig2-1 and the 1,4-phenylene group of the compound of the formula Ig2-2 can be substituted in the 2- or 3-position by Cl or F, but in particular by F and/or in the 3-position.

Particularly preferred compounds are those of the formulae

| | |
|---|---|
| $R^1$-Phe-COO-Phe-alkyl or alkoxy | Ig2-1a |
| $R^1$-Phe-COO-Phe.3F-alkyl or alkoxy | Ig2-1b |
| $R^1$-Phe-COO-Phe.2F-alkyl or alkoxy | Ig2-1c |
| $R^1$-Phe-COO-Phe.3F-alkoxymethyl | Ig2-1d |
| $R^1$-Cyc-COO-Phe-alkyl or alkoxy | Ig2-2a |
| $R^1$-Cyc-COO-Phe.2F-alkyl or alkoxy | Ig2-2b |
| $R^1$-Cyc-COO-Phe.3F-alkyl or alkoxy | Ig2-2c |

The compounds of the formula Ig additionally include 3-ring compounds in which one of the radicals $Q^1$ or $Q^2$ is 1,4-phenylene or trans-1,4-cyclohexylene and the other is

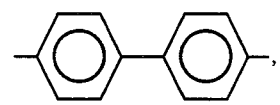

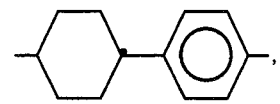

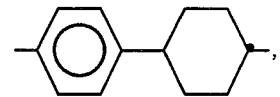

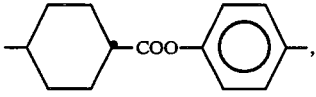

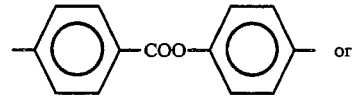 or

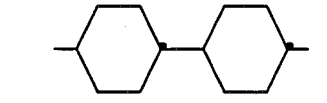

Preferred compounds are those of the formulae

| | |
|---|---|
| $R^1$-Phe-COO-Phe.(F) -Phe. $R^2$ | Ig3-1 |
| $R^1$-Phe-Phe-COO-Phe.(F).$R^2$ | Ig3-2 |

| | |
|---|---|
| $R^1$-Cyc-Phe.(F)-COO-Phe.(F)-$R^2$ | Ig3-3 |
| $R^1$-Cyc-COO-Phe-COO-Phe.(F) -$R^2$ | Ig3-4 |
| $R^1$-Phe-COO-Phe.(F)-COO-Phe-$R^2$ | Ig3-5 |
| $R^1$-Cyc-Cyc-COO-Phe.(F) -$R^2$ | Ig3-6 |
| $R^1$-Phe-COO-Cyc-Cyc-$R^2$ | Ig3-7 |
| $R^1$-Cyc-OCO-Phe-Cyc-$R^2$ | Ig3-8 |
| $R^1$-Cyc-COO-Phe.(F)-Phe-$R^2$ | Ig3-9 |
| $R^1$-Phe.(F)-Phe-COO-Cyc-$R^2$ | Ig3-10 |

In the compounds of the sub-formulae Ig3-1–Ig3-10, $R^1$ and $R^2$ are preferably independently of one another n-alkyl or n-alkoxy having 1–10 C atoms, and in addition also n-alkoxymethyl or n-alkoxyethyl having 1–8 C atoms. The compounds of the formula Ig3-1–Ig3-10 can be laterally monosubstituted on one of the 1,4-phenylene groups by X=F or Cl, where substitution by F and/or (lacuna) in the 3-position is preferred.

Laterally un- or monosubstituted compounds of the formulae Ig3-1, Ig3-2, Ig3-3, Ig3-5, Ig3-6, Ig3-8, Ig3-9 and Ig3-10 are very particularly preferred, in which $R^1$ and $R^2$ independently of one another are methyl, ethyl, propyl, butyl, pentyl, hexyl, heptyl, octyl, methoxy, ethoxy, propox-y, butoxy, pentoxy, hexoxy, methoxymethyl, ethoxymethyl, propoxymethyl, butoxymethyl, pentoxymethyl, methoxyethyl, ethoxyethyl, propoxyethyl, butoxyethyl or pentoxyethyl.

The compounds of the formula Ig additionally include 4-ring compounds in which the radicals $Q^1$ and $Q^2$ in each case independently of one another are

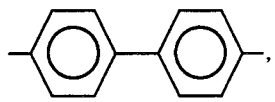

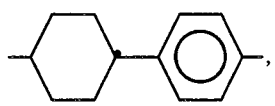

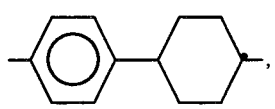

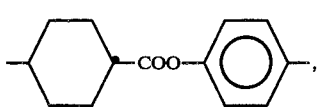

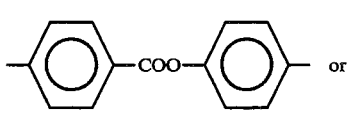 or

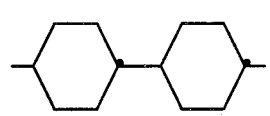

Preferred compounds are those of the formulae Ig4-1–Ig4-10

| | |
|---|---|
| $R^1$-Phe-Phe-COO-Phe.(F)-Phe-$R^2$ | Ig4-1 |
| $R^1$-Phe.(F)-Phe-COO-Cyc-Phe-$R^2$ | Ig4-2 |
| $R^1$-Phe-Phe.(F)-COO-Phe-COO-Phe-$R^2$ | Ig4-3 |
| $R^1$-Phe-Phe.(F)-COO-Cyc-Cyc-$R^2$ | Ig4-4 |
| $R^1$-Cyc-Phe-COO-Phe.(F)-Phe-$R^2$ | Ig4-5 |
| $R^1$-Cyc-Phe-COO-Phe.(F)-COO-Phe.(F)-$R^2$ | Ig4-6 |
| $R^1$-Cyc-Phe-COO-Cyc-Cyc-$R^2$ | Ig4-7 |
| $R^1$-Cyc-Phe.(F)-COO-Phe-Cyc-$R^2$ | Ig4-8 |
| $R^1$-Cyc-Cyc-COO-Phe-Cyc-$R^2$ | Ig4-9 |
| $R^1$-Cyc-COO-Phe-COO-Phe.(F)-Phe-$R^2$ | Ig4-10 |

$R^1$ and $R^2$ in the compounds of the formulae Ig4-1–Ig4-10 are preferably independently of one another methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethyl, propoxymethyl, butoxymethyl, methoxyethyl, ethoxyethyl or propoxyethyl. Particularly preferred are the terminally symmetrically substituted compounds of the formula (sic) Ig4-1, Ig4-3, Ig4-4 and Ig4-8. The compounds of the formula (sic) Ig4-1–Ig4-10 can be laterally monosubstituted by F or Cl on one of the 1,4-Phenylene groups, substitution by F in the 2- or 3-position being preferred. The compounds of the formula Ig4-9 are additionally preferred.

The compounds of the formula Ig are preferably prepared by transesterification of appropriately substituted phenols or phenoxides with appropriately substituted carboxylic acids or reactive carboxylic acid derivatives, such as is described, for example, in DE 2,167,252, DE 2,800,553, DE 2,536,046, DE 2,123,175 and DE 2,139,628.

Liquid crystal mixtures which contain one or more compounds selected from the group of compounds of the formula Ig and in particular of the preferred sub-formulae Ig2-1, Ig2-2, Ig2-1a–1d, Ig2-2a–2c, Ig3-1–Ig3-10 and Ig4-1–Ig4-10 are distinguished by advantageous values for the dielectric anisotropy Δε, a high stability, easy preparation capability, low miscibility with the polymer used for the matrix and in particular by a broad mesogenic range, a relatively high clear point and advantageous values for the birefringence and flow viscosity.

The liquid crystal mixtures preferably contain 1–40% and in particular 5–30% of compounds of the formula Ig and in particular of the preferred sub-formulae. In this connection, the liquid crystal mixtures preferably contain 1–5 and in particular 1–3 compounds of the formula Ig and in particular of the preferred sub-formulae.

Liquid crystal mixtures are particularly preferred which contain at least one compound selected from the group of compounds of the formula Ig and in particular of the preferred sub-formulae Ig2-1–Ig2-2, Ig2-1a–1d, Ig2-2a–2c, Ig3-1–Ig3-10 and Ig4-1–Ig4-10, and additionally one or more compounds selected from the group of compounds II1–II28, III1–III3 and IV1–IV8. The mass content of the component mixture consisting of at least one compound of the formulae Ig and in particular of the preferred sub-formulae and additionally of at least one compound of the formulae II1–II28, III1–III3 and IV1–IV8 in the liquid crystal mixture used according to the invention is preferably 15%–100%, but in particular 25%–100%.

Liquid crystal mixtures which are based on component mixtures which consist of at least one laterally unsubstituted compound of the formula Ig2-1 and of one or more compounds of the formula IV1 are much preferred for matrix systems, but on the other hand less preferred for network systems. However, liquid crystal mixtures which contain at least one compound selected from the group of compounds of the formulae Ia, Ic, Id, Ie, IfF, IfCl, IfCl.F, Ih or Ii and in particular of the preferred sub-formulae in addition to the compounds of these formulae are in general also preferred for network systems.

The following smaller group of component mixtures T(Ig) which contain at least one compound each from the substance classes shown in each case is also particularly preferred:

| | |
|---|---|
| T(Ig)1: | Ig2-1a, Ig2-1b and/or Ig2-1c |
| | II1, II5, II6, IV1, IV2, IV3 and/or IV4 |
| T(Ig)2: | Ig2-2a, Ig2-2b and/or Ig2-2c |
| | II1, II5, II6, III1, III2, IV1, IV2, IV3 and/or IV4 |
| T(Ig)3: | Ig3-1, Ig3-3, Ig3-6, Ig3-9 and/or Ig3-10 |
| | II1, II2, II3, II4, II5, II6, IV1 and/or IV2 |

Liquid crystal mixtures which are based on the following component mixtures T (Ig) 4–6, which contain at least one compound each from the compound classes of the formulae mentioned in each case, are preferred. In the table, the preferred mass content of these compounds in the component mixtures is additionally indicated. The component mixtures contain 2–38, preferably 2–35, and in particular 2–25 compounds; the sum of the mass contents of these compounds in the component mixture is 100%. The mass content of the component mixture in the liquid crystal according to the invention is between 10% and 100%, in particular between 15% and 100% and very particularly between 25% and 100%.

| Mixture | Formula | Mass content in the component mixture [%] |
|---|---|---|
| T(Ig)4 | Ig | 5-75 |
| | II | 6-65 |
| T(Ig)5 | Ig | 5-75 |
| | IV | 5-75, in particular 5-63 |
| T(Ig)6 | Ig | 5-55, in particular 5-50 |
| | II | 5-72, in particular 5-53 |
| | IV | 5-50, in prticular 5-44 |

Liquid crystal mixtures which are additionally preferred are those which contain one or more compounds of the formula Ih $$R^1\text{-}Q^6\text{-}C\equiv C\text{-}Q^7\text{-}R^2 \qquad Ih$$

in which
at least one of the two radicals $R^1$ and $R^2$ has the meaning given in claim 1,
one of the two radicals $R^1$ and $R^2$ is also F, Cl, $OCF_3$, $OCHF_2$ or $CF_3$, and the radicals $Q^6$ and $Q^7$ in each case independently of one another are

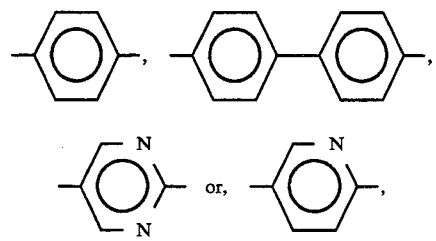

$Q^6$ is also

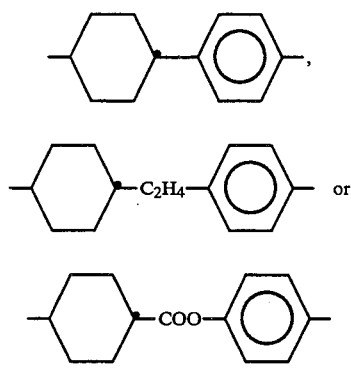

and $Q^7$ is also

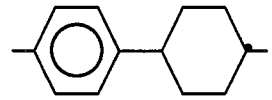

The compounds of the formula Ih include 2-ring compounds, those of the formulae I2h-1 – I2h-3 being preferred:

| | |
|---|---|
| $R^1$-Phe-C-C-Phe-$R^2$ | Ih2-1 |
| $R^1$-Pyr-C,C-Phe-$R^2$ | Ih2-2 |
| $R^1$-Pyd-C,C-Phe-$R^1$ | Ih2-3 |

In the compounds of the formulae Ih2-1–Ih2-3, which have 2 non-polar radical (sic), $R^1$ and $R^2$ independently of one another are preferably alkyl or alkoxy having 1–10, but in particular having 1–8, C atoms, additionally also n-alkoxyalkyl- and in particular n-alkoxymethyl- and -alkoxyethyl. One of the 1,4-phenylene groups contained in the compounds of the formulae Ih2-1–Ih2-3 can be replaced by Cl or F in the 2- or 3-position, but in particular by F.

The following compounds are particularly preferred:

| | |
|---|---|
| $R^1$-Phe-C≡C-Phe-alkyl | Ih2 - 1a |
| $R^1$-Phe-C≡C-Phe.2F-alkyl or alkoxy | Ih2-1b |
| $R^1$-Phe-C≡C-Phe.3F-alkyl or alkoxy | Ih2-1c |
| $R^1$-Pyr-C≡C-Phe.3F-alkyl or alkoxy | Ih2-2a |
| $R^1$-Pyd-C≡C-Phe.3F-alkyl or alkoxy | Ih2-3a |

Compounds of the formulae Ih2-1–Ih2-3 in which one of the radicals $R^1$ or $R^2$ is F, Cl, $OCF_3$, $OCHF_2$ or $CF_3$ and in particular F or Cl are additionally preferred. These compounds have relatively high values for the optical and dielectric anisotropy and are at the same time characterized by relatively low values for the viscosity $\eta$. One of the two 1,4-phenylene groups can be replaced by Cl or F in the 2- or 3-position, but in particular by F and/or in the 3-position.

The following compounds of the formulae Ih2 are particularly preferred

| | |
|---|---|
| $R^1$-Phe-C≡C-Phe-$R^2$ | Ih2-1d |
| $R^1$-Phe.3F-C≡C-Phe-$R^2$ | Ih2-1e |
| $R^1$-Phe.2F-C≡C-Phe-$R^2$ | Ih2-1f |
| $R^1$-Phe-C≡C-Phe.2F-$R^2$ | Ih2-1g |
| $R^1$-Phe-C≡C-Phe.3F-$R^2$ | Ih2-1h |
| $R^1$-Phe-C≡C-Pyr-$R^2$ | Ih2-2b |
| $R^1$-Phe-C≡C-Pyd-$R^2$ | Ih2-3b |
| $R^1$-Pyr-C≡C-Phe-$R^2$ | Ih2-2c |
| $R^1$-Pyd-C≡C-Phe-$R^2$ | Ih2-3c | where $R^1$ is F, Cl, $OCF_3$, $OCHF_2$ or $CF_3$ and $R^1$ is alkyl or alkoxy having 1–7 C atoms.

The compounds of the formula I additionally include 3-ring compounds of which those of the sub-formulae Ih3-1–Ih3-10 are preferred:

| | |
|---|---|
| $R^1$-Phe-C≡C-Phe-Phe-$R^2$ | Ih3-1 |
| $R^1$-Phe.(F)-C≡C-Phe-Cyc-$R^2$ | Ih3-2 |
| $R^1$-Pyr-C≡C-Phe-Phe-$R^2$ | Ih3-3 |
| $R^1$-Pyd-C≡C-Phe-Phe-$R^2$ | Ih3-4 |
| $R^1$-Pyr-C≡C-Phe-Cyc-$R^2$ | Ih3-5 |
| $R^1$-Pyd-C≡C-Phe-Cyc-$R^2$ | Ih3-6 |
| $R^1$-Cyc-CH$_2$CH$_2$-Phe-C≡C-Phe-$R^2$ | Ih3-7 |
| $R^1$-Cyc-CH$_2$CH$_2$-Phe-C≡C-Pyd-$R^2$ | Ih3-8 |
| $R^1$-Cyc-CH$_2$CH$_2$-Phe-C≡C-Pyr-$R^2$ | Ih3-9 |
| $R^1$-Cyc-COO-Phe-C≡C-Phe.(F)-$R^2$ | Ih3-10 |

In the compounds of the sub-formulae Ih3-1–Ih3-10, $R^1$ and $R^2$ in compounds having 2 non-polar radicals are preferably independently of one another n-alkyl or n-alkoxy having 1–10 C atoms, and in addition also n-alkoxymethyl or n-alkoxyethyl having 1–8 C atoms. Compounds of the formulae Ih3-1–Ih3-10 which have a polar radical F, Cl, $OCHF_2$, $OCF_3$ or $CF_3$, where the other radical is in particular alkyl or alkoxy having 1–8 C atoms, are preferred. The compounds of the formula Ih3-1–Ih3-10 can be laterally monosubstituted by X=F or Cl on one of the 1,4-phenylene groups in each case present in the molecule. The following monosubstituted compounds of the formulae Ih3-1a–1d, Ih3-2a–2b, Ih3-5a and Ih3-6a–6b are particularly preferred:

| | |
|---|---|
| $R^1$-Phe-C≡C-Phe-Phe.3F-$R^2$ | Ih3-1a |
| $R^1$-Phe-C≡C-Phe-Phe.3Cl-$R^2$ | Ih3-1b |
| $R^1$-Phe-C≡C-Phe.3F-Phe-$R^2$ | Ih3-1c |
| $R^1$-Phe-C≡C-Phe.3Cl-Phe-$R^2$ | Ih3-1d |
| $R^1$-Phe-C≡C-Phe.3F-Cyc-$R^2$ | Ih3-2a |
| $R^1$-Phe-C≡C-Phe.3Cl-Cyc-$R^2$ | Ih3-2b |
| $R^1$-Pyr-C.C-Phe-Phe.F-$R^2$ | Ih3-5a |
| $R^1$-Pyd-C≡C-Phe-Phe.F-$R^2$ | Ih3-6a |
| $R^1$-Pyd-C≡C-Phe.F-Phe-$R^2$ | Ih3-6b | where in the compounds of the formulae Ih3-1a–1d, Ih3-5a and Ih3-6a–6b in particular $R^2$ and in the compounds of the formulae Ih3-2a–2b in particular $R^1$ is a polar group.

The compounds of the formula Ih additionally include 4-ring compounds of which those of the sub-formulae Ih4-1–Ih4-5 are preferred:

| | |
|---|---|
| $R^1$-Phe-Phe-C≡C-Phe.(F)-Phe.(F)-$R^2$ | Ih4-1 |
| $R^1$-Phe-Phe.(F)-C≡C-Phe-Cyc-$R^2$ | Ih4-2 |
| $R^1$-Cyc-Phe-C≡C-Phe.(F)-Cyc-$R^2$ | Ih4-3 |
| $R^1$-Cyc-CH$_2$CH$_2$-Phe-C≡C-Phe.(F)-Cyc-$R^2$ | Ih4-4 |
| $R^1$-Cyc-CH$_2$CH$_2$-Phe-C≡C-Phe.(F)-Cyc-$R^2$ | Ih4-5 |

In the compounds of the formulae Ih4-1–Ih4-5, one of the two radicals $R^1$ and $R^2$ is preferably polar and the other is preferably independently of one another methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethyl or propoxyethyl. The symmetrically substituted compounds of the formulae Ih4-1 and Ih4-3 having two non-polar radicals are additionally preferred. The compounds of the formulae Ih4-1–Ih4-5 can be laterally monosubstituted by F or Cl on one of the 1,4-phenylene groups, substitution in the 3-position being preferred.

The compounds of the formula Ih are preferably prepared by the methods described in DE 2,226,376, GB 2,155,465, GB 2,189,785, DE 3,711,306, JP 61-260,031, DE 3,710,069, JP 02-062,861, JP 63-060,972, EP 0,255,700 and EP 0,276,067.

Liquid crystal mixtures which contain one or more compounds selected from the group of compounds Ih and in particular of the preferred compounds Ih2-1–Ih2-3 (sic), Ih2-1a–1h, Ih2-2a–2c, Ih2-3a–3c, Ih3-1–Ih3-10, Ih3-1a–1d, Ih3-2a–2b, Ih3-5a, Ih3-6a–6b and Ih4-1–Ih4-5 are distinguished by a broad mesogenic range, a relatively high clear point, a high stability, a low miscibility with the polymer used for the matrix and in particular by advantageous values for the dielectric anisotropy and viscosity and by a high birefringence.

The liquid crystal mixtures preferably contain 1–40% and in particular 5–30% of compounds of the formula Ih and in particular of the preferred sub-formulae. In this case, the liquid crystal mixtures preferably contain 1–5 and in particular 1–3 compounds of the formula Ih and in particular of the preferred sub-formulae.

Liquid crystal mixtures are particularly preferred which contain at least one compound selected from the group of compounds of the formula Ih and in particular of the preferred sub-formulae, and additionally one or more compounds selected from the group of compounds II1–II28, III1–III3 and IV1–IV8. The mass content of the component mixture consisting of at least one compound of the formula Ih and in particular of the preferred sub-formulae and additionally of at least one compound of the formulae II1–II28, III1–III3 and IV-1–IV8 in the liquid crystal mixture used according to the invention is preferably 15%–100%, but in particular 25%–100%.

Liquid crystal mixtures which are based on component mixtures which contain at least one compound of the formula Ih2-1 and additionally at least one compound of the formula IV1 and/or IV2 are as a rule particularly preferred for matrix applications, but are frequently less suitable for network applications. The same applies to liquid crystals which are based on component mixtures which contain at least one compound of the formula Ih3-10 and/or Ih3-2 and at least one compound of the formula IV1. However, it was found that the properties of mixtures of this type can be improved by the addition of at least one compound which are (sic) selected from the group of compounds Ia, Ic, Id, Ie, IfF, IfCl, IfCl.F, Ig and II1–II28 and in particular of the preferred sub-formulae, so that these mixtures can also be employed for network applications.

Liquid crystal mixtures which are based on the following component mixtures T(Ih) which contain at least one compound each from the compound classes of the formulae shown in each case are preferred both for matrix systems and for network systems. In the table, the preferred mass content of these compounds in the component mixtures is additionally given.

| Mixture | Formula | Mass content in the component mixture [%] |
|---------|---------|-------------------------------------------|
| T(Ih)1 | Ih | 5-75 |
|  | II | 6-65 |
| T(Ih)2 | Ih | 5-75 |
|  | IV | 5-63 |
| T(Ih)3 | Ih | 5-55, in particular 5-50 |
|  | II | 5-72, in particular 5-53 |
|  | IV | 5-50, in particular 5-46 |

The following smaller group of component mixtures which in each case contain at least one compound from the compound classes shown in each case, is preferred for matrix applications and particularly preferred for network systems:

| T(Ih)4: | Ih2-1a, Ih2-1b and/or Ih2-1c<br>II1, II2, II3, II5, II6, II8, II9, IV1 and/or IV2 |
|---|---|
| T(Ih)5: | Ih2-2a, 2b and/or 2c<br>II1, II2, II3, II5, II6, II8, II9, IV1, IV2, IV3 and/or IV4 |
| T(Ih)6: | Ih2-3a, 3b and/or 3c<br>II1, II2, II3, II5, II6, II8, II9, IV1, IV2, IV3 and/or IV4 |
| T(Ih)7: | Ih3-2<br>II1, II2, II3, II5, II6, II8, II9, II10, II11, II13, II14, II15, II16, II21, II22 and/or II23 |
| T(Ih)8: | Ih3-3<br>II1, II2, II3, II5, I6(sic), II8, II9, II10 and/or II11 |
| T(Ih)9: | Ih3-4<br>II1, II2, II3, II5, II6, II8, II9, II10 and/or |

II11

Liquid crystal mixtures are additionally preferred which contain one or more compounds of the formula Ii $$R^1-Q^8-CH_2CH_2-Q^9-R^2 \qquad (Ii)$$

in which $R^1$ and $R^2$ in each case independently of one another have the meaning given in claim 1, and the radicals $Q^8$ and $Q^9$ in each case independently of one another are trans-1,4-cyclohexylene, 1,4-phenylene, 4,4'-biphenylyl, 4,4'-cyclohexylphenyl, 4,4'-phenylcyclohexyl or trans-,trans-4,4'-bicyclohexylyl, where one of the 1,4-phenylene radicals present in the molecule can also be substituted by fluorine or chlorine.

The compounds of the formula Ii include 2-ring compounds of the formulae Ii2-1 and Ii2-2, which are preferred:

| $R^1$-Phe—$CH_2CH_2$-Phe—$R^2$ | Ii2-1 |
|---|---|
| $R^1$-Cyc—$CH_2CH_2$-Phe—$R^2$ | Ii2-2 |

$R^1$ and $R^2$ in the compounds of the formulae Ii2 independently of one another are preferably alkyl or alkoxy having 1–10, but in particular having 1–8, C atoms. n-Alkoxyalkyl compounds and in particular n-alkoxymethyl and n-alkoxyethyl compounds are additionally preferred. One of the two 1,4-phenylene groups can be substituted by Cl or F in the 2- or 3-position, but in particular by F and/or in the 3-position.

Particularly preferred compounds are those of the formula

| Alkyl- or alkoxy-Phe—$CH_2CH_2$-Phe—$R^2$ | Ii2-1a |
|---|---|
| Alkyl- or alkoxy-Phe.3F—$CH_2CH_2$-Phe—$R^2$ | Ii2-1b |
| Alkoxymethyl-Phe.2F—$CH_2CH_2$-Phe-$R^2$ | Ii2-1c |
| Alkyl- or alkoxy-Cyc—$CH_2CH_2$-Phe—$R^2$ | Ii2-2a |

The compounds of the formula I additionally include 3-ring compounds of the sub-formulae Ii3, of which those of the sub-formulae Ii3-1–Ii3-5 are preferred:

| $R^1$-Phe—$CH_2CH_2$-Phe-Phe-$R^2$ | Ii3-1 |
|---|---|
| $R^1$-Cyc—$CH_2CH_2$-Phe-Phe-$R^2$ | Ii3-2 |
| $R^1$-Phe—$CH_2CH_2$-Phe-Cyc-$R^2$ | Ii3-3 |
| $R^1$-Phe-Cyc—$CH_2CH_2$-Phe-$R^2$ | Ii3-4 |
| $R^1$-Cyc—$CH_2CH_2$-Phe-Cyc-$R^2$ | Ii3-5 |
| $R^1$-Cyc-Cyc—$CH_2CH_2$-Phe-$R^2$ | Ii3-6 |

In the compounds of the formulae Ii3-1–Ii3-6, $R^1$ and $R^2$ are preferably independently of one another n-alkyl or n-alkoxy having 1–10 C atoms and in addition also n-alkoxymethyl or n-alkoxyethyl having 1–8 C atoms. The compounds of the formula (sic) Ii3-1–Ii3-6 can be laterally monosubstituted by X=F or Cl on one of the 1,4-phenylene groups. The laterally unsubstituted compounds of the formulae Ii3-1–Ii3-6 and the laterally monosubstituted compounds of the formulae Ii3-1a-1b, Ii3-2a, Ii3-3a, Ii3-6a and Ii3-5a, in which Phe.X is a 1,4-phenylene group laterally monosubstituted by F or Cl in the 2- or 3-position, are particularly preferred:

| | |
|---|---|
| R$^1$-Phe—CH$_2$CH$_2$-Phe-Phe.3X-R$^2$ | Ii3-1a |
| R$^1$-Phe—CH$_2$CH$_2$-Phe. X-Phe-R$^2$ | Ii3-1b |
| R$^1$-Cyc—CH$_2$CH$_2$-Phe-Phe.2X-R$^2$ | Ii3-2a |
| R$^1$-Phe—CH$_2$CH$_2$-Phe.X-Cyc-R$^2$ | Ii3-3a |
| R$^1$-Cyc—CH$_2$CH$_2$-Phe.2F-Cyc-R$^2$ | Ii3-5a |
| R$^1$-Cyc-Cyc—CH$_2$CH$_2$-Phe.F—R$^2$ | Ii3-6a |

The laterally monosubstituted compounds of the formulae Ii3-1–Ii3-6 are as a rule distinguished by a lower flow viscosity than the corresponding unsubstituted compounds.

The compounds of the formula Ii additionally include 4-ring compounds in which Q$^8$ and Q$^9$ in each case independently of one another are

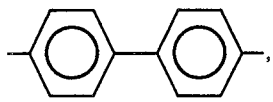

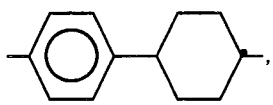

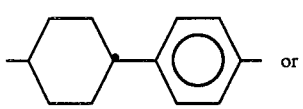 or

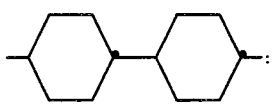 :

| | |
|---|---|
| R$^1$-Phe-Phe—CH$_2$CH$_2$-Phe.(F)-Phe-R$^2$ | Ii4-1 |
| R$^1$-Phe-Phe—CH$_2$CH$_2$-Phe.(F)-Cyc-R$^2$ | Ii4-2 |
| R$^1$-Phe-Cyc—CH$_2$CH$_2$-Phe.(F)-Phe.(F)-R$^2$ | Ii4-3 |
| R$^1$-Phe-Cyc—CH$_2$CH$_2$-Phe.(F)-Cyc-R$^2$ | Ii4-4 |
| R$^1$-Cyc-Phe.(F) —CH$_2$CH$_2$-Phe-Cyc-R$^2$ | Ii4-5 |
| R$^1$-Cyc-Cyc—CH$_2$CH$_2$-Phe. (F)-Phe-R$^2$ | Ii4-6 |

R$^1$ and R$^2$ in the compounds of the formulae Ii4-1–Ii4-6 are preferably independently of one another methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethy (sic), ethoxymethyl, propoxymethyl, butoxymethyl, methoxyethyl, ethoxyethyl or propoxyethyl. The compounds of the formulae Ii4-1–Ii4-6 can be laterally monosubstituted by F or Cl on one of the 1,4-phenylene groups, substitution in the 3-position being preferred. These monosubstituted four-ring compounds are distinguished by a high clear point and a comparatively low flow viscosity $\eta$.

The compounds of the formula Ii are preferably prepared by the methods described in EP-0,084,194, JP 61-087,777, GB 2,201,415 and DE 3,237,367.

Liquid crystal mixtures which contain one or more compounds selected from the group of compounds of the formula Ii and in particular of the preferred formulae Ii2-1, Ii2-2, Ii2-1a-1c, Ii2-2a, Ii3-1–Ii3-5, Ii3-1a-1b, Ii3-2a, Ii3-6a, Ii3-3a, Ii3-5a and Ii4-1–Ii4-5 are distinguished by a high stability, low miscibility with the polymer used for the matrix and in particular by a broad mesogenic range, a relatively high clear point and advantageous values for the optical anisotropy $\Delta n$ and the flow viscosity $\eta$.

The liquid crystal mixtures preferably contain 1–40% and in particular 5–30% of compounds of the formula Ii and in particular of the preferred sub-formulae. In this case, the liquid crystal mixtures preferably contain 1–5 and in particular 1–3 compounds of the formula Ii and in particular of the preferred sub-formulae.

Liquid crystal mixtures are particularly preferred which contain at least one compound selected from the group of compounds of the formula Ii and in particular of the preferred sub-formulae, and additionally one or more compounds selected from the group of compounds of the formulae II1-II28, III1-III3 and IV1-IV8. The mass content of the component mixture consisting of at least one compound of the formula Ii and in particular of the preferred sub-formulae and additionally of at least one compound of the formulae II1-II28, III1-III3 and IV1-IV8 in the liquid crystal mixtures used according to the invention is preferably 15%–100%, but in particular 25%–100%. These component mixtures are preferred for network and matrix systems.

The liquid crystal mixtures according to the invention contain one or more compounds which are selected from the group of compounds of the formula I and in particular of the formulae Ia-Ii; in this connection, liquid crystal mixtures which, in addition to one or more compounds of the formula I and in particular of the formulae Ia-Ii, additionally contain one or more compounds selected from the group of compounds of the formulae II-IV are in general preferred.

Liquid crystal mixtures are additionally preferred which contain at least one compound each from two different compound classes; selected from the group of compound classes of the formulae Ia-Ii.

The following smaller group of component mixtures T(Ii) which in each case contain at least one compound from the compound classes shown in each case is very particularly preferred:

| T(Ii)1: | T12-1 |
| | II1, II2, II3, II5, II9, II16, II17, II18, IV1, IV2, IV3, IV4, IV5 or IV6 |
| T(Ii)2: | Ti2-2 |
| | II1, II3, II4, II5, II9, IV1, IV2, IV3, IV4, IV7 or IV8 |
| T(Ii)3: | Ii3-2 |
| | II1, II2, II5, II6, II7, II8, II9, III1, IV1, IV2, IV3 or IV4 |
| T(Ii)4: | Ii3-5 |
| | II1, II5, IV1, IV2, IV3 or IV4 |
| T(Ii)5: | Ii3-6 |
| | II1, II5, II9, II25, II26, II27, II28, III1, IV1, IV2, IV3 or IV4 |
| T(Ii)6: | Ii3-1a or Ii3-16 |
| | II1, II5, II16, II17, II18, II25, II26, II27, II6, II28, IV1 or IV2 |
| T(Ii)7: | Ii4-5 |
| | II1, II5, II6, II7, II8, II16, II17, IV1, IV2, IV3 or IV4 |

| | -continued |
|---|---|
| T(Ii)8: | Ii4-6<br>II1, II2, II5, II6, II7, II8, III1, IV1 or IV2 |

Liquid crystal mixtures which are based on the following component mixtures T (Ii) 9-13, which contain at least one compound each from the compound classes of the formulae mentioned in each case, are preferred. In the table, the preferred mass content of these compounds in the component mixtures is additionally indicated. The component mixtures contain 2-38, preferably 2-35, and in particular 2-25 compounds; the sum of the mass contents of these compounds in the component mixture is 100%. The mass content of the component mixture in the liquid crystal according to the invention is between 10% and 100%, in particular between 15% and 100% and very particularly between 25% and 100%.

| Mixture | Formula | Mass content in the component mixture [%] |
|---|---|---|
| T(Ii)9 | Ii | 5-75, in particular 5-55 |
| | II | 6-85, in particular 6-65 |
| T(Ii)10 | Ii | 5-75, in particular 5-55 |
| | IV | 5-85, in particular 5-63 |
| T(Ii)11 | Ii | 5-55 |
| | II | 5-52 |
| | III | 5-29 |
| T(Ii)12 | Ii | 5-55, in particular 5-50 |
| | II | 5-72, in particular 5-53 |
| | IV | 5-50, in particular 5-46 |
| T(Ii)13 | Ii | 5-50, |
| | II | 5-75, in particular 5-47 |
| | III | 5-37, in particular 1-15 |
| | IV | 5-42 |

The component mixtures T(I) shown in the following contain at least one compound each from the compound classes shown in each case and liquid crystal mixtures which contain one or more of these component mixtures are very particularly preferred:

| T(I)1: | Ia<br>Ib |
|---|---|
| T(I)2: | Ia<br>Ic |
| T(I)3: | Ia<br>Id |
| T(I)4: | Ia<br>Ie |
| T(I)5: | Ia<br>If |
| T(I)6: | Ia<br>Ig |
| T(I)7: | Ia<br>Ih |
| T(I)8: | Ia<br>Ii |
| T(I)9: | Ib<br>Ic |
| T(I)10: | Ib<br>Id |
| T(I)11: | Ib<br>Ie |
| T(I)12: | Ib |

| | -continued |
|---|---|
| T(I)13: | If<br>Ib<br>Ig |
| T(I)14: | Ib<br>Ih |
| T(I)15: | Ib<br>Ii |
| T(I)16: | If<br>Ig |
| T(I)17: | If<br>Ih |
| T(I)18: | If<br>Ii |
| T(I)19: | Id<br>Ie |
| T(I)20: | Ie<br>Ig |
| T(I)21: | Id<br>Ih |
| T(I)22: | Id<br>Ii |
| T(I)23: | If<br>Ic |
| T(I)24: | If<br>Id |
| T(I)25: | If<br>Ie |

The person skilled in the art can straightaway make a selection from this limited group of preferred component mixtures T(I)l-T(I)22 in such a way that the liquid crystal mixture is optimized with respect to the particular application. Thus, for example, T(I)1 has a particularly high dielectric anisotropy, while the component mixture (sic) T(I)16-T(I)18 have a particularly high stability and the component mixtures T(I)4, T(I)11 and T(I)19 are characterized by relatively high clear points. The selection of suitable component mixtures presents no difficulties to the person skilled in the art and requires no inventive assistance.

Liquid crystal mixtures which contain at least one compound each from 2 different compound classes selected from the group of compound classes Ia-Ii, and additionally at least one compound selected from the group of compounds of the formulae II1-II28, III1-III3 and IV1-IV8 are additionally particularly preferred. In this connection, liquid crystal mixtures containing one of the preferred component mixtures T(I)1—T(I)22 and a compound selected from the compounds of the formulae II1, II2, II3, II4, II5, II6, II7, II8, II9, II10, II12, II13, II16, II17, II18, II19, II20, II21, II25, II26, II27, II28, III1, III2, IV1, IV2, IV3, IV4, IV5 and IV6 are very particularly preferred.

Liquid crystal mixtures are additionally particularly preferred which, in addition to one or more compounds selected from the compound classes Ia, Ib, Ic, Id, Ie, If, Ig and Ii, and at least one compound selected from the group of compounds of the formulae II-IV, additionally contain a further compound which is selected from the group of compounds of the formula Ih*

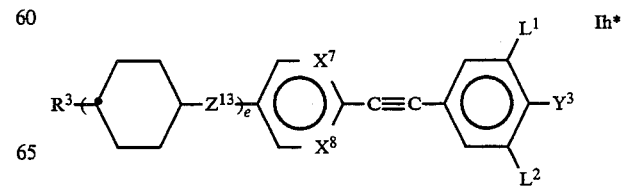

in which $R^3$ is an alkyl group having 1-10 C atoms, in which a $CH_2$ group can also be replaced by —O— or —CH=CH—, $Z^{13}$ is a single bond, —COO— or —CH$_2$CH$_2$—, $X^7$ and $X^8$ independently of one another are CH or N, $L^1$ and $L^2$ independently of one another are H or F and $Y^3$ is F, Cl, CF$_3$, OCF$_3$ or OCHF$_2$.

The compounds of the formula Ih* include a section of the compounds of the formula Ih which have a polar radical F, Cl, CF$_3$, OCF$_3$ or OCHF$_2$, and moreover further preferred compounds, of which the following should be explicitly mentioned:

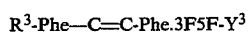  Ih* 2-1

  Ih* 2-2

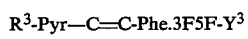  Ih* 2-3

  Ih* 3-1

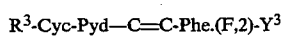  Ih* 3-2

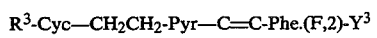  Ih* 3-3

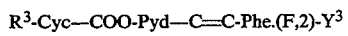  Ih* 3-4

The preferred liquid crystal mixtures which, in addition to at least one compound of the formulae Ia-Ig and Ii and at least one compound of the formulae II-IV, contain at least one compound of the formula Ih* as a 3rd obligatory component, preferably contain one of the preferred compounds just mentioned and/or one of the preferred compounds of the formulae Ih2-1–Ih2-2, Ih2-1a–1h, Ih2-2a–2c, Ih2-3a–3c, Ih3-1–Ih3-10, Ih3-1a –1d, Ih3-2a–2b, Ih3-5a, Ih3-6a–6b and Ih4-1–1h4-5.

These mixtures are distinguished by a high stability and high birefringence and are particularly suitable for matrix applications and very particularly suitable for network systems.

In this case, the mass content of the compounds which are selected from the group of compounds of the formulae Ih and Ih* is preferably more than 5%, in particular not less than 7.5% and particularly than 10% and very particularly more than 20%. The 3rd obligatory component of these liquid crystal mixtures very particularly preferably contains compounds of the formula

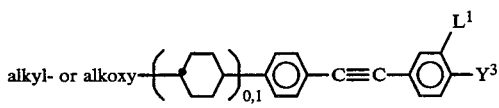

in which the meaning of $L^1$ and $Y^3$ is given above.

Mixtures are also particularly preferred which are based on component mixtures which contain at least one compound of the formula II, at least one compound of the formulae IV1-IV8 and at least one compound of the formula Ih*. In this case, the following smaller subgroup of component mixtures is particularly preferred which contains at least one compound each from each of the groups E, F and G; in this case the mass content of the compounds from the respective groups in the component mixture is preferably in the mass per cent ranges given:

| | Group | | |
|---|---|---|---|
| | E | F | G |
| Mass content in the component mixture [%] | 10-80 | 5-65 | 10-50 preferably 18-50, in particular 23-50 |
| Compounds | II1, II2, II3, II4, II5, II6, II7, II8, II9, II16, II17, II18 | IV1, IV2, IV3, IV4, IV5, IV6 | Ih2-1, Ih2-2, Ih2-3, Ih3-1, Ih3-2, Ih3-3, Ih3-4, Ih3-7, Ih3-8, Ih*2-1, Ih*2-2, Ih*2-3 |

The sum of the mass contents of the compounds from the groups E, F and G in the component mixture is 100%, and the mass content of the component mixtures in the liquid crystal mixtures which can be used according to the invention is preferably 25%-100%.

Liquid crystal mixtures are further particularly preferred which, in addition to one or more compounds selected from the compound classes Ia, Ib, Ic, Id, Ie, Ig, Ih and Ii, and at least one compound selected from the group of compounds of the formulae II-IV, additionally contain a further compound which is selected from the group of compounds of the formula If*

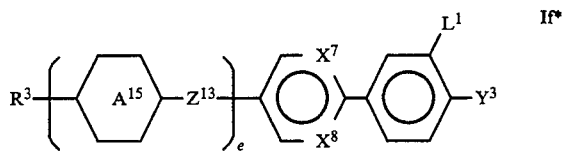 If* in which

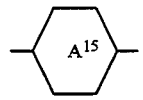

is trans-1,4-cyclohexylene or 1,4-phenylene and the meaning of $R^3$, $Z^{13}$, $X^7$, $X^8$, $L^1$, e and $Y^3$ is given above. The compounds of the formula If* represent a smaller preferred sub-group which is selected from the compounds of the formulae IfF, IfCl and IfCl.F. The mass content of the compounds of the formula If, in at least 3-component liquid crystal mixtures of this type is preferably not less than 5%, in particular more than 10% and very particularly more than 20% and can be up to 55%. Liquid crystal mixtures of this type have advantageous properties and are characterized in particular by a high stability and favourable values of the electrooptical parameters. Liquid crystal mixtures which, in addition to at least one compound of the formulae Ia-Ie and Ig-Ii and in addition to a compound of the formulae II-IV, contain at least one of the following preferred compounds are very particularly preferred:

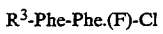

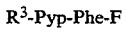

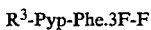

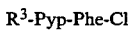

R³-Pyp-Phe.3F-Cl

R³-Pyr-Phe-F

R³-Pyr-Phe.3F-F

R³-Pyr-Phe-Cl

R³-Pyr-Phe-.3F-Cl

Component mixtures are particularly preferred in which
  the 1st obligatory component contains at least one compound of the formulae Ia-Ie having a mass content in the component mixture between 10% and 90%,
  the 2nd obligatory component contains one or more compounds which are selected from the group of compounds II1, II2, II3, II4, II5, II6, II7, II8, II9, II16, II17, II18, II25, II26, II27, II28, III1, III2, IV1, IV2, IV3, IV4, IV7 and IV8, the mass content of this component in the component mixture being between 5 and 80%, and
  the 3rd obligatory component contains one or more of the abovementioned preferred 2-ring compounds and/or one or more more of the following compounds R³-Cyc-Phe-Phe.(F)-F R³-Cyc-Phe-Phe.(F)-Cl R³-Phe-Pyr-Phe.(F)-F R³-Phe-Pyr-Phe.(F)-Cl R³-Phe-Pyr-Phe.(F)-CF₃

R³-Phe-Pyr-Phe-(F)-F

R³-Phe-Pyr-Phe-(F)-Cl

R³-Phe-Pyr-Phe.(F)-OCF₃ having a mass content in the component mixture of 5%–65%, in particular 10%–65% and very particularly 12.5%–65%.

The sum of the mass contents in the component mixture is 100%, and the mass content of the component mixture in the liquid crystal mixture is preferably 25%–100%.

Liquid crystal mixtures are furthermore particularly preferred which, in addition to one or more compounds selected from the group of compounds of the formula Ia-Ie and Ig-Ii and one or more compounds selected from the group of compounds of the formulae II–IV, additionally contain at least one compound of the formula If**

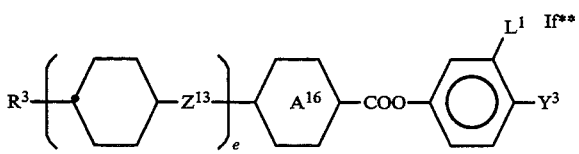

in which

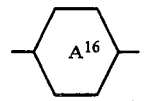

is trans-1,4-cyclohexylene, 1,4-phenylene or 3-fluoro-1,4-phenylene and the meaning of $Z^{13}$, $L^1$, $Y^3$, $R^3$ and e is given above. The compounds of the formula If** represent a preferred smaller sub-group which is selected from the compounds of the formulae IfF, IfCl and IfCl.F.

Liquid crystal mixtures which, in addition to a compound of the formulae Ia-Ie and Ig-Ii, contain a compound of the formulae II–IV and additionally a compound of the formula If are characterized by preferred properties and in particular a high stability, a favourable working temperature range and advantageous threshold voltage. The mass content of compounds of the formula If in these liquid crystal mixtures is preferably more than 5%, in particular more than 10% and very particularly more than 15%. The following smaller group of compounds of the formula If** is very particularly preferred:

| | |
|---|---|
| R³-Cyc-COO-Phe.(F)-Y³ | IF**2-1 |
| R³-Phe-COO-Phe.(F)-Y³ | IF**2-2 |
| R³-Cyc-Cyc-COO-Phe.(F)-Y3 | IF**3-1 |
| R³-Cyc-Phe-COO-Phe.(F)-Y³ | IF**3-2 |

The following liquid crystal mixtures which contain at least one compound each in the mass ranges mentioned from the groups H, I and K characterized in more detail in the following are additionally very particularly preferred:

| | Group | | |
|---|---|---|---|
| | H | I | K |
| Mass content of the component mixture | 20%–80% | 10%–80% | 5%–50% |
| Compounds | II1, II2, II3, II4, II5, II6, II7, II8, II9, II16, II17, II18, II25, II26, II27, II28, III1 | Ib | If2-1, If2-2, If3-1, If3-2 |

The sum of the mass contents in the component mixtures is 100% in this case, and the mass contents of the component mixtures in the liquid crystal mixtures used according to the invention is preferably 10%–85%.

The liquid crystals according to the invention may contain, in addition to the compounds of the formula I according to the invention and in particular of the preferred sub-formulae and very particularly of the preferred liquid crystal mixtures, further components which are preferably selected from nematic or nematogenic (monotropic or isotropic) substances, in particular substances from the classes consisting of the azoxybenzenes, benzylideneanilines, biphenyls, terphenyls, phenyl or cyclohexyl benzoates, cyclohexanecarboxylic acid phenyl or cyclohexyl esters, phenyl or cyclohexyl esters of cyclohexylbenzoic acid, phenyl or cyclohexyl esters of cyclohexylcyclohexanecarboxylic acid, cyclohexylphenyl esters of benzoic acid, cyclohexanecarboxylic acid, or of cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cycxlohexyl-pyrimidines (sic), phenyl- or cyclohexylpyridines, phenyl- or cyclohexyldioxanes, phenyl- or cyclohexyl-1,3-dithianes, 1,2-dipheylethanes (sic), 1,2-dicyclohexylethanes, 1-phenyl-2-cyclohexylethanes, 1-cyclohexyl-2-(4-phenylcyclohexyl)ethanes, 1-cyclohexyl-2-biphenylethanes, 1-phenyl-2-cyclohexylphenylethanes, optionally halogenated stilbenes, benzyl phenyl ethers, tolans and substituted cinnamic acids. The 1,4-phenylene groups in these compounds can also be fluorinated.

In these compounds, the two terminal groups are preferably in each case independently of one another alkyl, alkenyl, alkoxy, alkenyloxy or alkanoyloxy having up to 8 carbon atoms. In most of these compounds, R' and R'' are different from one another, one of these radicals usually being alkyl or alkenyl.

However, it is also possible that one and/or both terminal groups are a polar radical —CN, —NCS, —F, —Cl or (O)$_i$CX$_k$H$_{3-k}$, where i is 0 or 1, k is 1, 2 or 3 and X is F or Cl. If only one of the terminal groups is one of the polar radicals mentioned, the other is preferably alkyl or alkenyl.

Many substances of this type or, alternatively, mixtures thereof are commercially available. All these substances are obtainable by methods known from the literature or in analogy thereto.

The liquid crystals used in the electrooptical liquid crystal systems according to the invention preferably contain 1%–100%, in particular 10%–100% and very particularly 20%–100% of compounds of the formula I. In this case, liquid crystal mixtures are preferred which contain 1–20 and in particular 1–15 compounds of the formula I. If the liquid crystal compounds of the formula I are selected from only one sub-group of the formulae Ia-Ii, the liquid crystal mixture preferably contains 1–5 and in particular 1–3 compounds of this sub-formula of formula I.

The liquid crystal mixtures are preferably based on compounds which are selected from the group of the formulae I, II, III and IV. The mass content of the compounds selected from the group of the formulae I, II, III and IV in the liquid crystal mixture is preferably 5%–100%, in particular 10%–100% and very particularly 15%–98%. The liquid crystal mixtures according to the invention preferably contain 2–40, but in particular 2–38 and very particularly 2–35 compounds, selected from the group of compounds of the formulae I, II, III, IV and V.

The dielectric anisotropy of the liquid crystal mixture used is positive $\Delta\epsilon > 0$ and preferably $\Delta\epsilon > 3$.

For smaller values of the dielectric anisotropy $\Delta\epsilon$, very high threshold voltages are observed. Particularly preferred values are $\Delta\epsilon > 5$, very particularly $\Delta\epsilon > 8$.

It has been found that liquid crystal mixtures which are based on medium polarity compounds with $$3 \leq \Delta\epsilon \leq 20 \quad (*1)$$

and in particular $$3 \leq \Delta\epsilon \leq 15 \quad (*2)$$

have particularly advantageous properties and in particular a high temperature and UV stability and a high specific resistance. Mixtures of this type are particularly suitable for systems having a high information content, which are controlled using an active or passive matrix and furthermore in particular also for systems which have to tolerate relatively high operating temperatures (for example systems for outdoor applications). The mass content of medium polarity compounds in the liquid crystal mixture is preferably not less than 50%, in particular at least 60% and very particularly at least 65%.

It has in particular been shown that compounds of the formula I where W=—F, —Cl, —CF$_3$, —OCF$_3$, —OCHF$_2$ or NCS and in particular W=—F, —Cl, —CF$_3$, —OCF$_3$ or —OCHF$_2$ frequently have a dielectric constant in the preferred ranges (*1) or (*2), while liquid crystal compounds where W=—CN frequently have an overhigh dielectric constant and are less suitable for mixtures of this type; the mass content in compounds which have a terminal carbonitrile group in the liquid crystal mixtures based on medium polarity compounds is preferably less than 15% and in particular not more than 10%. If highly polar additives with $\Delta\epsilon > 20$ are necessary, for example for reducing the threshold voltage, compounds are preferably used in which one terminal group has the meaning given for R$^1$ while the other terminal group is given by

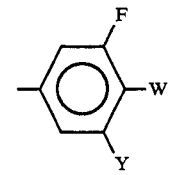

where
W is —F, —Cl, —CF$_3$, —OCF$_3$ or —OCHF$_2$ and
Y is H or F.

Compounds where W=—Cl are as a rule characterized by a higher birefringence $\Delta n$ in comparison to corresponding compounds where W=—F and are therefore often preferred if a high birefringence is desired, for example for increasing the scattering in the opaque state.

The present invention makes available to the person skilled in the art a limited pool of particularly preferred compounds of the formula I and in particular of the formulae Ia-Ii and particularly preferred liquid crystal component mixtures. Liquid crystal mixtures which contain one or more compounds of the formula I and in particular of the formulae Ia-Ii and very particularly at least one of the component mixtures mentioned have advantageous properties and correspond to the requirements described at the beginning, which are set for use in an electrooptical system according to the preamble of claim 1, to a particularly high extent and very much better than the liquid crystal mixtures hitherto used in these systems. In this case, on the basis of the detailed description the person skilled in the art can at any time make a selection from the described pool of preferred liquid crystal compounds and liquid crystal component mixtures without inventive assistance in such a way that the birefringence $\Delta n$ and/or the ordinary refractive index $n_0$ and/or other refractive indices and/or the viscosity and/or the dielectric anisotropy and/or the clear point and/or additional parameters of the liquid crystal and/or the threshold voltage and/or further electrooptical parameters of the system and/or their temperature dependence and/or the working temperature range and/or the solubility of the liquid crystal in the monomers or oligomers for polymerizing and/or in the cured matrix or the cured network and/or further parameters of the liquid crystal and the system with respect to the particular application are optimized.

If, for example, a high clear point is necessary, the person skilled in the art will preferably make a selection among the compounds of the formula I and in particular the sub-formulae Ia-Ii and the preferred component mixtures such that the mass content of 2-ring compounds in the liquid crystal mixture is not too high. In addition, the person skilled in the art can also add, for example, 4-ring compounds of the formulae Ie4-1–Ie4-4 or, alternatively, other highly clearing substances such as, for example, $R^2$-Phe-Phe-Cyc-$R^3$ $R^2$-Cyc-Phe-Phe-Cyc-$R^3$ to the liquid crystal.

In these compounds, $R^2$ and $R^3$ are in each case independently of one another preferably alkyl, methoxy, alkoxycarbonyl or alkanoyloxy having 1-15 C atoms.

Additives of this type are known to the person skilled in the art and he can choose from the substance classes enumerated above without problem. In this connection, the person skilled in the art will preferably choose the concentration of additives of this type in such a way that in particular $\Delta n$ and/or $n_0$ and/or another refractive index and/or $\Delta \epsilon$ to be adjusted in the particular embodiment of the electrooptical system according to the invention and/or $\Delta \epsilon$ and/or further physical parameters important for the particular application are only influenced to an acceptable and/or small and/or in particular negligible extent.

If the system according to the invention is controlled, for example using an alternating voltage, the use of a highly viscous liquid crystal mixture is necessary, as otherwise, in particular at low to medium frequencies, a flickering display results. In order to increase the viscosity, the person skilled in the art can add highly viscous liquid crystal compounds to the liquid crystal mixture. These compounds are preferably selected from the group of compounds of the formula I and in particular of the formulae Ia-Ii, but they can also be taken from the abovementioned substance classes. In particular, one or more side chain polymers can also be added to increase the viscosity, as is described in DE 3,919,942. If, on the other hand, the electrooptical system is used, for example, as a matrix display having a high information content, low viscosity liquid crystal mixtures are suitable in particular for achieving small switch times.

The person skilled in the art will in this case preferably make a selection from the group of compounds of the formula I and in particular of the formulae Ia-Ii in such a way that the content of 3- and 4-ring compounds is not too high; if the use of a high content of 3- and 4-ring compounds is necessary for achieving a high clear point, the person skilled in the art will in general prefer laterally fluorinated or chlorinated compounds of the formulae Ia-Ii. However, it is also possible for the person skilled in the art to choose from the substance classes enumerated above those with low viscosity, such as, for example $R^2$-Cyc-Phe.3F-Phe-$R^3$ and to add them to the liquid crystal mixture according to the invention. $R^2$ and $R^3$ in this compound mentioned by way of example preferably have the abovementioned meanings.

The person skilled in the art will select the substances used for modifying the viscosity and their concentration such that other crucial parameters of the liquid crystal mixture such as, for example, $\Delta \epsilon$ and, when using viscosity-reducing agents, in particular $T_c$, is only influenced to an acceptable and/or small and/or insignificant extent.

If desired, highly nematogenic substances such as, for example

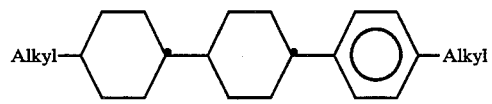

can be added, the person skilled in the art taking into account that other parameters and in particular the solubility of the liquid crystal mixture in the polymer used for the matrix is not to be too greatly altered by additions of this type.

In the case of liquid crystal mixtures which contain compounds of the formulae II-IV, for example, in order to modify the birefringence the person skilled in the art can vary the relative content of these compounds in the mixture; for mixtures having very high $\Delta n$, compounds of the formulae II1, II16, IV3 or IV4 for example, can in particular be used, while, for example, compounds of the formulae III1-III3 are preferred for liquid crystal mixtures having relatively low values of $\Delta n$. The person skilled in the art can of course also make a preferred selection from the compounds of the formula I with respect to the desired value of $\Delta n$ without problem. Thus, for example, compounds of the formula Ig are in general particularly preferred for mixtures having a relatively high or high $\Delta n$, while compounds having 2 or more saturated ring systems are in general particularly suitable (lacuna) liquid crystal mixtures according to the invention having relatively low or low values of $\Delta n$.

In order to achieve low threshold voltages, liquid crystal mixtures having a very high dielectric anisotropy $\Delta \epsilon$ are in general required. The person skilled in the art can make a selection from the group of compounds of the formula I, in particular of the formulae Ia-Ii, and furthermore from the group of compounds of the formulae II-IV and from the group of preferred component mixtures in such a way that a preferred value is obtained for $\Delta \epsilon$. In order to increase $\Delta \epsilon$, the person skilled in the art can add to the liquid crystal mixture, for example, a compound of the formula II6. These compounds are extremely strongly dielectrically positive; the propyl homologue (alkyl=$C_3H_7$) has, for example, a value of $\Delta \epsilon = 50$. The person skilled in the art will select the concentration of additives of this type so that the liquid crystal mixture is optimally suited to the particular embodiment of the electrooptical system; in particular, he will take care that $\Delta n$ and/or $n_0$ and/or one or more further refractive indices of the liquid crystal are only influenced to an acceptable and/or small and/or negligible extent.

The person skilled in the art can modify and, within certain limits, optimize the properties of liquid crystal mixtures according to the invention with respect to the particular application by making a selection from the group of compounds of the formula I and in particular of the formulae Ia-Ii, and furthermore optionally from the group of compounds of the formulae II-IV and the group of preferred component mixtures such that the liquid crystal mixture is optimized with respect to the particular application.

However, it is crucial that liquid crystals containing compounds of the formula I and in particular of the formulae Ia-Ii and in particular those liquid crystal mixtures which contain one or more compounds of the formulae II-IV are particularly suitable for use in electrooptical liquid crystal systems according to the invention. Very particularly suitable liquid crystal mixtures are those which contain one or more of the preferred component mixtures.

The liquid crystal mixtures according to the invention, which contain one or more compounds of the formula I and in particular of the formulae Ia-Ii, also represent particularly suitable "stable structure mixtures" for application in electrooptical systems, which can in general be optimized by the methods and/or additives described with respect to specific requirements without other parameters of the mixture at the same time undergoing too drastic a change and the utility of the mixture in the electrooptical systems undergoing considerably damaging change.

The liquid crystal mixtures according to the invention are particularly suitable for use in electrooptical systems according to the preamble of claim 1. Considerable commercial importance is thus ascribed to the liquid crystals according to the invention and to the electrooptical systems according to the invention.

The liquid crystal mixtures according to the invention can be modified by further additives in such a way that they can be used in all electrooptical systems according to the preamble of claim 1.

Additives of this type are known to the person skilled in the art and are described in detail in the literature. Thus, for example, pleochroitic dyes can be added for the preparation of coloured electrooptical systems or substances can be added to change the dielectric anisotropy, the optical anisotropy, the viscosity and/or the temperature dependence of electrooptical parameters of the liquid crystals. Substances of this type are described, for example, in H. Kelker and R. Hatz, Handbook of Liquid Crystals, Verlag Chemie, Weinheim, 1980 and in DE-OS 2,209,127, 2,240,864, 2,321,632, 2,338,281, 2,450,088, 2,637,430, 2,853,728 and 2,902,177.

Electrooptical liquid crystal systems in which pleochroitic dyes are added to the liquid crystal in a per cent by weight range of 0–25%, in particular 0–20% and very particularly 0–15% are preferred.

In addition, chiral mesogenic or, alternatively, non-mesongenic compounds can be added to the liquid crystal mixtures according to the invention to increase the scattering in the opaque state and/or to influence the slope of the electrooptical curve, as is described, for example, in DE 4,007,039. Liquid crystals according to the invention which contain 0–15% and in particular 0–10% of chiral additives are preferred.

The electrooptical liquid crystal systems according to the invention can be switched on by applying a direct or alternating voltage. However, an alternating voltage is preferably used which has an effective alternating voltage amplitude between 1 and 240 volts and an alternating voltage frequency between 10 Hz and 10 kHz. Amplitudes between 2 and 220 volts and frequencies between 20 and 120 Hz are particularly preferred. The amplitude of the alternating voltage is very particularly preferably between 2 and 130 V.

The liquid crystal mixtures which can be used according to the invention are prepared in a manner customary per se. As a rule, the desired amount of the components used in the smaller amount is dissolved in the components making up the main component, expediently at elevated temperature. It is also possible to mix solutions of the components in an organic solvent, for example in acetone, chloroform or methanol, and to remove the solvent again after thorough mixing, for example by distillation.

The following examples are intended to illustrate the invention without limiting it.

The symbols have the following meaning:
K: crystalline solid state,
S: smectic phase (the index characterizes the phase type),
N: nematic phase,
I: isotrope phase.

The number between 2 symbols gives the transition temperature in degrees Celsius.

The percentage data given are percentages by weight.

EXAMPLE 1 a) An electrooptical liquid crystal system, containing a liquid crystal mixture which consists of the following compounds 14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-pentylcyclohexyl)-4'-(trans-4-propylcyciohexyl)biphenyl
4.8% 4-pentyl-4"-cyanoterphenyl
6.4% 4-(trans-4-propylcyclohexyl)phenyl trans-4-butylcyclohexylcarboxylate
5.6% 4-(trans-4-pentylcyclohexyl)-4'-cyanobiphenyl
20% 1-(4-(4-pentylphenyl)phenyl)-2-(3-fluoro-4-cyanophenyl)ethane b) The electrooptical liquid crystal system is prepared by various processes 1.1–1.3 and 2.

1. Microdroplets matrix systems
   1.1 The liquid crystal mixture from a) is stirred at room temperature with the adhesive NOA 65 (Norland Products) which can be cured by UV irradiation in the ratio 1.6:1 until a clear solution is obtained, which is put, together with spacers (20 μm), between 2 transparent glass substrates provided with electrode layers. The glass substrates are pressed together whereby a uniform film having a thickness of 20 μm is obtained which is cured by UV irradiation for 1 minute.
   1.2 The liquid crystal mixture from a) is stirred at room temperature with Epikote 828 and Capcure 3-800 (Miller Stephenson Company) in the ratio 1:1:1 until a clear solution is obtained; the stirring time is kept as brief as possible, as the solution is already cured after about ½ h at room temperature. The solution is put, together with spacers (20 μm), between 2 transparent glass substrates provided with electrode layers, which are pressed together whereby a uniform film having a thickness of 20 μm is obtained. The films can be heated to temperatures up to 100° C. in order to accelerate the curing process.

1.3 5 g of the liquid crystal mixture from a) are stirred at 2,000 rpm at room temperature for 2 minutes with 15 g of 20% aqueous PVA solution. The solution obtained is degassed for 24 h and applied in a thin layer, together with spacers (20 μm), to a glass substrate provided with an electrode layer. The arrangement is dried at 85° C. for 1 h, prior to applying a second glass substrate provided with an electrode layer, whereby a uniform film having a 10 thickness of 20 μm is obtained. The system thus obtained is dried at 85° C. for a further 24 h.

2. Network system

The liquid crystal mixture from a) is stirred with trimethylolpropane triacrylate as a polymerizable compound and 2-hydroxy-2-methyl-1-phenylpropan-1-one (Darocure 1173, commercial product of E. Merck, Darmstadt) as a photoinitiator in the ratio 80: 19.8: 0.2 and put between two glass plates provided with electrode layers with addition of spacers having a thickness of 20 μm. In order to cure the polymer, the system obtained was passed through the field of radiation of a halogen lamp (70 W/cm) at a defined rate (3 m/min). The electrooptical systems prepared according to processes b) 1.1-1.3 and 2 are distinguished by a wide working temperature range, favourable values for the electrooptical parameters and their temperature dependence and in particular by a low threshold voltage.

EXAMPLE 2 a) An electrooptical liquid crystal system, containing a liquid crystal mixture which consists of the following compounds 9% p-trans-4-propylcyclohexylbenzonitrile
7% p-trans-4-butylcyclohexylbenzonitrile
12.5% p-trans-4-pentylcyclohexylbenzonitrile
7.5% p-trans-4-heptylcyclohexylbenzonitrile
3.5% 4-(trans-4-pentylcyclohexyl)-4'-(trans-4-propylcyclohexyl)biphenyl
8% 4-pentyl-4''-cyanoterphenyl
4% 4-(trans-4-propylcyclohexyl)phenyl trans-4-butylcyclohexylcarboxylate
11% 4-(trans-4-pentylcyclohexyl)-4'-cyanobiphenyl
3.5% 1-(4-(4-pentylphenyl)phenyl)-2-(4-cyanophenyl)ethane
3.5% 1-(4-(4-pentylphenyl)phenyl)-2-(3-fluoro-4-cyanophenyl)ethane
3.5% 1-(4-(4-propylphenyl)phenyl)-2-(3-fluoro-4-cyanophenyl)ethane
2.5% 4-propyl-4'-cyanobiphenyl
7.5% 4-ethyl-4'-cyanobiphenyl
17% 4-pentyl-4'-cyanobiphenyl and has the following physical parameters:
clear point $T_c = 93°$ C.
viscosity $\eta = 38$ mm$^2$ S$^{-1}$ (20° C.)
optical anisotropy $\Delta n = 0.20$ (20° C., 589 nm)
dielectric anisotropy $\Delta \epsilon = 15,2$ (20° C., 1 kHz)

b) The electrooptical liquid crystal system is prepared by the processes described in Example 1, 1.1-1.3 and 2.

EXAMPLE 3 a) An electrooptical liquid crystal system, containing a liquid crystal mixture which consists of the following compounds:

11% 4-ethyl-4'-cyanobiphenyl
5% 4-propyl-4'-cyanobiphenyl
10% 4-heptyl-4'-cyanobiphenyl
37% 4-pentyl-4'-cyanobiphenyl
12% 4-octoxy-4'-cyanobiphenyl
15% 4-pentyl-3'',5''-difluoro-4'''-cyanoterphenyl
10% 4-pentyl-3',5'-difluoro-4'''-cyanoterphenyl and has the following physical parameters:
dielectric anisotropy $\Delta \epsilon = 20.0$ (20° C., 1 kHz)
optical anisotropy $\Delta n = 0.233$ (20~C (sic) 589 nm)

b) The electrooptical liquid crystal system is prepared by the processes described in Example 1, 1.1-1.3 and 2.

EXAMPLE 4 a) An electrooptical liquid crystal system, containing a liquid crystal mixture which consists of the following compounds:

28% 2-(4-cyanophenyl)-5-ethylpyridine
28% 2-(4-cyanophenyl)-5-propylpyridine
29% 2-(4-cyanophenyl)-5-pentylpyridine
15% 4-pentyl-3'',5''-difluoro-4'''-cyanoterphenyl b) The electrooptical liquid crystal system is prepared by the processes described in Example 1, b).

EXAMPLE 5 a) An electrooptical liquid crystal system, containing a liquid crystal mixture which consists of the following compounds:

19% 2-(4-cyanophenyl)-5-ethylpyridine
19% 2-(4-cyanophenyl)-5-butylpyridine
19% 2-(4-cyanophenyl)-5-pentylpyridine
19% 4-pentyl-2-fluoro-4'-cyanobiphenyl
12% 1-(4-(4-pentylphenyl)phenyl)-2-(3-fluoro-4-cyanophenyl)ethane
12% 4-pentyl-4'-cyanoterphenyl b) The electrooptical liquid crystal system is prepared by the processes described in Example 1, b).

EXAMPLE 6 a) An electrooptical liquid crystal system, containing a liquid crystal mixture which consists of the following compounds:

20% 2-(4-cyanophenyl)-5-ethylpyrimidine
20% 2-(4-cyanophenyl)-5-propylpyrimidine
20% 2-(4-cyanophenyl)-5-pentylpyrimidine
20% 4-pentyl-3'',5''-difluoro-4'''-cyanoterphenyl
20% 4-pentyl-4'-cyanobiphenyl b) The electrooptical liquid crystal system is prepared by the processes described in Example 1b).

EXAMPLE 7 a) An electrooptical system, containing a liquid crystal mixture which consists of the following compounds:

20% 1-(trans-4-(trans-4-propylcyclohexyl)-cyclohexyl)-2-(3-fluoro-4-cyanophenyl)-ethane
14.4% p-trans -4-propylcyclohexylbenzonitrile
11.2% p-trans -4-butylcyclohexylbenzonitrile
20% p-trans-4-pentycyclohexylbenzonitrile (sic)
12% p-trans-4-heptylcyclohexylbenzonitrile
5.6% 4-(trans-4-pentylcyclohexyl)-4'-(trans-4-propylcyclohexyl)biphenyl
4.8% 4-pentyl-4''-cyanoterphenyl 6.4% 4-(trans-4-propylcyclohexyl)phenyl trans-4-butylcyclohexylcarboxylate
5.6% 4-(trans-4-pentylcyclohexyl)-4'-cyanobiphenyl b) The electrooptical systems prepared by the processes described in Example 1b) are distinguished by a wide working temperature range, favourable values for the electrooptical parameters and their temperature dependence and in particular by a low threshold voltage.

EXAMPLE 8 a) A liquid crystal mixture consisting of
43% 4-pentyl-4'-cyanobiphenyl
17% 4-propoxy-4'-cyanobiphenyl
13% 4-pentoxy-4'-cyanobiphenyl
17% 4-octoxy-4'-cyanobiphenyl
10% 4-pentyl-4''-cyanoterphenyl
has the following physical data:
  birefringence $\Delta n = 0.246$ (20° C., 589 nm)
  threshold voltage V[90.0.20] = 1.44 V
The threshold voltage was measured in a TN cell (twist angle $\Psi = \pi/4$) which has a cell clearance of $d = 7\ \mu m$ and is located between crossed polarizers.

b) A liquid crystal mixture consisting of
30% 4-pentyl-4'-cyanobiphenyl
15% 4-ethyl-4'-cyanobiphenyl
20% 4-(propylphenyl)-3-fluoro-4'-cyanobiphenyl
10% 4-propyl-2-fluoro-4'-cyanobiphenyl
15% 4-pentyl-2-fluoro-4'-cyanobiphenyl
10% 4-pentyl-4''-fluoro-4'''-cyanoterphenyl
has the following physical characteristics:
  birefringence $\Delta n = 0.246$
  threshold voltage V[90.0.20] = 1.26 V
The threshold voltage was measured in a TN cell (twist angle $\Psi = \pi/4$) which has a cell clearance of $d = 7\ \mu m$ and is located between crossed polarizers.

The advantageous properties of the mixtures according to the present invention are clear from a comparison of the results of Examples 8a) and b).

c) Electrooptical systems were prepared by the processes described in Example 1b) using the mixtures from Examples 8a) and b). The system prepared with the liquid crystal mixture from Example 8b) has more advantageous properties than the system prepared with the mixture from 8a) and is in particular distinguished by a lower threshold voltage.

EXAMPLE 9 a) A liquid crystal mixture consisting of
20% 4-(trans-4-pentylcyclohexyl)benzonitrile
15% 4-pentyl-4'-cyanobiphenyl
15% 4-ethyl-4'-cyanoterphenyl
5% 4-pentyl-4''-cyanoterphenyl
15% 4-(4-propylphenyl)-3-fluoro-4'-cyanobiphenyl
10% 4-propyl-2-fluoro-4'-cyanobiphenyl
15% 4-pentyl-2-fluoro-4'-cyanobiphenyl
5% 4-(trans-4-pentylcyclohexyl)-4'-cyanobiphenyl
has the following physical characteristics:
  birefringence $\Delta n = 0.218$ (20° C., 589 nm)
  ordinary refractive index $n_0 = 1.522$ (20° C., 589 nm)
  dielectric anisotropy $\Delta\epsilon = 16.71$ (20° C., 1 kHz)
  threshold voltage V[90.0.20] = 1.33 V
The threshold voltage was measured in a TN cell (twist angle $\Psi = \pi/4$) which has a cell clearance of $d = 7\ \mu m$ and is located between crossed polarizers.

b) The electrooptical systems prepared by the processes described in Example 1b) are distinguished by a wide working temperature range, favourable values for the electrooptical parameters and their temperature dependence and in particular by a low threshold voltage.

EXAMPLE 10 a) A liquid crystal mixture consisting of
12% 4-ethyl-4-cyanobiphenyl
4% 4-propyl-4-cyanobiphenyl
29.6% 4-pentyl-4-cyanobiphenyl
8.8% 4-propxy-4-cyanobiphenyl (sic)
8.0% 4-pentyl-4''-cyanoterphenyl
20.0% 4-(4-propylphenyl)-3-fluoro-4'-cyanobiphenyl
5.6% 4-(4-cyanophenyl)phenyl 4-(4-heptylphenyl)-phenylcarboxylates
12% 4-(trans-4-pentylcyclohexyl)-4'-cyanobiphenyl
has the following physical characteristics:
  birefringence $\Delta n = 0.286$ (20° C., 589 nm)
  ordinary refractive index $n_0 = 1.530$ (20° C., 589 nm)
  dielectric anisotropy $\Delta\epsilon = 13.5$ (20° C., 1 kHz)
  threshold voltage V[90.0.20] = 1.66 V
  extinction coefficient
    $\gamma = 1.629$ for $\lambda = 350$ nm
    $\gamma = 0.130$ for $\lambda = 360$ nm
    $\gamma = 0.006$ for $\lambda = 370$ nm
  clear point N 113 I
The extinction coefficient is determined according to $$\gamma = \frac{A}{1 \cdot C_w}$$

where A is the absorption, 1 is the thickness of the liquid crystal layer crossed by the light in cm and $C_w$ is the mass of the liquid crystal in g per 100 ml of solution.

The threshold voltage was measured as indicated in Example 9a).

b) The electrooptical systems prepared by the processes described in Example 1b) are distinguished by a wide working temperature range, favourable values for the electrooptical parameters and their temperature dependence and in particular by a low threshold voltage.

EXAMPLE 11 a) A liquid crystal mixture consisting of
14.0% 4-ethyl-4-cyanobiphenyl
5.0% 4-propyl-4-cyanobiphenyl
33.0% 4-pentyl-4-cyanobiphenyl
12.0% 4-propxy-4-cyanobiphenyl (sic)
10.0% 4-pentyl-4''-cyanoterphenyl
23.0% 4-(4-propylphenyl)-3-fluoro-4'-cyanobiphenyl
3.0% 4-(4-cyanophenyl)phenyl 4-(4-heptylphenyl)-phenylcarboxylates
has the following physical characteristics:
  birefringence $\Delta n = 0.287$ (20° C., 589 nm)
  ordinary refractive index $n_0 = 1.533$ (20° C., 589 nm)
  dielectric anisotropy $\Delta\epsilon = 14.1$ (20° C., 1 kHz)
  threshold voltage V[90.0.20] = 1.60 V
  clear point N 96 I
The threshold voltage was measured as indicated in Example 9a).

b) The electrooptical systems prepared by the processes described in Example 1b) are distinguished by a wide working temperature range, favourable values for the electrooptical parameters and their temperature dependence and in particular by a low threshold voltage.

EXAMPLE 12 a) A liquid crystal mixture consisting of
35.0% 4-pentyl-4'-cyanobiphenyl
12.0% 4-propoxy-4'-cyanobiphenyl
14.0% 4-pentoxy-4'-cyanobiphenyl
6.0% 4-pentyl-4''-cyanoterphenyl
23.0% 4-(4-propylphenyl)-3-fluoro-4'-cyanobiphenyl
3.0% 4-(4-cyanophenyl)phenyl 4-(4-heptylphenyl)-phenylcarboxylates
7.0% 4-octoxy-4'-cyanobiphenyl
has the following physical characteristics:
  birefringence $\Delta n = 0.280$ (20° C., 589 nm)
  ordinary refractive index $n_0 = 1.527$ (20° C.)
  dielectric anisotropy $\Delta\epsilon = 13.0$ (20° C., 1 kHz)
  threshold voltage $V[90.0.20] = 1.71$ V
  clear point N 97 I
The threshold voltage was measured as indicated in Example 9a).

b) The electrooptical systems prepared by the processes described in Example 1b) are distinguished by a wide working temperature range, favourable values for the electrooptical parameters and their temperature dependence and in particular by a low threshold voltage.

EXAMPLE 13 a) A liquid crystal mixture consisting of
32.0% 4-pentyl-4'-cyanobiphenyl
12.0% 4-propoxy-4'-cyanobiphenyl
13.0% 4-pentoxy-4'-cyanobiphenyl
8.0% 4-pentyl-4''-cyanoterphenyl
22.0% 4-(4-propylphenyl)-4-fluoro-4'-cyanobiphenyl
3.0% 4-(4-cyanophenyl)phenyl 4-(4-heptylphenyl)-phenylcarboxylates
5.0% 4-octoxy-4'-cyanobiphenyl
5.0% 4-(trans-4-pentylcyclohexyl)-4'-cyanobiphenyl
has the following physical characteristics:
  birefringence $\Delta n = 0.284$ (20° C., 589 nm)
  ordinary refractive index $n_0 = 1.526$ (20° C., 589 nm)
  clear point N 108 I b) The electrooptical systems prepared by the processes described in Example 1b) are distinguished by a wide working temperature range, favourable values for the electrooptical parameters and their temperature dependence and in particular by a low threshold voltage.

EXAMPLE 14 a) A liquid crystal mixture consisting of
33.0% 4-pentyl-4'-cyanobiphenyl
12.0% 4-propoxy-4'-cyanobiphenyl
14.0% 4-pentoxy-4'-cyanobiphenyl
10.0% 4-pentyl-4''-cyanoterphenyl
23.0% 4-(4-propylphenyl)-3-fluoro-4'-cyanobiphenyl
3.0% 4-(4-cyanophenyl)phenyl 4-(4-heptylphenyl)-phenylcarboxylates
5.0% 4-octoxy-4'-cyanobiphenyl
has the following physical characteristics:
  birefringence $\Delta n = 0.288$ (20° C., 589 nm)
  ordinary refractive index $n_0 = 1.528$ (20° C., 589 nm)
  clear point N 105 I b) The electrooptical systems prepared by the processes described in Example 1b) are distinguished by a wide working temperature range, favourable values for the electrooptical parameters and their temperature dependence and in particular by a low threshold voltage.

EXAMPLE 15 a) A liquid crystal mixture consisting of
30% 4-hexyl-4'-cyanobiphenyl
10.0% 4-pentoxy-4'-cyanobiphenyl
7.0% 4-octoxy-4'-cyanobiphenyl
5.0% 4-pentyl-4''-cyanoterphenyl
15.0% 4-(4-propylphenyl)-3-fluoro-4'-cyanobiphenyl
5.0% 4-(trans-4-pentylcyclohexyl)benzonitrile
8.0% 1- propoxy-trans-4-(trans -4-propylcyclohexyl)-cyclohexane
20.0% 4-(trans-4-pentylcyclohexyl)-4'-cyanobiphenyl
has the following physical characteristics:
  birefringence $\Delta n = 0.2293$ (20° C., 589 nm)
  ordinary refractive index $n_0 = 1.5151$ (20° C., 589 nm)
  clear point N 102 I b) The electrooptical systems prepared by the processes described in Example 1b) are distinguished by a wide working temperature range, favourable values for the electrooptical parameters and their temperature dependence and in particular by a low threshold voltage.

EXAMPLE 16 a) A liquid crystal mixture consisting of
32.0% 4-pentyl-4'-cyanobiphenyl
12.0% 4-propoxy-4'-cyanobiphenyl
13.0% 4-pentoxy-4'-cyanobiphenyl
6.0% 4-pentyl-4''-cyanoterphenyl
23.0% 4-(4-propylphenyl)-3-fluoro-4'-cyanobiphenyl
3.0% 4-(4-cyanophenyl)phenyl 4-(4-heptylphenyl)-phenylcarboxylates
5.0% 4-octoxy-4'-cyanobiphenyl
6.0% 4-(trans-4-pentylcyclohexyl)-4'-cyanobiphenyl
has the following physical characteristics:
  birefringence $\Delta n = 0.283$ (20° C., 589 nm)
  ordinary refractive index $n_0 = 1.564$ (20° C., 589 nm)
  dielectric anisotropy $\Delta\epsilon = 12.8$ (20° C., 1 kHz)
  threshold voltage $V[90.0.20] = 1.73$ V
  clear point N 108 I
The threshold voltage is measured by the process indicated in Example 9a).

b) The electrooptical systems prepared by the processes described in Example 1b) are distinguished by a wide working temperature range, favourable values for the electrooptical parameters and their temperature dependence and in particular by a low threshold voltage.

EXAMPLE 17 a) A liquid crystal mixture consisting of
10.0% 4-pentoxy-4'-cyanobiphenyl
7.0% 4-octoxy-4'-cyanobiphenyl
31.0% 4-hexyl-4'-cyanobiphenyl
12.0% 4-(trans-4-pentylcyclohexyl)benzonitrile
20.0% 4-(trans-4-pentylcyclohexyl)-4'-cyanobiphenyl
15.0% 4-(4-propylphenyl)-3-fluoro-4'-cyanobiphenyl
5.0% 4-pentyl-4''-cyanoterphenyl has the following physical characteristics:
- birefringence Δn=0.2373 (20° C., 589 nm)
- ordinary refractive index n₀=1.5183 (20° C., 589 nm)
- dielectric anisotropy Δε=14.0
- clear point N 105 I b) The electrooptical systems prepared by the processes described in Example 1b) are distinguished by a wide working temperature range, favourable values for the electrooptical parameters and their temperature dependence and in particular by a low threshold voltage.

EXAMPLE 18 a) A liquid crystal mixture consisting of
- 20.0% 4-(trans-4-pentylcyclohexyl)benzonitrile
- 15.0% 4-(trans-4-propylcyclohexyl)benzonitrile
- 10.0% 4-(trans-4-butylcyclohexyl)benzonitrile
- 10.0% 4-pentyl-4'-cyanobiphenyl
- 10.0% 4-ethyl-4'-cyanobiphenyl
- 7.0% 4-propyl-4-cyanobiphenyl
- 10.0% 4-(trans-4-pentylcyclohexyl)-4'-cyanobiphenyl
- 10.0% 4-(4-propylcyclohexyl)-3-fluoro-4'-cyanobiphenyl
- 8.0% 4-pentyl-4''-cyanoterphenyl has the following physical characteristics:
- birefringence Δn=0.2042 (20° C., 589 nm)
- ordinary refractive index n₀=1.5132 (20° C., 589 nm)
- dielectric anisotropy Δε=14.8 (20° C., 1 kHz)
- clear point N 81 I b) The electrooptical systems prepared by the processes described in Example 1b) are distinguished by a wide working temperature range, favourable values for the electrooptical parameters and their temperature dependence and in particular by a low threshold voltage.

EXAMPLE 19 a) A liquid crystal mixture consisting of
- 30.0% 4-pentyl-4'-cyanobiphenyl
- 15.0% 4-ethyl-4'-cyanobiphenyl
- 20.0% 4-(4-propylphenyl)-3-fluoro-4'-cyanobiphenyl
- 10.0% 4-propyl-2-fluoro-4'-cyanobiphenyl
- 15.0% 4-pentyl-2-fluoro-4'-cyanobiphenyl
- 10.0% 4-pentyl-3''-fluoro-4''-cyanoterphenyl has the following physical characteristics:
- birefringence Δn=0.246 (20° C., 589 nm)
- threshold voltage V[90.0.20]=1.26 V
- clear point N 62 I The threshold voltage is measured by the process indicated in Example 9a).

b) The electrooptical systems prepared by the processes described in Example 1b) are distinguished by a wide working temperature range, favourable values for the electrooptical parameters and their temperature dependence and in particular by a low threshold voltage.

EXAMPLE 20 a) A liquid crystal mixture consisting of
- 25.0% 4-pentyl-4'-cyanobiphenyl
- 15.0% 4-ethyl-4'-cyanobiphenyl
- 18.0% 4-(4-propylphenyl)-3-fluoro-4'-cyanobiphenyl
- 10.0% 4-propyl-2-fluoro-4'-cyanobiphenyl
- 10.0% 4-pentyl-2-fluoro-4'-cyanobiphenyl
- 10.0% 4-pentyl-3'',5''-difluoro-4''-cyanoterphenyl
- 6.0% 4-nonyl-3''-fluoro-4''-cyanoterphenyl
- 6.0% 1-[trans-4-(trans-4-propylcyclohexyl)cyclohexyl]-2-[4-(4-cyanophenyl)phenyl]ethane has the following physical characteristics:
- birefringence Δn=0.258 (20° C., 589 nm)
- threshold voltage V[90.0.20]=1.33 V
- dielectric anisotropy Δε=19.7 (20° C., 1 kHz)
- clear point N 82 I The threshold voltage is measured by the process indicated in Example 9a).

b) The electrooptical systems prepared by the processes described in Example 1b) are distinguished by a wide working temperature range, favourable values for the electrooptical parameters and their temperature dependence and in particular by a low threshold voltage.

EXAMPLE 21 a) An electrooptical liquid crystal system, containing a liquid crystal mixture which consists of the following compounds
- 14.4% p-trans-4-propylcyclohexylbenzonitrile
- 11.2% p-trans-4-butylcyclohexylbenzonitrile
- 20% p-trans-4-pentylcyclohexylbenzonitrile
- 12% p-trans-4-heptylcyclohexylbenzonitrile
- 5.6% 4-(trans-4-pentylcyclohexyl)-4'-(trans-4-propylcyclohexyl)biphenyl
- 4.8% 4-pentyl-4''-cyanoterphenyl
- 6.4% 4-(trans-4-propylcyclohexyl)phenyl trans-4-butylcyclohexylcarboxylate
- 5.6% 4-(trans-4-pentylcyclohexyl)-4'-cyanobiphenyl
- 20% 2-(3-fluoro-4-cyanophenyl)-5-pentylpyrimidine has the following physical parameters:
- viscosity η=34 mm² s⁻¹ (20° C.)
- optical anisotropy Δn=0.15 (20° C., 589 nm)
- dielectric anisotropy Δε=17.8 (20° C., 1 kHz)

b) The electrooptical systems prepared by the processes described in Example 1b) are distinguished by a wide working temperature range, favourable values for the electrooptical parameters and their temperature dependence and in particular by a low threshold voltage.

EXAMPLE 22 a) An electrooptical liquid crystal system, containing a liquid crystal mixture which consists of the following compounds
- 14.4% p-trans-4-propylcyclohexylbenzonitrile
- 11.2% p-trans-4-butylcyclohexylbenzonitrile
- 20% p-trans-4-pentylcyclohexylbenzonitrile
- 12% p-trans-4-heptylcyclohexylbenzonitrile
- 5.6% 4-(trans-4-pentylcyclohexyl)-4'-(trans-4-propylcyclohexyl)biphenyl
- 4.8% 4-pentyl-4''-cyanoterphenyl
- 6.4% 4-(trans-4-propylcyclohexyl)phenyl trans-4-butylcyclohexylcarboxylate
- 5.6% 4-(trans-4-pentylcyclohexyl)-4'-cyanobiphenyl
- 20% 2-(4-cyanophenyl)-5-propylpyridine and has the following physical parameters:
- clear point $T_c$=80° C.
- viscosity η=33 mm² s⁻¹ (20° C.)
- optical anisotropy Δn=0.16 (20° C., 589 nm)
- dielectric anisotropy Δε=15.5 (20° C., 1 kHz)

b) The electrooptical systems prepared by the processes described in Example 1b) are distinguished by a wide working temperature range, favourable values for the electrooptical parameters and their temperature dependence and in particular by a low threshold voltage.

EXAMPLE 23 a) An electrooptical liquid crystal system, containing a liquid crystal mixture which consists of the following compounds
- 14.5% p-trans-4-propylcyclohexylbenzonitrile
- 11.2% p-trans-4-butylcyclohexylbenzonitrile
- 20% p-trans-4-pentylcyclohexylbenzonitrile
- 12% p-trans-4-heptylcyclohexylbenzonitrile
- 5.6% 4-(trans-4-pentylcyclohexyl)-4'-(trans-4-propylcyclohexyl)biphenyl
- 6.4% 4-(trans-4-propylcyclohexyl)phenyl trans-4-butylcyclohexylcarboxylate
- 5.6% 4-(trans-4-pentylcyclohexyl)-4'-cyanobiphenyl
- 4.8% 4-pentyl-4''-cyanoterphenyl
- 20% 2-(4-cyanophenyl)-5-pentylpyrimidine and has the following physical parameters:
clear point $T_c = 82°$ C.
viscosity $\eta = 34$ mm$^2$ s$^{-1}$ (20° C.)
optical anisotropy $\Delta n = 0.16$ (20° C., 589 nm)
dielectric anisotropy $\Delta\epsilon = 16.1$ (20° C., 1 kHz)

b) The electrooptical systems prepared by the processes described in Example 1b) are distinguished by a wide working temperature range, favourable values for the electrooptical parameters and their temperature dependence and in particular by a low threshold voltage.

EXAMPLE 24 a) An electrooptical liquid crystal system, containing a liquid crystal mixture which consists of the following compounds:
- 17% 1-difluoromethoxy-2-fluoro-4-[trans-4-(trans-4-ethylcyclohexyl)cyclohexyl]-benzene
- 17% 1-difluoromethoxy-2-fluoro-4-[trans-4-(trans-4-butylcyclohexyl)cyclohexyl]-benzene
- 17% 1-difluoromethoxy-2-fluoro-4-[trans-4-(trans-4-pentylcyclohexyl)cyclohexyl]-benzene
- 11% 1-difluoromethoxy-4-[trans-4-(trans-4-pentylcyclohexyl)cyclohexyl]benzene
- 6% 1-(trans-4-propylcyclohexyl)-2-(4-difluoromethoxyphenyl)ethane
- 6% 1-(trans-4-pentylcyclohexyl)-2-(4-difluoromethoxyphenyl)ethane
- 6% 1-difluoromethoxy-4-(trans-4-pentylcyclohexyl)-benzene
- 8% 4-propyl-4'-difluoromethoxybiphenyl
- 12% 4-(trans-4-propylcyclohexyl)-4'-difluoromethoxybiphenyl and has the following physical parameters:
clear point $T_c = 87°$ C.
viscosity $\eta = 19$ mm$^2$ s$^{-1}$ (20° C.)
optical anisotropy $\Delta n = 0.0985$ (20° C., 589 nm)
dielectric anisotropy $\Delta\epsilon = 6.3$ (20° C., 1 kHz)

b) The electrooptical liquid crystal system is prepared by the processes described in Example 1b), 1.1–1.3 and 2.

The electrooptical systems prepared by processes b) 1.1–1.3 and 2 are distinguished by a good preparation capability, a wide working temperature range, favourable values for the electrooptical parameters and their temperature dependence, a low threshold voltage and a good contrast and in particular a high stability.

EXAMPLE 25 a) An electrooptical liquid crystal system, containing a liquid crystal mixture which consists of the following compounds:
- 20% 2-(4-cyanophenyl)-5-propylpyridine
- 20% 2-(4-cyanophenyl)-5-butylpyridine
- 20% 2-(4-cyanophenyl)-5-pentylpyridine
- 25% 4-pentyl-4'-cyanobiphenyl
- 15% 4-pentyl-4''-cyanoterphenyl b) The electrooptical systems prepared by the processes described in Example 1b) are distinguished by a wide working temperature range, favourable values for the electrooptical parameters and their temperature dependence and in particular by a low threshold voltage.

EXAMPLE 26 a) An electrooptical liquid crystal system, containing a liquid crystal mixture which consists of the following compounds:
- 20% 2-(4-cyanophenyl)-5-propylpyridine
- 20% 2-(4-cyanophenyl)-5-butylpyridine
- 20% 2-(4-cyanophenyl)-5-pentylpyridine
- 20% 4-pentyl-2-fluoro-4'-cyanobiphenyl
- 10% 1-(4-(4-pentylphenyl)phenyl)-2-(3-fluoro-4-cyanophenyl)ethane
- 10% 4-pentyl-4'-cyanoterphenyl b) The electrooptical systems prepared by the processes described in Example 1b) are distinguished by a wide working temperature range, favourable values for the electrooptical parameters and their temperature dependence and in particular by a low threshold voltage.

EXAMPLE 27 a) An electrooptical liquid crystal system, containing a liquid crystal mixture which consists of the following compounds:
- 30% 2-(4-cyanophenyl)-5-propylpyridine
- 30% 2-(4-cyanophenyl)-5-butylpyridine
- 20% 2-(4-cyanophenyl)-5-pentylpyridine
- 10% 2-(4-cyanophenyl)-5-(4-pentylphenyl)pyridine
- 10% 1-(4-(5-pentylpyridin-2-yl)phenyl)-2-(3-fluoro-4-cyanophenyl)ethane b) The electrooptical systems prepared by the processes described in Example 1b) are distinguished by a wide working temperature range, favourable values for the electrooptical parameters and their temperature dependence and in particular by a low threshold voltage.

EXAMPLE 28 a) An electrooptical liquid crystal system, containing a liquid crystal mixture which consists of the following compounds:
- 30% 2-(4-cyanophenyl)-5-propylpyridine
- 30% 2-(4-cyanophenyl)-5-butylpyridine
- 20% 2-(4-cyanophenyl)-5-pentylpyridine
- 10% 1-(4-(4-pentylphenyl)phenyl)-2-(3-fluoro-4-cyanophenyl)ethane
- 10% 1-(4-pentylphenyl)-2-(4-(4-cyanophenyl)phenyl)ethane b) The electrooptical systems prepared by the processes described in Example 1b) are distinguished by a wide working temperature range, favourable values for the electrooptical parameters and their temperature dependence and in particular by a low threshold voltage.

EXAMPLE 29 a) An electrooptical liquid crystal system, containing a liquid crystal mixture which consists of the following compounds:
- 20% 2-(4-cyanophenyl)-5-ethylpyrimidine
- 20% 2-(4-cyanophenyl)-5-propylpyrimidine
- 20% 2-(4-cyanophenyl)-5-pentylpyrimidine
- 20% 4-pentyl-3″,5″-difluoro-4″-cyanoterphenyl
- 20% 2-fluoro-4-pentyl-4′-cyanobiphenyl b) The electrooptical systems prepared by the processes described in Example 1b) are distinguished by a wide working temperature range, favourable values for the electrooptical parameters and their temperature dependence and in particular by a low threshold voltage.

EXAMPLE 30 a) An electrooptical liquid crystal system, containing a liquid crystal mixture which consists of the following compounds
- 10.0% 2-(4-cyanophenyl)-5-propyl-1,3-dioxane
- 15.0% 2-(4-cyanophenyl)-5-butyl-1,3-dioxane
- 15.0% 2-(4-cyanophenyl)-5-pentyl-1,3-dioxane
- 20.0% 4-(trans-4-propylcyclohexyl)benzonitrile
- 15.0% 4-(trans-4-pentylcyclohexyl)benzonitrile
- 10.0% 4-(trans-4-heptylcyclohexyl)benzonitrile
- 5.0% 4-(trans-4-propylcyclohexyl)-4′-(trans-4-propylcyclohexyl)biphenyl
- 5.0% 4-(trans-4-pentylcyclohexyl)-4′-(trans-4-pentylcyclohexyl)biphenyl
- 5.0% 4-(trans-4-pentylcyclohexyl)-4′-(trans-4-propylcyclohexyl)biphenyl and has the following physical characteristics:
clear point $T_c = 76°$ C.
viscosity $\eta = 34$ mm$^2$ s$^{-1}$ (20° C.)
optical anisotropy $\Delta n = 0.131$ (589 nm, 20° C.)
dielectric anisotropy $\Delta\epsilon = 17$ (1 kHz, 20° C.)

b) The electrooptical systems prepared by the processes described in Example 1b) are distinguished by a wide working temperature range, favourable values for the electrooptical parameters and their temperature dependence and in particular by a low threshold voltage.

EXAMPLE 31 a) An electrooptical liquid crystal system, containing a liquid crystal mixture which consists of the following compounds
- 15.0% 2-(4-cyanophenyl)-5-propyl-1,3-dioxane
- 10.0% 2-(4-cyanophenyl)-5-butyl-1,3-dioxane
- 15.0% 2-(4-cyanophenyl)-5-pentyl-1,3-dioxane
- 15.0% 2-(4-cyanophenyl)-5-propylpyridine
- 15.0% 2-(4-cyanophenyl)-5-butylpyridine
- 15.0% 2-(4-cyanophenyl)-5-pentylpyridine
- 5.0% 4-(trans-4-propylcyclohexyl)-4′-(trans-4-propylcyclohexyl)biphenyl
- 5.0% 4-(trans-4-pentylcyclohexyl)-4′-(trans-4-pentylcyclohexyl)biphenyl
- 5.0% 4-(trans-4-pentylcyclohexyl)-4′-(trans-4-propylcyclohexyl)biphenyl and has the following physical parameters:
clear point $T_c = 68°$ C.
viscosity $\eta = 45$ mm$^2$ s$^{-1}$ (20° C.)
optical anisotropy $\Delta n = 0.131$ (20° C., 589 nm)
dielectric anisotropy $\Delta\epsilon = 17$ (1 kHz, 20° C.)

b) The electrooptical systems prepared by the processes described in Example 1b) are distinguished by a wide working temperature range, favourable values for the electrooptical parameters and their temperature dependence and in particular by a low threshold voltage.

EXAMPLE 32 a) An electrooptical liquid crystal system, containing a liquid crystal mixture which consists of the following compounds
- 15% 2-(4-cyanophenyl)-5-propyl-1,3-dioxane
- 15% 2-(4-cyanophenyl)-5-butyl-1,3-dioxane
- 15% 2-(4-cyanophenyl)-5-pentyl-1,3-dioxane
- 20% 4-pentyl-4′-cyanobiphenyl
- 20% 4-heptyl-4′-cyanobiphenyl
- 5% 4-(trans-4-propylcyclohexyl)-4′-(trans-4propylcyclohexyl)biphenyl
- 5% 4-(trans-4-pentylcyclohexyl)-4′-(trans-4pentylcyclohexyl)biphenyl
- 5% 4-(trans-4-pentylcyclohexyl)-4′-(trans-4propylcyclohexyl)biphenyl and has the following physical parameters:
clear point $T_c = 72°$ C.
viscosity $\eta = 38$ mm$^2$ s$^{-1}$ (20° C.)
optical anisotropy $\Delta n = 0.166$ (589 nm, 20° C.)
dielectric anisotropy $\Delta\epsilon = 20$ (1 kHz, 20° C.)

b) The electrooptical systems prepared by the processes described in Example 1b) are distinguished by a wide working temperature range, favourable values for the electrooptical parameters and their temperature dependence and in particular by a low threshold voltage.

EXAMPLE 33 a) An electrooptical liquid crystal system, containing a liquid crystal mixture which consists of the following compounds
- 10% 2-(4-cyanophenyl)-5-propyl-1,3-dioxane
- 10% 2-(4-cyanophenyl)-5-butyl-1,3-dioxane
- 15% 2-(4-cyanophenyl)-5-pentyl-1,3-dioxane
- 5% 2-(4-cyanophenyl)-5-pentylpyrimidine
- 10% 2-(4-cyanophenyl)-5-heptylpyrimidine
- 15% 4-(trans-4-propylcyclohexyl)benzonitrile
- 10% 4-(trans-4-pentylcyclohexyl)benzonitrile
- 10% 4-(trans-4-heptylcyclohexyl)benzonitrile
- 5% 4-(trans-4-propylcyclohexyl)-4′-(trans-4-propylcyclohexyl)biphenyl
- 5% 4-(trans-4-pentylcyclohexyl)-4′-(trans-4-propylcyclohexyl)biphenyl
- 5% 4-(trans-4-pentylcyclohexyl)-4′-(trans-4-propylcyclohexyl)biphenyl and has the following physical parameters:
clear point $T_c = 76°$ C.
viscosity $\eta = 38$ mm$^2$ s$^{-1}$ (20° C.)
optical anisotropy $\Delta n = 0.15$ (589 nm, 20° C.)
dielectric anisotropy $\Delta\epsilon = 21$ (1 kHz, 20° C.)

b) The electrooptical systems prepared by the processes described in Example 1b) are distinguished by a wide working temperature range, favourable values for the electrooptical parameters and their temperature dependence and in particular by a low threshold voltage.

EXAMPLE 34 a) An electrooptical liquid crystal system, containing a liquid crystal mixture which consists of the following compounds:

20% 1-(4-(4-pentylphenyl)phenyl)-2-(4-cyanophenyl)ethane
14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-pentylcyclohexyl)-4′-(trans-4-propylcyclohexyl)biphenyl
4.8% 4-pentyl-4″-cyanoterphenyl
6.4% 4-(trans-4-propylcyclohexyl)phenyl trans-4-butylcyclohexylcarboxylate
5.6% 4-(trans-4-pentylcyclohexyl)-4′-cyanobiphenyl b) The electrooptical systems prepared by the processes described in Example 1b) are distinguished by a wide working temperature range, favourable values for the electrooptical parameters and their temperature dependence and in particular by a low threshold voltage.

EXAMPLE 35 a) An electrooptical liquid crystal system, containing a liquid crystal mixture which consists of the following compounds
14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-pentylcyclohexyl)-4′-(trans-4-propylcyclohexyl)biphenyl
4.8% 4-pentyl-4″-cyanoterphenyl
6.4% 4-(trans-4-propylcyclohexyl)phenyl trans-4-butylcyclohexylcarboxylate
5.6% 4-(trans-4-pentylcyclohexyl)-4′-cyanobiphenyl
20% 1-(trans-4-pentylcyclohexyl)-2-(4-cyanophenyl)ethane and has the following physical parameters:
clear point $T_c = 80°$ C.
viscosity $\eta = 29$ mm$^2$ s$^{-1}$ (20° C.)
optical anisotropy $\Delta n = 0.14$ (20° C., 589 nm)
dielectric anisotropy $\Delta\epsilon = 11.8$ (20° C., 1 kHz)

b) The electrooptical systems prepared by the processes described in Example 1b) are distinguished by a good preparation capability, a wide working temperature range, favourable values for the electrooptical parameters and their temperature dependence, and by a low threshold voltage and a high contrast.

EXAMPLE 36 a) An electrooptical liquid crystal system, containing a liquid crystal mixture which consists of the following compounds
21.2% 2-(4-cyanophenyl)-5-propylpyridine
21.2% 2-(4-cyanophenyl)-5-butylpyridine
21.2% 2-(4-cyanophenyl)-5-pentylpyridine
21.2% 2-(4-cyanophenyl)-5-(4-pentylphenyl)pyridine
5.0% 4-propoxy-4′-fluorotolan
5.0% 4-butoxy-4′-fluorotolan
5.0% 4-pentoxy-4′-fluorotolan
and has the following physical parameters:
clear point $T_c = 75°$ C.
viscosity $\eta = 58$ mm$^2$ s$^{-1}$ (20° C.)
optical anisotropy $\Delta n = 0.2627$ (20° C., 589 nm)
ordinary refractive index $n_0 = 1.5277$ (20° C., 589 nm) dielectric anisotropy $\Delta\epsilon = 22.6$ (20° C., 1 kHz)

b) The electrooptical systems prepared by the processes described in Example 1b) are distinguished by a good preparation capability, a wide working temperature range, favourable values for the electrooptical parameters and their temperature dependence, by a low threshold voltage and a high contrast.

EXAMPLE 37 a) An electrooptical liquid crystal system, containing a liquid crystal mixture which consists of the following compounds
16.9% p-trans-4-propylcyclohexylbenzonitrile
13.7% p-trans-4-butylcyclohexylbenzonitrile
22.5% p-trans-4-pentylcyclohexylbenzonitrile
14.5% p-trans-4-heptylcyclohexylbenzonitrile
5.6% 4-(trans-4-pentylcyclohexyl)-4′-(trans-4-propylcyclohexyl)biphenyl
4.8% 4-pentyl-4″-cyanoterphenyl
6.4% 4-(trans-4-propylcyclohexyl)phenyl trans-4-butylcyclohexylcarboxylate
5.6% 4-(trans-4-pentylcyclohexyl)-4′-cyanobiphenyl
10.0% 1-[4-[trans-4-(trans-4-propylcyclohexyl)cyclohexyl]phenyl]-2-(4-cyanophenyl) ethane b) The electrooptical systems prepared by the processes described in Example 1b) are distinguished by a good preparation capability, a wide working temperature range, favourable values for the electrooptical parameters and their temperature dependence, and by a low threshold voltage and a good contrast.

EXAMPLE 38 a) An electrooptical liquid crystal system, containing a liquid crystal mixture which consists of the following compounds
14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-pentylcyclohexyl)-4′-(trans-4-propylcyclohexyl)biphenyl
4.8% 4-pentyl-4″-cyanoterphenyl
6.4% 4-(trans-4-propylcyclohexyl)phenyl trans-4-butylcyclohexylcarboxylate
5.6% 4-(trans-4-pentylcyclohexyl)-4′-cyanobiphenyl
20% 3-(4-isothiocyanatophenyl)-5-pentylpyrimidine
and has the following physical parameters:
clear point $T_c = 83°$ C.
viscosity $\eta = 28$ mm$^2$ s$^{-1}$ (20° C.)
optical anisotropy $\Delta n = 0.18$ (20° C., 589 nm)
dielectric anisotropy $\Delta\epsilon = 14.6$ (20° C., 1 kHz)

b) The electrooptical systems prepared by the processes described in Example 1b) are distinguished by a good preparation capability, a wide working temperature range, favourable values for the electrooptical parameters and their temperature dependence, and by a low threshold voltage and a good contrast.

EXAMPLE 39 a) An electrooptical liquid crystal system, containing a liquid crystal mixture which consists of the following compounds:
16.2% p-trans-4-propylcyclohexylbenzonitrile
12.6% p-trans-4-butylcyclohexylbenzonitrile
22.5% p-trans-4-pentylcyclohexylbenzonitrile
13.5% p-trans-4-heptylcyclohexylbenzonitrile
6.3% 4-(trans-4-pentylcyclohexyl)-4′-(trans-4-propylcyclohexyl)biphenyl
5.4% 4-pentyl-4″-cyanoterphenyl
7.2% 4-(trans-4-propylcyclohexyl)phenyl trans-4-butylcyclohexylcarboxylate
6.3% 4-(trans-4-pentylcyclohexyl)-4′-cyanobiphenyl 10% 1-(trans-4-pentylcyclohexyl)-4-isothiocyanatobenzene b) The electrooptical liquid crystal system is prepared by the processes described in Example 1, b), 1.1–1.3 and 2.

The electrooptical systems prepared by this process are distinguished by a good preparation capability, a wide working temperature range, favourable values for the electrooptical parameters and their temperature dependence, and by a low threshold voltage and a high contrast.

EXAMPLE 40 a) An electrooptical liquid crystal system, containing a liquid crystal mixture which consists of the following compounds
14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-pentylcyclohexyl)-4'-(trans-4-propylcyclohexyl)biphenyl
4.8% 4-pentyl-4''-cyanoterphenyl
6.4% 4-(trans-4-propylcyclohexyl)phenyl trans-4-butylcyclohexylcarboxylate
5.6% 4-(trans-4-pentylcyclohexyl)-4'-cyanobiphenyl
12% 1-(trans-4-propylcyclohexyl)-4-isothiocyanatobenzene
8% 1-(trans-4-butylcyclohexyl)-4-isothiocyanatobenzene
and has the following physical parameters:
clear point $T_c = 80°$ C.
viscosity $\eta = 24$ mm$^2$ s$^{-1}$ (20° C.)
optical anisotropy $\Delta n = 0.15$ (20° C., 589 nm)
dielectric anisotropy $\Delta \epsilon = 11.8$ (20° C., 1 kHz)

b) The electrooptical liquid crystal system is prepared by the processes described in Example 1, b), 1.1–1.3 and 2.

The electrooptical systems prepared by this process are distinguished by a good preparation capability, a wide working temperature range, favourable values for the electrooptical parameters and their temperature dependence, and by a low threshold voltage and a high contrast.

EXAMPLE 41 a) An electrooptical liquid crystal system, containing a liquid crystal mixture which consists of the following compounds
14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile 5.6% 4-(trans-4-pentylcyclohexyl)-4'-(trans-4-propylcyclohexyl)biphenyl
4.8% 4-pentyl-4''-cyanoterphenyl
6.4% 4-(trans-4-propylcyclohexyl)phenyl trans-4-butylcyclohexylcarboxylate
5.6% 4-(trans-4-pentylcyclohexyl)-4'-cyanobiphenyl
10% 4-(trans-4-propylcyclohexyl)-4'-difluoromethoxybiphenyl
10% 4-(trans-4-pentylcyclohexyl)-4'-difluoromethoxybiphenyl
and has the following physical parameters:
clear point $T_c = 102°$ C.
viscosity $\eta = 31$ mm$^2$ s$^{-1}$ (20° C.)
optical anisotropy $\Delta n = 0.15$ (20° C., 589 nm)
dielectric anisotropy $\Delta \epsilon = 11.4$ (20° C., 1 kHz)

b) The electrooptical systems prepared by the processes described in Example 1b) are distinguished by a good preparation capability, a wide working temperature range, favourable values for the electrooptical parameters and their temperature dependence, and by a low threshold voltage and a good contrast.

EXAMPLE 42 a) An electrooptical liquid crystal system, containing a liquid crystal mixture which consists of the following compounds
16.2% p-trans-4-propylcyclohexylbenzonitrile
12.6% p-trans-4-butylcyclohexylbenzonitrile
22.5% p-trans-4-pentylcyclohexylbenzonitrile
5.4% 4-pentyl-4''-cyanoterphenyl
7.2% 4-(trans-4-propylcyclohexyl)phenyl trans-4-butylcyclohexylcarboxylate
6.3% 4-(trans-4-pentylcyclohexyl)-4'-cyanobiphenyl
10% 4-pentyl-4''-difluoromethoxyterphenyl
13.5% p-trans-4-heptylcyclohexylbenzonitrile
6.3% 4-(trans-4-pentylcyclohexyl)-4'-(trans-4-propylcyclohexyl)biphenyl b) The electrooptical systems prepared by the processes described in Example 1b) are distinguished by a good preparation capability, a wide working temperature range, favourable values for the electrooptical parameters and their temperature dependence, and by a low threshold voltage and a good contrast.

EXAMPLE 43 a) An electrooptical liquid crystal system, containing a liquid crystal mixture which consists of the following compounds
14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-pentylcyclohexyl)-4'-(trans-4-propylcyclohexyl)biphenyl
4.8% 4-pentyl-4''-cyanoterphenyl
6.4% 4-(trans-4-propylcyclohexyl)phenyl trans-4-butylcyclohexylcarboxylate
5.6% 4-(trans-4-pentylcyclohexyl)-4'-cyanobiphenyl
20% 1-(trans-4-pentylcyclohexyl)-4-fluorobenzene
and has the following physical parameters:
viscosity $\eta = 20$ mm$^2$ s$^{-1}$ (20° C.)
optical anisotropy $\Delta n = 0.12$ (20° C., 589 nm)
dielectric anisotropy $\Delta \epsilon = 10.2$ (20° C., 1 kHz)

b) The electrooptical systems prepared by the processes described in Example 1b) are distinguished by a good preparation capability, a wide working temperature range, favourable values for the electrooptical parameters and their temperature dependence, and by a low threshold voltage and a good contrast.

EXAMPLE 44 a) An electrooptical liquid crystal system, containing a liquid crystal mixture which consists of the following compounds
14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-pentylcyclohexyl)-4'-(trans-4-propylcyclohexyl)biphenyl
4.8% 4-pentyl-4''-cyanoterphenyl 6.4% 4-(trans-4-propylcyclohexyl)phenyl trans-4-butylcyclohexylcarboxylate
5.6% 4-(trans-4-pentylcyclohexyl)-4'-cyanobiphenyl
20% 2-(4-(3,4-difluorophenyl)phenyl)-5-heptyl-pyrimidine and has the following physical parameters:
clear point $T_c = 97$ ° C.
viscosity $\eta = 48$ mm$^2$ s$^{-1}$ (20° C.)
optical anisotropy $\Delta n = 0.16$ (20° C., 589 nm)
dielectric anisotropy $\Delta\epsilon = 12.9$ (20° C., 1 kHz)

b) The electrooptical systems prepared by the processes described in Example 1b) are distinguished by a good preparation capability, a wide working temperature range, favourable values for the electrooptical parameters and their temperature dependence, and by a low threshold voltage and a good contrast.

EXAMPLE 45 a) An electrooptical system, containing a liquid crystal mixture which consists of the following compounds
5% 4(-trans-4-pentylcyclohexyl)-4'-chlorobiphenyl
17.1% p-trans-4-propylcyclohexylbenzonitrile
13.3% p-trans-4-butylcyclohexylbenzonitrile
23.8% p-trans-4-pentylcyclohexylbenzonitrile
14.3% 4-(trans-4-heptylcyclohexyl)benzonitrile
6.7% 4-(trans-4-pentylcyclohexyl)-4'-cyanobiphenyl
6.7% 4-(trans-4-pentylcyclohexyl)-4'-(trans-4-propylcyclohexyl)biphenyl
5.7% 4-pentyl-4''-cyanoterphenyl
7.6% 4-(trans-4-propylcyclohexyl)phenyl) trans-4-butylcyclohexylcarboxylate and has the following physical parameters:
clear point $T_c = 95$ ° C.
optical anisotropy $\Delta n = 0.15$ (20° C., 589 nm)
dielectric anisotropy $\Delta\epsilon = 11.6$ (20° C., 1 kHz)
flow viscosity $\eta = 31$ mm$^2$/s (20° C.)

b) The electrooptical systems prepared by the processes described in Example 1b) are distinguished by a wide working temperature range, favourable values for the electrooptical parameters and in particular by a high UV stability.

EXAMPLE 46 a) An electrooptical system, containing a liquid crystal mixture which consists of the following compounds
20% 1-(trans-4-pentylcyclohexyl)-4-chlorobenzene
14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-pentylcyclohexyl)-4'-cyanobiphenyl
5.6% 4-(trans-4-pentylcyclohexyl)-4'-(trans-4-propylcyclohexyl)biphenyl
4.8% 4-pentyl-4''-cyanoterphenyl
6.4% 4-(trans-4-propylcyclohexyl)phenyl)trans-4-butylcyclohexylcarboxylate and has the following physical parameters:
clear point $T_c = 69°$ C.
optical anisotropy $\Delta n = 0.13$ (20° C., 589 nm)
dielectric anisotropy $\Delta\epsilon = 10.8$ (20° C., 1 kHz)
flow viscosity $\eta = 21$ mm$^2$/s (20° C.)

b) The electrooptical systems prepared by the processes described in Example 1b) are distinguished by a wide working temperature range, favourable values for the electrooptical parameters and in particular by a high UV stability.

EXAMPLE 46 (sic)

a) An electrooptical system, containing a liquid crystal mixture which consists of the following compounds
5.0% 2-fluoro-4-(trans-4-pentylcyclohexyl)-3''-,4''-difluoroterphenyl,
8.0% 1-[4-(2-fluoro-4-propylphenyl)-phenyl]-2-(4-fluorophenyl)ethane
11.0% 1-[4-(2-fluoro-4-pentylphenyl)-phenyl]-2-(4-fluorophenyl)ethane
7.0% 1-{4-[4-(trans-4-propylcyclohexyl)-2fluorophenyl]-phenyl}-2-(3,4-difluorophenyl)ethane (sic)
7.0% 1-{4-[4-(trans-4-pentylcylcohexyl)-2-fluorophenyl]-phenyl}-2-(3,4-difluorophenyl)ethane (sic)
2.0% 1-{4-[4-(trans-4-propylcylcohexyl)-2-fluorophenyl]-phenyl}-2-(3-fluorophenyl)ethane (sic)
6.0% 1-{4-[4-(trans-4-pentylcylcohexyl)-2-fluorophenyl]-phenyl}-2-(3-fluorophenyl)ethane (sic)
10.0% 4-(trans-4-ethylcyclohexyl)-3',4'-difluorobiphenyl
10.0% 1-(4-pentylphenyl)-2-[4-(3,4-difluorophenyl)-phenyl]ethane
10.0% 4-(trans-4-propylcyclohexyl)-3',4'-difluorobiphenyl
10.0% 4-(trans-4-pentylcyclohexyl)-3',4'-difluorobiphenyl
7.0% 4-(trans-4-ethylcyclohexyl)-3',4',5'-trifluorobiphenyl
7.0% 4-(trans-4-pentylcyclohexyl)-3',4',5'-trifluorobiphenyl and has the following physical parameters:
clear point $T_c = 97°$ C.
optical anisotropy $\Delta n = 0.1660$ (20° C., 589 nm)
ordinary refractive index $\eta_o = 1.5115$ (20° C., 589 nm)
dielectric anisotropy $\Delta\epsilon = 7.6$ (20° C., 1 kHz)

b) The electrooptical systems prepared by the processes described in Example 1b) are distinguished by a wide working temperature range, favourable values for the electrooptical parameters and in particular by a high UV stability.

EXAMPLE 47 a) An electrooptical system, containing a liquid crystal mixture which consists of the following compounds
12.1% 3-fluoro-4-chlorophenyl trans-4-(trans-4-propylcyclohexyl)cyclohexylcarboxylate
9.9% 3-fluoro-4-chlorophenyl trans-4-(trans-4-pentylcyclohexyl)cyclohexylcarboxylate
9.0% 3-fluoro-4-chlorophenyl trans-4-propylcyclohexylcarboxylate
9.0% 3-fluoro4-chlorophenyl trans-4-pentylcyclohexylcarboxylate (sic)
10.0% 2-fluoro-4-pentylphenyl trans-4-(trans-4-pentylcyclohexyl)cyclohexylcarboxylate
10.0% 2-fluoro-4-pentylphenyl trans-4-(trans-4-propylcyclohexyl)cyclohexylcarboxylate
10.0% 2-fluoro-4-propylphenyl trans-4-(trans-4-propylcyclohexyl)cyclohexylcarboxylate
15.0% 4-(trans-4-propylcyclohexyl)benzonitrile
10.0% 4-(trans-4-pentylcyclohexyl)benzonitrile
5.0% 4-(trans-4-pentylcyclohexyl)-4'-(trans-4-propylcyclohexyl)biphenyl and has the following physical parameters:
viscosity $\eta = 30.4$ mm$^2$/s (20° C.)
birefringence $\Delta n = 0.11$ (20° C., 589 nm)
clear point N 114.9 I b) The electrooptical systems prepared by the processes described in Example 1b) are distinguished by a wide working temperature range, favourable values for the electrooptical parameters and in particular by a high UV stability.

EXAMPLE 48 a) An electrooptical system, containing a liquid crystal mixture which consists of the following compounds 12.1% 3-fluoro-4-chlorophenyl trans-4-(trans-4-propylcyclohexyl)cyclohexylcarboxylate
9.9% 3-fluoro-4-chlorophenyl trans-4-(trans-4-pentylcyclohexyl)cyclohexylcarboxylate
9.0% 3-fluoro-4-chlorophenyl trans-4-propylcyclohexylcarboxylate
9.0% 3-fluoro-4-chlorophenyl trans-4-pentylcyclohexylcarboxylate
8.0% 2-fluoro-4-pentylphenyl trans-4-(trans-4-pentylcyclohexyl)cyclohexylcarboxylate
7.0% 2-fluoro-4-pentylphenyl trans-4-(trans-4-propylcyclohexyl)cyclohexylcarboxylate
7.0% 2-fluoro-4-propylphenyl trans-4-(trans-4-propylcyclohexyl)cyclohexylcarboxylate
15.0% 4-(trans-4-propylcyclohexyl)benzonitrile
13.0% 4-(trans-4-pentylcyclohexyl)benzonitrile
2.0% 4-(trans-4-pentylcyclohexyl)-4'-(trans-4 propylcyclohexyl)biphenyl
8.0% 4-pentylphenyl trans-4-propylcyclohexylcarboxylate and has the following physical parameters:
viscosity $\eta = 25.9$ mm$^2$/s (20° C.)
birefringence $\Delta n = 0.10$ (20° C., 589
clear point N 94.2 I b) The electrooptical systems prepared by the processes described in Example 1b) are distinguished by a wide working temperature range, favourable values for the electrooptical parameters and in particular by a high UV stability.

EXAMPLE 49 a) An electrooptical liquid crystal system, containing a liquid crystal mixture which consists of the following compounds 14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-pentylcyclohexyl)-4'-(trans-4-propylcyclohexyl)biphenyl
4.8% 4-pentyl-4''-cyanoterphenyl
6.4% 4-(trans-4-propylcyclohexyl)phenyl trans-4-butylcyclohexylcarboxylate
5.6% 4-(trans-4-pentylcyclohexyl)-4'-cyanobiphenyl
6% 4-propylphenyl-4-heptyl benzoate
7% 4-pentylphenyl-4-heptyl benzoate
7.0% 4-heptylphenyl-4-heptyl benzoate and has the following physical parameters:
clear point T$_c$=77° C.
viscosity $\eta = 34$ mm$^2$ S$^{-1}$ (20° C.)
optical anisotropy $\Delta n = 0.14$ (20° C., 589 nm)

b) The electrooptical systems prepared by the processes described in Example 1b) are distinguished by a wide working temperature range, favourable values for the electrooptical parameters and their temperature dependence and in particular by a low threshold voltage.

EXAMPLE 50 a) An electrooptical liquid crystal system, containing a liquid crystal mixture which consists of the following compounds 12% 4-(trans-4-pentylcyclohexyl)benzonitrile
20% 4-propyl-4'-cyanobiphenyl
13% 4-pentyl-4'-cyanobiphenyl
20% 4-(trans-4-pentylcyclohexyl)-4'-cyanobiphenyl
15% 4-propyl-3''-fluoro-4''-cyanoterphenyl
20% 4-pentoxy-4'-fluoro-tolan b) The electrooptical systems prepared by the processes described in Example 1b) are distinguished by a good preparation capability, a wide working temperature range, favourable values for the electrooptical parameters and their temperature dependence, and by a low threshold voltage and a high contrast.

EXAMPLE 51 a) An electrooptical liquid crystal system, containing a liquid crystal mixture which consists of the following compounds 18% 4-cyano-4'-(trans-4-pentylcyclohexyl)biphenyl
35% 4-cyano-4'-hexylbiphenyl
22% 4-cyano-4'-pentylbiphenyl
9% 4-cyano-4''-pentylterphenyl
5% 4-cyano-4'-yl-biphenyl-4-heptyl-4'-yl-biphenylcarboxylate
5% 4-cyano-4'-nonoxybiphenyl
6% 1-(trans-4-propylcyclohexyl)-2-(4-pentyl-2-fluoro-4'-yl-biphenyl)ethane and has the following physical parameters:
clear point T$_c$=100° C.
viscosity $\eta = 55$ mm$^2$ S$^{-1}$ (20° C.)
dielectric anisotropy $\Delta\epsilon = 14.1$ (20° C., 589 nm)
optical anisotropy $\Delta n = 0.24$ (20° C., 1 kHz)

b) The electrooptical systems prepared by the process described in Example 1b) are distinguished by a wide working temperature range, favourable values for the electrooptical parameters and their temperature dependence, a low threshold voltage, a good preparation capability and a high contrast.

EXAMPLE 52 a) An electrooptical liquid crystal system, containing a liquid crystal mixture which consists of the following compounds 25% 2-(4-cyanophenyl)-5-propylpyridine
25% 2-(4-cyanophenyl)-5-butylpyridine
25% 2-(4-cyanophenyl)-5-pentylpyridine
25% 2-(4-cyanophenyl)-5-(pentylphenyl) pyridine and has the following physical characteristics:
clear point T$_c$=85° C.
viscosity $\eta = 70$ mm$^2$ s$^{-1}$ (20° C.)
optical anisotropy $\Delta n = 0.269$ (20° C., 589 nm)
dielectric anisotropy $\Delta\epsilon = 24.1$ (20° C., 1 kHz)

b) The electrooptical liquid crystal system which is prepared by the processes described in Example 1b) is distinguished by a good preparation capability, a wide working temperature range, favourable values for the electrooptical parameters and their temperature dependence, and by a low threshold voltage and a high contrast.

EXAMPLE 53 a) An electrooptical liquid crystal system, containing a liquid crystal mixture which consists of the following compounds 17.5% 2-(4-cyanophenyl)-5-propylpyridine
17.5% 2-(4-cyanophenyl)-5-butylpyridine
17.5% 2-(4-cyanophenyl)-5-pentylpyridine
17.5% 2-(4-cyanophenyl)-5-(4-pentylphenyl)pyridine
15.0% 1-[4-(4-propylphenyl)phenyl]-2-(3-fluoro-4-cyanophenyl) ethane
15.0% 1- [4-(4-pentylphenyl) phenyl]-2-(3-fluoro-4-cyanophenyl) ethane and has the following physical characteristics:
clear point $T_c=94°$ C.
optical anisotropy $\Delta n=0.272$ (20° C., 589 nm)
dielectric anisotropy $\Delta\epsilon=25.6$ (20° C., 1 kHz)

b) The electrooptical liquid crystal system which is prepared by the processes described in Example 1b) is distinguished by a good preparation capability, a wide working temperature range, favourable values for the electrooptical parameters and their temperature dependence, and by a low threshold voltage and a high contrast.

EXAMPLE 54 a) An electrooptical liquid crystal system, containing a liquid crystal mixture which consists of the following compounds 22.5% 2-(4-cyanophenyl)-5-propylpyridine
22.5% 2-(4-cyanophenyl)-5-butylpyridine
22.5% 2-(4-cyanophenyl)-5-pentylpyridine
22.5% 2-(4-cyanophenyl)-5-(4-pentylphenyl)pyridine
10.0% 1-(4-propylphenyl-2- [4-(3-fluoro-4-cyanophenyl)phenyl]ethane (sic)

and has the following physical characteristics:
clear point $T_c=82°$ C.
viscosity $\eta=74$ mm$^2$ s$^{-1}$ (20° C.)
optical anisotropy $\Delta n=0.260$ (20° C., 589 nm)
dielectric anisotropy $\Delta\epsilon=25$ (20° C., 1 kHz)

b) The electrooptical liquid crystal system which is prepared by the processes described in Example 1b) is distinguished by a good preparation capability, a wide working temperature range, favourable values for the electrooptical parameters and their temperature dependence, and by a low threshold voltage and a high contrast.

EXAMPLE 55 a) An electrooptical liquid crystal system, containing a liquid crystal mixture which consists of the following compounds 22.5% 2-(4-cyanophenyl)-5-propylpyridine
22.5% 2-(4-cyanophenyl)-5-butylpyridine
22.5% 2-(4-cyanophenyl)-5-pentylpyridine
22.5% 2-(4-cyanophenyl)-5-(4-pentylphenyl)pyridine
10.0% 4-pentyl-3",5"-difluoro-4"-cyanoterphenyl and has the following physical characteristics:
clear point $T_c=84$ ° C.
viscosity $\eta=75$ mm$^2$ s$^{-1}$ (20° C.)
optical anisotropy $\Delta n=0.266$ (20° C., 589 nm)
dielectric anisotropy $\Delta\epsilon=26$ (20° C., 1 kHz)

b) The electrooptical liquid crystal system which is prepared by the processes described in Example 1b) is distinguished by a good preparation capability, a wide working temperature range, favourable values for the electrooptical parameters and their temperature dependence, and by a low threshold voltage and a high contrast.

EXAMPLE 56 a) An electrooptical liquid crystal system, containing a liquid crystal mixture which consists of the following compounds 20.0% 2-(4-cyanophenyl)-5-propylpyridine
20.0% 2-(4-cyanophenyl)-5-butylpyridine
20.0% 2-(4-cyanophenyl)-5-pentylpyridine
20.0% 2-(4-cyanophenyl)-5-(4-pentylphenyl)pyridine
10.0% 2-(3-fluoro-4-cyanophenyl)-5-propylpyrimidine
10.0% 2-(3-fluoro-4-cyanophenyl)-5-pentylpyrimidine and has the following physical characteristics:
clear point $T_c=71$ ° C.
viscosity $\eta=68$ mm$^2$ s$^{-1}$ (20° C.)
optical anisotropy $\Delta n=0.253$ (20° C., 589 nm)
dielectric anisotropy $\Delta\epsilon=29.5$ (20° C., 1 kHz)

b) The electrooptical liquid crystal system which is prepared by the processes described in Example 1b) is distinguished by a good preparation capability, a wide working temperature range, favourable values for the electrooptical parameters and their temperature dependence, and by a low threshold voltage and a high contrast.

EXAMPLE 57 a) An electrooptical liquid crystal system, containing a liquid crystal mixture which consists of the following compounds 15.0% p-trans-4-propylcyclohexylbenzonitrile
10.0% p-trans-4-butylcyclohexylbenzonitrile
20.0% P-trans-4-pentylcyclohexylbenzonitrile
12.0% p-trans-4-heptylcyclohexylbenzonitrile
6.0% 4-(trans-4-pentylcyclohexyl)-4'-cyanobiphenyl
6.0% 4-(trans-4-pentylcylcohexyl)-4'-(trans-4-propylcyclohexyl)biphenyl (sic)
5.0% 4-pentyl-4"-cyanoterphenyl
6.0% 4-(trans-4-propylcyclohexyl)phenyl trans-4-butylcyclohexylcarboxylate
20.0% 1-[trans-4-(trans-4-propylcyclohexyl)cyclohexyl]-2-(3-fluoro-4-cyanophenyl)ethane and has the following physical characteristics:
clear point $T_c=98°$ C.
viscosity $\eta=39$ mm$^2$ s$^{-1}$ (20° C.)
optical anisotropy $\Delta n=0.139$ (20° C., 589 nm)
dielectric anisotropy $\Delta\epsilon=14$ (20° C., 1 kHz)

b) The electrooptical liquid crystal system which is prepared by the process described in Example 1b) is distinguished by a good preparation capability, a wide working temperature range, favourable values for the electrooptical parameters and their temperature dependence, a good contrast and high angular independence of the contrast.

EXAMPLE 58 a) An electrooptical liquid crystal system, containing a liquid crystal mixture which consists of the following compounds 15.0% p-trans-4-propylcyclohexylbenzonitrile
10.0% p-trans-4-butylcyclohexylbenzonitrile
20.0% p-trans-4-pentylcyclohexylbenzonitrile
12.0% p-trans-4-heptylcyclohexylbenzonitrile
6.0% 4-(trans-4-pentylcyclohexyl)-4'-cyanobiphenyl
6.0% 4-(trans-4-pentylcylcohexyl)-4'-(trans-4-propylcyclohexyl)biphenyl (sic)
5.0% 4-pentyl-4"-cyanoterphenyl 6.0% 4-(trans-4-propylcyclohexyl)phenyl trans-4-butylcyclohexylcarboxylate
20.0% 1-(trans-4-pentylcyclohexyl)-2-(3-fluoro-4-phenyl)ethane and has the following physical characteristics:
clear point $T_c=76°$ C.
viscosity $\eta=30$ mm$^2$ s$^{-1}$ (20° C.)
optical anisotropy $\Delta n=0.130$ (20° C., 589 nm)
dielectric anisotropy $\Delta\epsilon=13$ (20° C., 1 kHz)

b) The electrooptical liquid crystal system which is prepared by the process described in Example 1b) is distinguished by a good preparation capability, a wide working temperature range, favourable values for the electrooptical parameters and their temperature dependence, a good contrast and high angular independence of the contrast.

EXAMPLE 59 a) An electrooptical liquid crystal system, containing a liquid crystal mixture which consists of the following compounds 15.0% p-trans-4-propylcyclohexylbenzonitrile
10.0% p-trans-4-butylcyclohexylbenzonitrile
20.0% p-trans-4-pentylcyclohexylbenzonitrile
12.0% p-trans-4-heptylcyclohexylbenzonitrile
6.0% 4-(trans-4-pentylcyclohexyl)-4'-cyanobiphenyl
6.0% 4-(trans-4-pentylcylcohexyl)-4'-(trans-4propylcyclohexyl)biphenyl (sic)
5.0% 4-pentyl-4''-cyanoterphenyl
6.0% 4-(trans-4-propylcyclohexyl) phenyl trans-4-butylcyclohexylcarboxylate
20.0% 4-pentyl-4'-chlorobiphenyl and has the following physical characteristics:
clear point $T_c=74°$ C.
viscosity $\eta=27$ mm$^2$ s$^{-1}$ (20° C.)
optical anisotropy $\Delta n=0.150$ (20° C., 589 nm)
dielectric anisotropy $\Delta\epsilon=11$ (20° C., 1 kHz)

b) The electrooptical liquid crystal system which is prepared by the process described in Example 1b) is distinguished by a good preparation capability, a wide working temperature range, favourable values for the electrooptical parameters and their temperature dependence, a good contrast and high angular independence of the contrast.

EXAMPLE 60 a) An electrooptical liquid crystal system, containing a liquid crystal mixture which consists of the following compounds 16.0% p-trans-4-propylcyclohexylbenzonitrile
13.0% p-trans-4-butylcyclohexylbenzonitrile
23.0% p-trans-4-pentylcyclohexylbenzonitrile
13.0% p-trans-4-heptylcyclohexylbenzonitrile
6.0% 4-(trans-4-pentylcyclohexyl)-4'-cyanobiphenyl
6.0% 4-(trans-4-pentylcylcohexyl)-4'-(trans-4-propylcyclohexyl)biphenyl (sic)
6.0% 4-pentyl-4''-cyanoterphenyl
7.0% 4-(trans-4-propylcyclohexyl)phenyl trans-4-butylcyclohexylcarboxylate
5.0% 4-(trans-4-propylcyclohexyl)-4'-methoxytolan
5.0% 4-(trans-4-propylcyclohexyl)-4'-ethoxytolan and has the following physical characteristics:
clear point $T_c=106$° C.
viscosity $\eta=30$ mm$^2$ s$^{-1}$ (20° C.)
optical anisotropy $\Delta n=0.163$ (20° C., 589 nm)
dielectric anisotropy $\Delta\epsilon=10.5$ (20° C., 1 kHz)

b) The electrooptical liquid crystal system which is prepared by the process described in Example 1b) is distinguished by a good preparation capability, a wide working temperature range, favourable values for the electrooptical parameters and their temperature dependence, a good contrast and high angular independence of the contrast.

EXAMPLE 61 a) An electrooptical liquid crystal system, containing a liquid crystal mixture which consists of the following compounds 15.0% p-trans-4-propylcyclohexylbenzonitrile
10.0% p-trans-4-butylcyclohexylbenzonitrile
20.0% p-trans-4-pentylcyclohexylbenzonitrile
12.0% p-trans-4-heptylcyclohexylbenzonitrile
6.0% 4-(trans-4-pentylcyclohexyl)-4'-cyanobiphenyl
6.0% 4-(trans-4-pentylcylcohexyl)-4'-(trans-4-propylcyclohexyl)biphenyl (sic)
5.0% 4-pentyl-4''-cyanoterphenyl
6.0% 4-(trans-4-propylcyclohexyl)phenyl trans-4-butylcyclohexylcarboxylate
20.0% 4-(trans-4-propylcyclohexyl)-3',4',5'-trifluorobiphenyl and has the following physical characteristics:
clear point $T_c=82°$ C.
viscosity $\eta=32$ mm$^2$ s$^{-1}$ (20° C.)
optical anisotropy $\Delta n=0.138$ (20° C., 589 nm)
dielectric anisotropy $\Delta\epsilon=13.5$ (20° C., 1 kHz)

b) The electrooptical liquid crystal system which is prepared by the process described in Example 1b) is distinguished by a good preparation capability, a wide working temperature range, favourable values for the electrooptical parameters and their temperature dependence, a good contrast and high angular independence of the contrast.

EXAMPLE 62 a) An electrooptical liquid crystal system, containing a liquid crystal mixture which consists of the following compounds 15.0% p-trans-4-propylcyclohexylbenzonitrile
10.0% p-trans-4-butylcyclohexylbenzonitrile
20.0% p-trans-4-pentylcyclohexylbenzonitrile
12.0% p-trans-4-heptylcyclohexylbenzonitrile
6.0% 4-(trans-4-pentylcyclohexyl)-4'-cyanobiphenyl
6.0% 4-(trans-4-pentylcylcohexyl)-4'-(trans-4-propylcyclohexyl)biphenyl (sic)
5.0% 4-pentyl-4''-cyanoterphenyl
6.0% 4-(trans-4-propylcyclohexyl)phenyl trans-4-butylcyclohexylcarboxylate
10.0% 1-(trans-4-(trans-4-propylcyclohexyl)cyclohexyl)-2-(4-cyanophenyl)ethane
10.0% 1-(trans-4-(trans-4-pentylcyclohexyl)cyclohexyl)-2-(4-cyanophenyl)ethane and has the following physical characteristics:
clear point $T_c=111°$ C.
viscosity $\eta=36$ mm$^2$ s$^{-1}$ (20 ° C.)
dielectric anisotropy $\Delta\epsilon=11.8$ (20° C., 1 kHz)

b) The electrooptical liquid crystal system which is prepared by the process described in Example 1b) is distinguished by a good preparation capability, a wide working temperature range, favourable values for the electrooptical parameters and their temperature dependence, a good contrast and high angular independence of the contrast.

EXAMPLE 63 a) An electrooptical liquid crystal system, containing a liquid crystal mixture which consists of the following compounds
- 15.0% p-trans-4-propylcyclohexylbenzonitrile
- 10.0% p-trans-4-butylcyclohexylbenzonitrile
- 20.0% p-trans-4-pentylcyclohexylbenzonitrile
- 12.0% p-trans-4-heptylcyclohexylbenzonitrile
- 6.0% 4-(trans-4-pentylcyclohexyl)-4'-cyanobiphenyl
- 6.0% 4-(trans-4-pentylcylcohexyl)-4'-(trans-4-propylcyclohexyl)biphenyl (sic)
- 5.0% 4-pentyl-4''-cyanoterphenyl
- 6.0% 4-(trans-4-propylcyclohexyl)phenyl trans-4-butylcyclohexylcarboxylate
- 10.0% 1-(4-propylphenyl)-2-[4-(2-fluoro-4-pentylphenyl)phenyl]ethane
- 10.0% 1-(4-pentylphenyl)-2-[4-(2-fluoro-4-propylphenyl)phenyl]ethane and has the following physical characteristics:
clear point $T_c = 85°$ C.
viscosity $\eta = 29$ mm$^2$ s$^{-1}$ (20° C.)
optical anisotropy $\Delta n = 0.146$ (20° C., 589 nm)

b) The electrooptical liquid crystal system which is prepared by the processes described in Example 1b) is distinguished by a good preparation capability, a wide working temperature range, favourable values for the electrooptical parameters and their temperature dependence, a good contrast and high angular independence of the contrast.

EXAMPLE 64 a) An electrooptical liquid crystal system, containing a liquid crystal mixture which consists of the following compounds:
- 34.65% 4-pentyl-4'-cyanobiphenyl
- 13.5% 4-propoxy-4'-cyanobiphenyl
- 10.35% 4-pentoxy-4'-cyanobiphenyl
- 13.5% 4-octoxy-4'-cyanobiphenyl
- 10.0% 4-(trans-4-pentylcyclohexyl)-4'-cyanobiphenyl
- 9.0% 4-[2-(p-propylphenyl)ethyl]-4'-cyanobiphenyl and
- 9.0% 4-[2-(p-pentylphenyl)ethyl]-4'-cyanobiphenyl and has the following physical characteristics:
N-I 84°
$\Delta n$ 0.247 (20° C., 589 nm)

b) The electrooptical liquid crystal system which is prepared by the processes described in Example 1b) is distinguished by a good preparation capability, a wide working temperature range, favourable values for the electrooptical parameters and their temperature dependence, a good contrast and high angular independence of the contrast.

EXAMPLE 65 a) An electrooptical liquid crystal system, containing a liquid crystal mixture which consists of the following compounds
- 20% 4-pentyl-4'-cyanobiphenyl
- 23% 2-(4-cyanophenyl)-5-pentylpyridine
- 17% 4-propoxy-4'-cyanobiphenyl
- 13% 4-pentoxy-4'-cyanobiphenyl
- 17% 4-octoxy-4'-cyanobiphenyl
- 10% 4-pentyl-4''-cyanoterphenyl and has the following physical parameters:
clear point $T_c = 70.4°$ C.
viscosity: $\eta = 61$ mm$^2$/s (20° C.)
threshold voltage V[90.0.20] = 1.31 V The threshold voltage is measured as indicated in Example 9a.

b) The electrooptical liquid crystal system is prepared by the processes described in Example 1, b).

EXAMPLE 66 a) An electrooptical liquid crystal system, containing a liquid crystal mixture which consists of the following compounds
- 12% 2-(4-cyanophenyl)-5-propylpyridine
- 15% 2-(4-cyanophenyl)-5-pentylpyridine
- 18% 4-pentyl-4'-cyanobiphenyl
- 9% 4-propoxy-4'-cyanobiphenyl
- 9% 4-pentyl-4''-cyanoterphenyl
- 22% 4-propyl-2'-fluoro-4''-cyanoterphenyl
- 15% 4-(trans-4-pentylcyclohexyl)-4'-cyanobiphenyl and has the following physical parameters:
clear point $T_c = 114°$ C.
viscosity: $\eta = 86.6$ mm2/s (20° C.)
threshold voltage V[90.0.20] = 1.69 V The threshold voltage is measured as indicated in Example 9a.

b) The electrooptical liquid crystal system is prepared by the processes described in Example 1b).

EXAMPLE 67 a) An electrooptical liquid crystal system, containing a liquid crystal mixture which consists of the following compounds
- 12% 2-(4-cyanophenyl)-5-propylpyridine
- 15% 2-(4-cyanophenyl)-4-pentylpyridine
- 5% 4-cyanobiphenyl
- 8.5% 4-ethyl-4'-cyanobiphenyl
- 8.5% 4-propyl-4'-cyanobiphenyl
- 20% 4-pentyl-4'-cyanobiphenyl
- 17% 4-propyl-2'-fluoro-4''-cyanoterphenyl
- 9% 4-pentyl-4''-cyanoterphenyl and has the following physical parameters:
clear point $T_c = 69.6°$ C.
viscosity: $\eta = 51$ mm$^2$/s (20° C.)
threshold voltage V[90.0.20] = 1.29 V The threshold voltage is measured as indicated in Example 9a.

b) The electrooptical liquid crystal system is prepared by the processes described in Example 1b).

EXAMPLE 68 a) A liquid crystal mixture consisting of
- 14.0% 4-ethyl-4'-cyanobiphenyl
- 15.0% 4-butyl-4'-cyanobiphenyl
- 41.9% 4-hexyl-4'-cyanobiphenyl
- 2.5% 4-methoxy-4'-cyanobiphenyl
- 12.0% 4-propoxy-4'-cyanobiphenyl
- 7.6% 4-pentyl-4''-cyanoterphenyl
- 3.0% 4-(4-cyanophenyl)phenyl 4-(4-pentylphenyl)benzoate
- 4.0% 4-(3-cyanophenyl)phenyl 4(4-heptylphenyl)benzoate (sic)

has the following physical characteristics:
birefringence $\Delta n = 0.232$ (20° C., 589 nm)
ordinary refractive index $n_0 = 1.766$ (20° C., 589 nm)
dielectric anisotropy $\Delta \epsilon = 15.8$ (1 kHz, 20° C.)
threshold voltage V[10.0.20] = 1.23 V
clear point $T_c = 64°$ C.

The threshold voltage was measured in a TN cell (twist angle $\Psi=\pi/4$) which has a cell clearance of 7 μm and is located between parallel polarizers.

b) The electrooptical systems prepared by the processes described in Example 1b) are distinguished by a wide working temperature range, favourable values for the electrooptical parameters and their temperature dependence and in particular by a low threshold voltage.

EXAMPLE 69 a) A liquid crystal mixture consisting of
34.0% 4-pentyl-4'-cyanobiphenyl
10.0% 4-propoxy-4'-cyanobiphenyl
13.0% 4-ethyl-4'-cyanobiphenyl
10.0% 4-pentoxy-4'-cyanobiphenyl
13.0% 4-(4-pentylphenyl)-4'-cyanobiphenyl
10.0% 4-octoxy-4'-cyanobiphenyl
10.0% 1-(trans-4-(trans-4-propylcyclohexyl)cyclohexyl)-4-(4-cyanophenyl)phenyl)ethane has the following physical characteristics:
birefringence $\Delta n=0.243$ (20° C., 589 nm)
ordinary refractive index $n_0=1.765$ (20° C., 589 nm)
clear point $T_c=91°$ C.

b) The electrooptical systems prepared by the processes described in Example 1b) are distinguished by a wide working temperature range, favourable values for the electrooptical parameters and their temperature dependence and in particular by a low threshold voltage.

EXAMPLE 70 a) A liquid crystal mixture consisting of
20.0% 1-{4-[2-fluoro-4-(trans-4-pentylcyclohexyl)-phenyl]phenyl}-2-(4-fluorophenyl)ethane
10.0% 1-{4-[2-fluoro-4-(trans-4-pentylcyclohexyl)-phenyl]phenyl}-2-(4-chlorophenyl)ethane
30.0% 1-[4-(2-fluoro-4-pentylphenyl)phenyl]-2-(4-fluorophenyl)ethane
30.0% 1-[4-(2-fluoro-4-pentylphenyl)phenyl]-2-(4-chlorophenyl)ethane
10.0% 1-[4-(trans-4-propylcyclohexyl)phenyl]-2-(4-fluorophenyl)ethane has the following physical characteristics:
clear point $T_c=104°$ C.
optical anisotropy $\Delta n=0.189$ (20° C., 589 nm)

b) The electrooptical liquid crystal system which is prepared by the processes described in Example 1b) is distinguished by a good preparation capability, a wide working temperature range, favourable values for the electrooptical parameters and their temperature dependence, a good contrast, a high angular independence of the contrasts (sic) and in particular also by a high UV stability.

EXAMPLE 71 a) A liquid crystal mixture consisting of
17.5% 1-{4-[2-fluoro-4-(trans-4-pentylcyclohexyl)-phenyl]phenyl}-2-(4-fluorophenyl)ethane
8.5% 1-{4-[2-fluoro-4-(trans-4-pentylcyclohexyl)-phenyl]phenyl}-2-(4-chlorophenyl)ethane
25.5% 1-[4-(2-fluoro-4-pentylphenyl)phenyl]-2-(4-fluorophenyl)ethane
25.5% 1-[4-(2-fluoro-4-pentylphenyl)phenyl]-2-(4-chlorophenyl)ethane
8.5% 1-[4-(trans-4-propylcyclohexyl)phenyl]-2-(4-fluorophenyl)ethane
8.5% 1-[4-(trans-4-pentylcyclohexyl)phenyl]-2-(4-fluorophenyl)ethane
8.5% 1-[4-(trans-4-propylcyclohexyl)phenyl]-2-(4-chlorophenyl)ethane has the following physical characteristics:
clear point $T_c=98°$ C.
optical anisotropy $\Delta n=0.176$ (20° C., 589 nm)
dielectric anisotropy $\Delta\epsilon=5.0$ (20° C., 1 kHz)

b) The electrooptical liquid crystal system which is prepared by the processes described in Example 1b) is distinguished by a good preparation capability, a wide working temperature range, favourable values for the electrooptical parameters and their temperature dependence, a good contrast, a high angular independence of the contrasts (sic) and in particular also by a high UV stability.

EXAMPLE 72 a) A liquid crystal mixture consisting of
17% 1-{4-[2-fluoro-4-(trans-4-pentylcyclohexyl)-phenyl]phenyl}-2-(4-fluorophenyl)ethane
8.5% 1-{4-[2-fluoro-4-(trans-4-pentylcyclohexyl)-phenyl]phenyl}-2-(4-chlorophenyl)ethane
25.5% 1-[4-(2-fluoro-4-pentylphenyl)phenyl]-2-(4-fluorophenyl)ethane
25.5% 1-[4-(2-fluoro-4-pentylphenyl)phenyl]-2-(4-chlorophenyl)ethane
8.5% 1-[4-(trans-4-propylcyclohexyl)phenyl]-2-(4-fluorophenyl)ethane
7.8% 4-(trans-4-pentylcyclohexyl)-1-chlorobenzene
7.2% 4-(trans-4-heptylcyclohexyl)-1-chlorobenzene has the following physical characteristics:
clear point $T_c=87°$ C.
optical anisotropy $\Delta n=0.171$ (20° C., 589 nm)

b) The electrooptical liquid crystal system which is prepared by the processes described in Example 1b) is distinguished by a good preparation capability, a wide working temperature range, favourable values for the electrooptical parameters and their temperature dependence, a good contrast, a high angular independence of the contrasts (sic) and in particular also by a high UV stability.

EXAMPLE 73 a) A liquid crystal mixture consisting of
10% 1-{4-[2-fluoro-4-(trans-4-pentylcyclohexyl)-phenyl]phenyl}-2-(4-fluorophenyl)ethane
10% 1-{4-[2-fluoro-4-(trans-4-pentylcyclohexyl)-phenyl]phenyl}-2-(4-chlorophenyl)ethane
20% 1-[4-(2-fluoro-4-pentylphenyl)phenyl]-2-(4-fluorophenyl)ethane
10% 1-[4-(2-fluoro-4-pentylphenyl)phenyl]-2-(4-chlorophenyl)ethane
10% 4-(trans-4-pentylcyclohexyl)-1-chlorobenzene
10% 4-(trans-4-heptylcyclohexyl)-1-chlorobenzene
15% 4-propyl-2'-fluoro-4''-ethylterphenyl
15% 4-ethyl-2'-fluoro-4''-propylterphenyl has the following physical characteristics:
clear point $T_c=75$ ° C.
optical anisotropy $\Delta n=0.142$ (20° C., 589 nm)

b) The electrooptical liquid crystal system which is prepared by the processes described in Example 1b) is distinguished by a good preparation capability, a wide working temperature range, favourable values for the electrooptical parameters and their temperature dependence, a good contrast, a high angular independence of the contrasts (sic) and in particular also by a high UV stability.

EXAMPLE 74 a) A liquid crystal mixture consisting of 16.9% 1-{4-[2-fluoro-4-(trans-4-pentylcyclohexyl)-phenyl]phenyl}-2-(4-fluorophenyl)ethane
8.5% 1-{4-[2-fluoro-4-(trans-4-pentylcyclohexyl)-phenyl]phenyl}-2-(4-chlorophenyl)ethane
25.3% 1-[4-(2-fluoro-4-pentylphenyl)phenyl]-2-(4-fluorophenyl)ethane
25.3% 1-[4-(2-fluoro-4-pentylphenyl)phenyl]-2-(4-chlorophenyl)ethane
8.5% 1-[4-(trans-4-proplcyclohexyl)phenyl]-2-(4-fluorophenyl)ethane (sic)
15.5% 1-[trans-4-(trans-4-propylcyclohexyl)cyclohexyl]-2-(4-chlorophenyl)ethane has the following physical characteristics:
clear point $T_c = 112°$ C.
optical anisotropy $\Delta n = 0.178$ (20° C., 589 nm)

b) The electrooptical liquid crystal system which is prepared by the processes described in Example 1b) is distinguished by a good preparation capability, a wide working temperature range, favourable values for the electrooptical parameters and their temperature dependence, a good contrast, a high angular independence of the contrasts (sic) and in particular also by a high UV stability.

EXAMPLE 75 a) A liquid crystal mixture consisting of 17.0% 1-{4-[2-fluoro-4-(trans-4-pentylcyclohexyl)-phenyl]phenyl}-2-(4-fluorophenyl)ethane
8.5% 1-{4-[2-fluoro-4-(trans-4-pentylcyclohexyl)-phenyl]phenyl}-2-(4-chlorophenyl)ethane
25.5% 1-[4-(2-fluoro-4-pentylphenyl)phenyl]-2-(4-fluorophenyl)ethane
25.5% 1-[4-(2-fluoro-4-pentylphenyl)phenyl]-2-(4-chlorophenyl)ethane
8.5% 1-[4-(trans-4-propylcyclohexyl)phenyl]-2-(4-fluorophenyl)ethane
7.6% 4-(trans-4-pentylcyclohexyl)-1-fluorobenzene
7.4% 4-(trans-4-hexylcyclohexyl)-1-fluorobenzene has the following physical characteristics:
clear point
optical anisotropy $\Delta n = 0.172$ (20° C., 589 nm)

b) The electrooptical liquid crystal system which is prepared by the processes described in Example 1b) is distinguished by a good preparation capability, a wide working temperature range, favourable values for the electrooptical parameters and their temperature dependence, a good contrast, a high angular independence of the contrasts (sic) and in particular also by a high UV stability.

EXAMPLE 76 a) An electrooptical liquid crystal system, containing a liquid crystal mixture which consists of the following compounds 14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-propylcyclohexyl)phenyl trans-4-(trans-4-pentylcyclohexyl)cyclohexylcarboxylate
4.8% 4-pentyl-4''-cyanoterphenyl
6.4% 4-(trans-4-propylcyclohexyl)phenyl trans-4-butylcyclohexylcarboxylate
5.6% 4-(trans-4-pentylcyclohexyl)-4'-cyanobiphenyl
6% 4-propylphenyl 4-heptylbenzoate
7% 4-pentylphenyl 4-heptylbenzoate
7% 4-heptylphenyl 4-heptylbenzoate and has the following physical parameters:
clear point $T_c = 77.5°$ C.
viscosity $\eta = 34$ mm$^2$ s$^{-1}$ (20° C.)
optical anisotropy $\Delta n = 0.14$ (20° C., 589 nm)

b) The electrooptical systems prepared by the processes described in Example 1b) are distinguished by a wide working temperature range, favourable values for the electrooptical parameters and their temperature dependence and in particular by a low threshold voltage.

EXAMPLE 77 a) An electrooptical system, containing a liquid crystal mixture which consists of the following compounds:

20% 1-(trans-4-(trans-4-propylcyclohexyl)cyclohexyl)-2-(3-fluoro-4-cyanophenyl)ethane
14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-propylcyclohexyl)phenyl trans-4-(trans-4-pentylcyclohexyl)cyclohexylcarboxylate
4.8% 4-pentyl-4''-cyanoterphenyl
6.4% 4-(trans-4-propylcyclohexyl)phenyl trans-4-butylcyclohexylcarboxylate
5.6% 4-(trans-4-pentylcyclohexyl)-4'-cyanobiphenyl b) The electrooptical systems prepared by the processes described in Example 1b) are distinguished by a wide working temperature range, favourable values for the electrooptical parameters and their temperature dependence and in particular by a low threshold voltage.

EXAMPLE 78 a) An electrooptical liquid crystal system, containing a liquid crystal mixture which consists of the following compounds 14.5% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-propylcyclohexyl)phenyl trans-4-(trans-4-pentylcyclohexyl)cyclohexylcarboxylate
6.4% 4-(trans-4-propylcyclohexyl)phenyl trans-4-butylcyclohexylcarboxylate
5.6% 4-(trans-4-pentylcyclohexyl)-4'-cyano-biphenyl
4.8% 4-pentyl-4''-cyanoterphenyl
20% 2-(4-cyanophenyl)-5-pentylpyrimidine and has the following physical parameters:
clear point $T_c = 82.5°$ C.
viscosity $\eta = 34$ mm$^2$ s$^{-1}$ (20° C.)
optical anisotropy $\Delta n = 0.16$ (20° C., 589 nm)
dielectric anisotropy $\Delta \epsilon = 16.1$ (20° C., 1 kHz)

b) The electrooptical systems prepared by the processes described in Example 1b) are distinguished by a wide working temperature range, favourable values for the electrooptical parameters and their temperature dependence and in particular by a low threshold voltage.

EXAMPLE 79 a) An electrooptical liquid crystal system, containing a liquid crystal mixture which consists of the following compounds 10.0% 2-(4-cyanophenyl)-5-propyl-1,3-dioxane
15.0% 2-(4-cyanophenyl)-5-butyl-1,3-dioxane 15.0% 2-(4-cyanophenyl)-5-pentyl-1,3-dioxane
20.0% 4-(trans-4-propylcyclohexyl)benzonitrile
15.0% 4-(trans-4-pentylcyclohexyl)benzonitrile
10.0% 4-(trans-4-heptylcyclohexyl)benzonitrile 5.0% 4-(trans-4-propylcyclohexyl) phenyl trans-4-(trans-4-propylcyclohexyl)cyclohexylcarboxylate
5.0% 4-(trans-4-pentylcyclohexyl)phenyl trans-4-(trans-4-pentylcyclohexyl)cyclohexylcarboxylate
5.0% 4-(trans-4-propylcyclohexyl)phenyl trans-4-(trans-4-pentylcylcohexyl)cyclohexylcarboxylate (sic)

and has the following physical characteristics:
clear point $T_c = 76°$ C.
viscosity $\eta = 34$ mm$^2$ s$^{-1}$ (20° C.)
optical anisotropy $\Delta n = 0.131$ (589 nm, 20° C.)
dielectric anisotropy $\Delta\epsilon = 17$ (1 kHz, 20° C.)

b) The electrooptical systems prepared by the processes described in Example 1b) are distinguished by a wide working temperature range, favourable values for the electrooptical parameters and their temperature dependence and in particular by a low threshold voltage.

EXAMPLE 80 a) An electrooptical liquid crystal system, containing a liquid crystal mixture which consists of the following compounds 16.9% p-trans-4-propylcyclohexylbenzonitrile
13.7% p-trans-4-butylcyclohexylbenzonitrile
22.5% p-trans-4-pentylcyclohexylbenzonitrile
14.5% p-trans-4-heptylcyclohexylbenzonitrile 5.6% 4-(trans-4-propylcyclohexyl)phenyl trans-4-(trans-4-pentylcyclohexyl)cyclohexylcarboxylate
4.8% 4-pentyl-4''-cyanoterphenyl
6.4% 4-(trans-4-propylcyclohexyl)phenyl trans-4-butylcyclohexylcarboxylate
5.6% 4-(trans-4-pentylcyclohexyl)-4'-cyanobiphenyl
10.0% 1-[4-[trans-4-(trans-4-propylcyclohexyl)cyclohexyl]phenyl]-2-(4-cyanophenyl)ethane b) The electrooptical systems prepared by the processes described in Example 1b) are distinguished by a good preparation capability, a wide working temperature range, favourable values for the electrooptical parameters and their temperature dependence, and a low threshold voltage and a good contrast.

EXAMPLE 81 a) An electrooptical liquid crystal system, containing a liquid crystal mixture which consists of the following compounds 14.4% p-trans-4-propylcyclohexylbenzonitrile
11.2% p-trans-4-butylcyclohexylbenzonitrile
20% p-trans-4-pentylcyclohexylbenzonitrile
12% p-trans-4-heptylcyclohexylbenzonitrile
5.6% 4-(trans-4-propylcyclohexyl)phenyl trans-4-(trans-4-pentylcyclohexyl)cyclohexylcarboxylate
4.8% 4-pentyl-4''-cyanoterphenyl
6.4% 4-(trans-4-propylcyclohexyl)phenyl trans-4-butylcyclohexylcarboxylate
5.6% 4-(trans-4-pentylcyclohexyl)-4'-cyanobiphenyl
10% 4-(trans-4-propylcyclohexyl)-4'-difluoromethoxybiphenyl
10% 4-(trans-4-pentylcyclohexyl)-4'-difluoromethoxybiphenyl and has the following physical parameters:
clear point $T_c = 102.3$ ° C.
viscosity $\eta = 31$ mm$^2$ s$^{-1}$ (20° C.)
optical anisotropy $\Delta n = 0.15$ (20° C., 589 nm)
dielectric anisotropy $\Delta\epsilon = 11.4$ (20° C., 1 kHz)

b) The electrooptical systems prepared by the processes described in Example 1b) are distinguished by a good preparation capability, a wide working temperature range, favourable values for the electrooptical parameters and their temperature dependence, a low threshold voltage and a good contrast.

EXAMPLE 82 a) An electrooptical liquid crystal system, containing a liquid crystal mixture which consists of the following compounds 15.0% p-trans-4-propylcyclohexylbenzonitrile
10.0% p-trans-4-butylcyclohexylbenzonitrile
20.0% p-trans-4-pentylcyclohexylbenzonitrile
12.0% p-trans-4-heptylcyclohexylbenzonitrile
6.0% 4-(trans-4-pentylcyclohexyl)-4'-cyanobiphenyl
6.0% 4-(trans-4-propylcyclohexyl)phenyl trans-4-butylcyclohexyl)carboxylate
5.0% 4-pentyl-4''-cyanoterphenyl
6.0% 4-(trans-4-propylcyclohexyl)phenyl trans-4-(trans-4-pentylcyclohexyl)cyclohexylcarboxylate
20.0% 1-(trans-4-pentylcyclohexyl)-2-(3-fluoro-4-phenyl)ethane and has the following physical characteristics:
clear point $T_c = 76.3°$ C.
viscosity $\eta = 30$ mm$^2$ s$^{-1}$ (20° C.)
optical anisotropy $\Delta n = 0.130$ (20° C., 589 nm)
dielectric anisotropy $\Delta\epsilon = 13$ (20° C., 1 kHz)

b) The electrooptical liquid crystal system which is prepared by the process described in Example 1b) is distinguished by a good preparation capability, a wide working temperature range, favourable values for the electrooptical parameters and their temperature dependence, a good contrast and high angular dependence of the contrast.

EXAMPLE 83 a) An electrooptical liquid crystal system, containing a liquid crystal mixture which consists of the following compounds 25% 2-(4-cyanophenyl)-5-propylpyridine
25% 2-(4-cyanophenyl)-5-butylpyridine
25% 2-(4-cyanophenyl)-5-pentylpyridine
25% 2-(4-cyanophenyl)-5-(4-pentylphenyl)pyridine and has the following physical characteristics:
clear point $T_c = 85°$ C.
viscosity $\eta = 70$ mm$^2$/s
optical anisotropy $\Delta n = 0.269$ (20° C., 589 nm)
dielectric anisotropy $\Delta\epsilon = 24.1$ (20° C., 1 kHz)
ordinary refractive index $n_0 = 1.529$ (20° C., 589 nm)

b) The electrooptical system is prepared by the processes described in Example 1b), 1.1, 1.2, 1.3 and 2, but in which in the process analogous to 1.1 a ratio of liquid crystal to NOA 65 of 1:1 is selected and spacers of 10 $\mu$m were (sic) used.

In FIG. 1, the relative transmission for the electrooptical system prepared by the process described in Example 1b), 1.1 is (lacuna) as a function of the applied voltage (sinusoidal alternating voltage (effective values), frequency 100 Hz). This system is distinguished, in particular, by a good contrast and a low threshold voltage.

EXAMPLE 84 a) An electrooptical liquid crystal system, containing a liquid crystal mixture which consists of the following compounds:
- 15% p-trans -4-propylcyclohexylbenzonitrile
- 15% p-trans -4-butylcyclohexylbenzonitrile
- 20% p-trans -4-pentylcyclohexylbenzonitrile
- 10% 2-(4-cyanophenyl)-5-pentylpyridine
- 15% 2-(4-cyanophenyl)-5-(4-pentylphenyl)pyridine
- 7.5% 4-ethoxy-4'-fluorotolan
- 7.5% 4-butoxy-4'-fluorotolan b) The electrooptical system which is prepared by the processes described in Example 1b) is distinguished by a wide working temperature range, a good preparation capability, favourable values for the electrooptical parameters, a low threshold voltage and in particular a high stability.

EXAMPLE 85 a) An electrooptical liquid crystal system, containing a liquid crystal mixture which consists of the following compounds:
- 17.5% 4-propyl-4'-cyanobiphenyl
- 17.5% 4-butyl-4'-cyanobiphenyl
- 17.5% 4-pentyl-4'-cyanobiphenyl
- 17.5% 2-(4-cyanophenyl)-5-(4-pentylphenyl)pyridine
- 15.0% 4-(trans-4-propylcyclohexyl)-4'-trifluoromethoxytolan
- 15.0% 4-propyl-4'-trifluoromethoxytolan b) The electrooptical system which is prepared by the processes described in Example 1b) is distinguished by a wide working temperature range, a good preparation capability, favourable values for the electrooptical parameters, a low threshold voltage and in particular a high stability.

EXAMPLE 86 a) An electrooptical liquid crystal system, containing a liquid crystal mixture which consists of the following compounds:
- 15% p-trans-4-propylcyclohexylbenzonitrile
- 15% p-trans-4-butylcylohexylbenzonitrile (sic)
- 15% p-trans-4-pentylcyclohexylbenzonitrile
- 15% p-trans-4-heptylcyclohexylbenzonitrile
- 10% 2-(3,4-difluorophenyl)-5-propylpyrimidine
- 10% 2-(4-fluorophenyl)-5-pentylpyrimidine
- 10% 1-[4-(4-propylphenyl)phenyl]-2-(4-cyanophenyl)ethane
- 10% 1-[4-(4-pentylphenyl)phenyl]-2-(4-cyanophenyl)ethane b) The electrooptical system which is prepared by the processes described in Example 1b) is distinguished by a wide working temperature range, a good preparation capability, favourable values for the electrooptical parameters, a low threshold voltage and in particular a high stability.

EXAMPLE 87 a) An electrooptical liquid crystal system, containing a liquid crystal mixture which consists of the following compounds:
- 15% p-trans-4-propylcyclohexylbenzonitrile
- 15% p-trans-4-butylcyclohexylbenzonitrile
- 15% p-trans-4-pentylcyclohexylbenzonitrile
- 15% p-trans-4-heptylcyclohexylbenzonitrile
- 10% 1-(5-propylpyridin-2-yl)-2-(4-cyanophenyl)ethane
- 10% 1-(5-pentylpyridin-2-yl)-2-(4-cyanophenyl)ethane
- 8% 4-fluorophenyl trans-4-(trans-4-propylcyclohexyl)cyclohexylcarboxylate
- 8% 4-fluorophenyl trans-4-(trans-4-pentylcyclohexyl)cyclohexylcarboxylate
- 4% 3,4-difluorophenyl trans-4-(trans-4-pentylcyclohexyl)cyclohexylcarboxylate b) The electrooptical system which is prepared by the processes described in Example 1b) is distinguished by a wide working temperature range, a good preparation capability, favourable values for the electrooptical parameters, a low threshold-voltage and in particular a high stability.

EXAMPLE 88 a) An electrooptical liquid crystal system, containing a liquid crystal mixture which consists of the following compounds:
- 17.5% 2-(4-cyanophenyl)-5-propylpyridine
- 17.5% 2-(4-cyanophenyl)-5-butylpyridine
- 17.5% 2-(4-cyanophenyl)-5-pentylyridine (sic)
- 17.5% 2-(4-cyanophenyl)-5-(4-pentylphenyl)pyridine
- 15.0% 1-[4-(4-propylphenyl)phenyl]-2-(4-cyanophenyl)ethane
- 15.0% 1-[4-(4-pentylphenyl)phenyl]-2-(4-cyanophenyl)ethane and has the following physical characteristics:
clear point $T_c = 94°$ C.
optical anisotropy $\Delta n = 0.2722$ (20° C., 589 nm)
dielectric anisotropy $\Delta\epsilon = 25.6$ (20° C., 1 kHz)

b) The electrooptical system which is prepared by the processes described in Example 1b) is distinguished by a wide working temperature range, a good preparation capability, favourable values for the electrooptical parameters and in particular by a low threshold voltage.

EXAMPLE 89 a) An electrooptical liquid crystal system, containing a liquid crystal mixture which consists of the following compounds:
- 20.0% 2-(4-cyanophenyl)-5-propylpyridine
- 20.0% 2-(4-cyanophenyl)-5-butylpyridine
- 20.0% 2-(4-cyanophenyl)-5-pentylpyridine
- 20.0% 2-(4-cyanophenyl)-5-(4-pentylphenyl)pyridine
- 10.0% 4-(trans-4-propylcyclohexyl)-3',4'-difluorobiphenyl
- 10.0% 4-(trans-4-pentylcyclohexyl)-3',4'-difluorobiphenyl and has the following physical characteristics:
clear point $T_c = 86°$ C.
optical anisotropy $\Delta n = 0.2436$ (20° C., 589 nm)
ordinary refractive index $n_0 = 1.5259$ (20° C., 589 nm)
dielectric anisotropy $\Delta\epsilon = 21.8$ (1 kHz, 20° C.)

b) The electrooptical system is prepared by the processes described in Example 1b), 1.1, 1.2, 1.3 and 2, but in which in the process analogous to 1.1 a ratio of liquid crystal to NOA 65 of 1:1 is selected and spacers of 10 μm were (sic) used.

Figure 2:
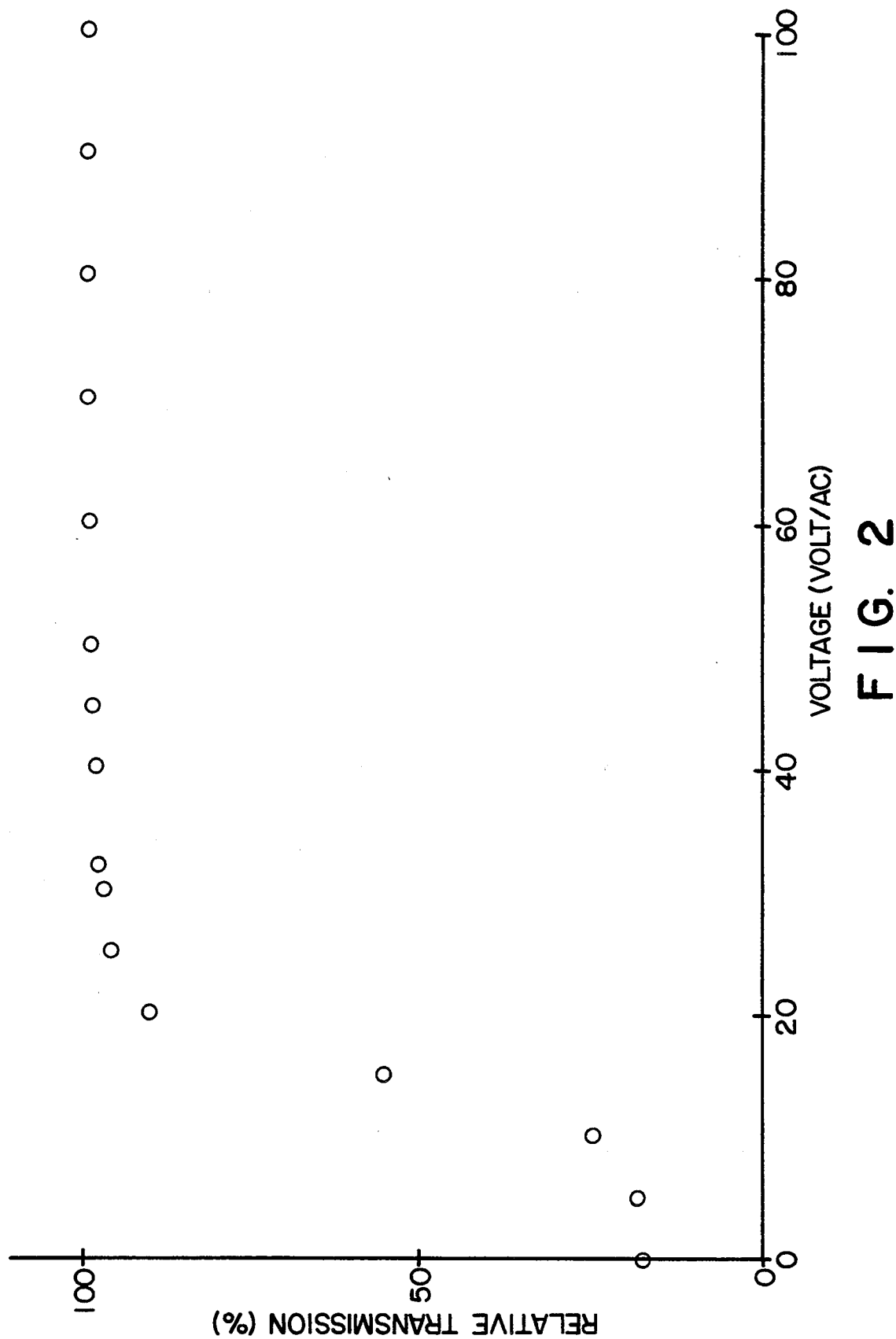

In FIG. 2, the relative transmission for the electrooptical system prepared by the process described in Example 1b), 1.1 is represented as a function of the applied voltage (sinusoidal alternating voltage (effective value), frequency 100 Hz).

This system is distinguished, in particular, by a low threshold voltage, an advantageous value for the slope of the electrooptical characteristic and by a high UV stability.

We claim:

1. An electrooptical liquid crystal system which contains a dielectrically positive liquid crystal mixture and a further optically transparent medium between 2 electrodes which are optionally applied to substrate sheets, whose liquid crystal molecules in the switched-off state have a random orientation, in which one of the refractive indices of the liquid crystal mixture essentially agrees with the refractive index of the matrix $n_M$ and/or in which the quotient of the mass of the liquid crystal mixture and of the mass of the optically transparent medium is 1.5 or more, which, independently of the polarization of the incident light, has an electrically switchable transmission, wherein the liquid crystal mixture contains one or more compounds of the formula Ia:

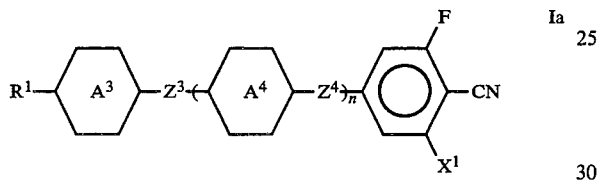

in which

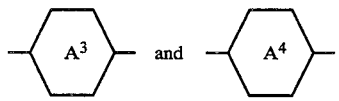

are each independently trans-1-,4-cyclohexylene, 1,4-phenylene, 2- fluoro-1,4-phenylene or 3-fluoro-1,4-phenylene, $X^1$ is H or F $R^1$ is alkyl having 1-12 C atoms, in which one or 2 non-adjacent CH$_2$ groups can also be replaced by —O— or —CH=CH—, and n, $Z^3$ and $Z^4$ are one of the following combinations:

| | No. | n | $Z^3$ | $Z^4$ |
|---|---|---|---|---|
| | 1 | 0 | single bond | — |
| | 2 | 0 | —CH$_2$CH$_2$— | — |
| | 3 | 1 | —CH$_2$CH$_2$— | single bond |
| | 4 | 1 | single bond | —CH$_2$CH$_2$— |
| or | 5 | 1 | single bond | single bond; | with the proviso that only one of $A^3$ and $A^4$ is trans-1,4-cyclohexylene.

2. A system according to claim 1, wherein in formula Ia

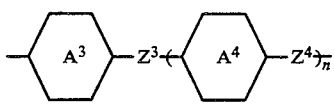

is

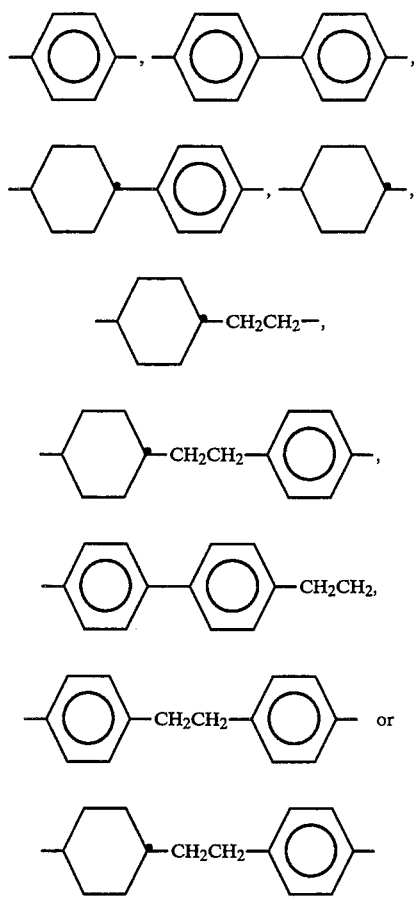

3. A system according to claim 1, wherein the liquid crystal mixture is embedded in the optically transparent medium in the form of compartments which are separated from one another.

4. A system according to claim 1, wherein the liquid crystal mixture forms a coherent, continuous phase in the optically transparent medium.

5. A system according to claim 3, which is a PDLC system.

6. A system according to claim 3, which is an NCAP system.

7. A system according to claim 4, which is a PN system.

8. A system according to claim 1, wherein the liquid crystal mixture contains one or more pleochroitic dye.

9. A system according to claim 1, wherein the liquid crystal mixture contains one or more chiral additives.

10. An electrooptical liquid crystal system
which contains a dielectrically positive liquid crystal mixture and a further optically transparent medium between 2 electrodes which are optionally applied to substrate sheets, whose liquid crystal molecules in the switched-off state have a random orientation, in which one of the refractive indices of the liquid crystal mixture essentially agrees with the refractive index of the matrix $n_M$ and/or in which the quotient of the mass of the liquid crystal mixture and of the mass of the optically transparent medium is 1.5 or more and, which, independently of the polarization of the incident light, has an electrically switchable transmission, and whose liquid crystal mixture is based on compounds

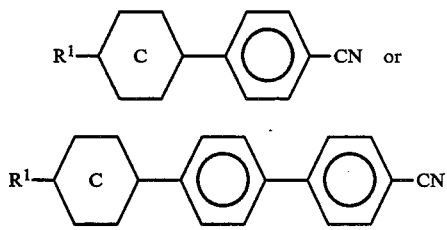

in which

is trans-1,4-cyclohexylene or 1,4-phenylene and $R^1$ is alkyl having 1–12 C atoms, in which one or 2 non-adjacent $CH_2$ groups is optionally replaced by —O— or —HC=CH—, and contains 5–60 percent by weight of one or more compounds of the following formulae

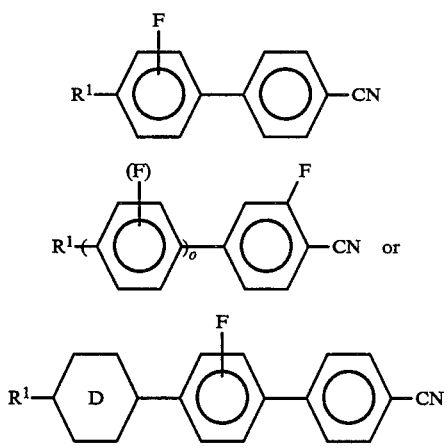

in which

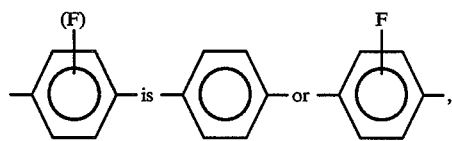

is 2-fluoro-1,4-phenylene or 3-fluoro-1,4-phenylene,

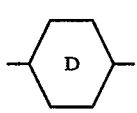

is 2-fluoro-1,5-phenylene or 3-fluoro-1,4-phenylene and O is 0 or 1.

11. A nematic liquid crystal composition with a high birefringence based on materials

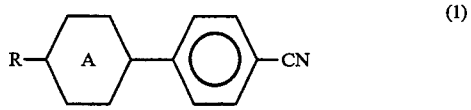

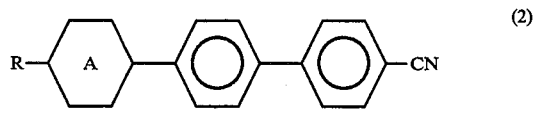

wherein

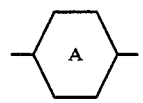

is trans-1,4-cyclohexylene or 1,4-phenylene, and R is an alkyl chain containing 2 to 7 carbon atoms wherein one $CH_2$ group may also be replaced by an oxygen atom, comprising including in said composition, as a second part, between 5 and 60% by weight of one or more compounds being selected from the clases (3) to (5)

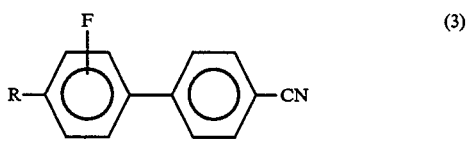

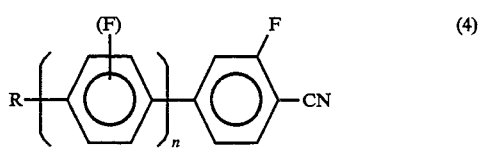

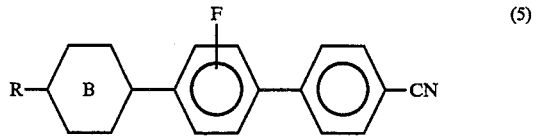

wherein R is in every instance an alkyl chain containing 2 to 7 carbon atoms wherein one $CH_2$ croup may also be replaced by an oxygen atom n is 1 or 2,

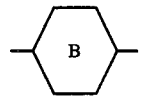

is trans-1,4-cyclohexylene

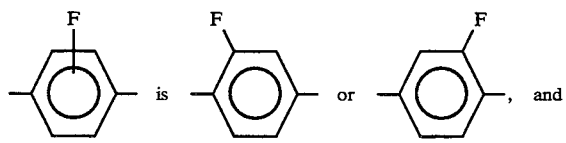

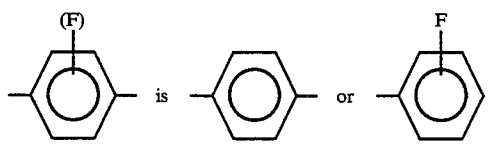

* * * * *